United States Patent
Pegelow et al.

(10) Patent No.: US 7,375,070 B2
(45) Date of Patent: May 20, 2008

(54) PORTIONED DETERGENT COMPOSITION

(75) Inventors: Ulrich Pegelow, Duesseldorf (DE);
Alexander Lambotte, Duesseldorf (DE); Maren Jekel, Barcelona (ES);
Christian Nitsch, Duesseldorf (DE);
Arno Dueffels, Duessedorf (DE)

(73) Assignee: Henkel Kommanditgesellschaft auf Aktien, Dusseldorf (DE)

( * ) Notice: Subject to any disclaimer, the term of this patent is extended or adjusted under 35 U.S.C. 154(b) by 0 days.

(21) Appl. No.: 11/056,056

(22) Filed: Feb. 11, 2005

(65) Prior Publication Data

US 2005/0143278 A1    Jun. 30, 2005

Related U.S. Application Data

(63) Continuation of application No. PCT/EP03/08531, filed on Aug. 1, 2003.

(30) Foreign Application Priority Data

Aug. 14, 2002   (DE) ................ 102 37 200

(51) Int. Cl.
C11D 17/04    (2006.01)
(52) U.S. Cl. ................ 510/296; 510/439; 510/406
(58) Field of Classification Search ........ 510/296, 510/406, 439, 405
See application file for complete search history.

(56) References Cited

U.S. PATENT DOCUMENTS

| | | | |
|---|---|---|---|
| 2,864,770 A | 12/1958 | McCune | |
| 3,198,740 A | 8/1965 | Dunlop, Jr. et al. | ........ 510/439 |
| 4,428,749 A | 1/1984 | Morris | |
| 4,469,605 A | 9/1984 | Ramachandran | |
| 4,929,380 A * | 5/1990 | Schulz et al. | ........ 510/413 |
| 5,004,556 A | 4/1991 | Julemont | |
| 5,057,310 A * | 10/1991 | Hill et al. | ........ 424/52 |
| 5,341,932 A | 8/1994 | Chen | |
| 5,362,413 A | 11/1994 | Kaufmann | |
| 5,389,284 A | 2/1995 | van der Hoeven | |
| 6,133,214 A | 10/2000 | Jung et al. | ........ 510/296 |
| 6,479,448 B2 | 11/2002 | Cropper | |
| 6,492,312 B1 * | 12/2002 | Pfeiffer et al. | ........ 510/221 |
| 6,815,410 B2 * | 11/2004 | Boutique et al. | ........ 510/295 |
| 2001/0053754 A1 | 12/2001 | Hewitt | |
| 2002/0187916 A1* | 12/2002 | Pfeiffer et al. | ........ 510/439 |
| 2003/0199414 A1* | 10/2003 | Boutique et al. | ........ 510/293 |
| 2004/0259751 A1 | 12/2004 | Kessler | |
| 2005/0119150 A1 | 6/2005 | Pegelow | |
| 2005/0181962 A1 | 8/2005 | Pegelow | |
| 2005/0187136 A1 | 8/2005 | Pegelow | |
| 2005/0187137 A1 | 8/2005 | Pegelow | |

FOREIGN PATENT DOCUMENTS

| | | |
|---|---|---|
| CA | 2 066 226 | 3/1991 |
| DE | 1 130 547 | 5/1962 |
| DE | 39 29 973 A1 | 3/1991 |
| DE | 198 31 703 A1 | 1/2000 |
| EP | 0 143 476 B1 | 9/1987 |
| EP | 0291198 A2 * | 11/1988 |
| EP | 0 339 999 | 11/1989 |
| EP | 0 385 529 B1 | 4/1995 |
| EP | 0 518 689 B1 | 3/1999 |
| GB | 1 224 777 | 3/1971 |
| GB | 2 367 828 A | 4/2002 |
| WO | WO 00/55044 | 9/2000 |
| WO | WO 00/55045 | 9/2000 |
| WO | WO 00/55046 | 9/2000 |
| WO | WO 00/55415 | 9/2000 |
| WO | WO 01/79416 | 10/2001 |
| WO | WO 02/06438 | 1/2002 |
| WO | WO 02/012432 A1 | 2/2002 |
| WO | WO 02/16205 | 2/2002 |
| WO | WO 02/16206 | 2/2002 |
| WO | WO 02/16222 | 2/2002 |
| WO | WO 02/16541 | 2/2002 |
| WO | WO 02/057402 A1 | 7/2002 |
| WO | WO 02/074892 A1 | 9/2002 |
| WO | WO 03/048293 | 6/2003 |
| WO | WO 2004/005447 | 1/2004 |
| WO | WO 2004/022679 | 3/2004 |
| WO | WO 2004/022690 | 3/2004 |
| WO | WO 2004/022691 | 3/2004 |

OTHER PUBLICATIONS

CTFA International Cosmetic Ingredient Dictionary and Handbook, 5th Edition, The Cosmetic, Toiletry and Fragrance Association, Washington, 1993.
Roempp Chemie Lexikon, Georg Thieme Verlag, Stuttgart/New York, 9th Edition, p. 2507 (1990).
Roempp Chemie Lexikon, Georg Thieme Verlag, Stuttgart/New York, 9th Edition, p. 3168 (1991).

* cited by examiner

Primary Examiner—Lorna M. Douyon
(74) Attorney, Agent, or Firm—John S. Child, Jr.

(57) ABSTRACT

Portioned liquid detergents having a liquid phase having one or more solid particles dispersed therein, the detergent being contained in a water-soluble or water-dispersible container, wherein the solid particles have a size above 600 μm.

59 Claims, No Drawings

US 7,375,070 B2

PORTIONED DETERGENT COMPOSITION

CROSS REFERENCE TO RELATED APPLICATIONS

This application is a continuation under 35 U.S.C. § 365(c) and 35 U.S.C. § 120 of international application PCT/EP2003/008531, filed Aug. 1, 2003, and claims priority under 35 U.S.C. § 119 of DE 102 37 200.4, filed Aug. 14, 2002, both of which are incorporated herein by reference in their entirety.

BACKGROUND OF THE INVENTION

The present invention relates to portioned detergent compositions which make the metering of detergents easier for the consumer. In particular, the invention relates to portioned detergent compositions which are packaged in a container made of water-soluble or water-dispersible film.

Detergents and processes for their production have been known for some time and are accordingly widely described in the prior art. Typically, they are supplied to the consumer in the form of spray-dried or granulated powder products or as a liquid product. Following the desire of the consumer for simpler dosage, products in preportioned form have become established on the market in addition to these two classical variants and have likewise been described extensively in the prior art, and especially compressed shaped bodies, i.e. tablets, blocks, briquettes and the like, and also portions of liquid or solid detergents packaged in pouches, have been described.

In the case of individual dosage amounts of detergents which have come onto the market packaged in pouches, pouches made of water-soluble film, which make it unnecessary for the consumer to tear open the package, have in turn become established. In this way, convenient metering of a single portion is possible by placing the pouch directly into the washing machine or dishwasher, or into its dispenser compartment, or by introducing it into a predetermined amount of water, for example in a bucket or in a handwashing basin or sink. Accordingly, the prior art describes a large number of detergents packaged in pouches made of water-soluble film.

For instance, DE-B 11 30 547 (Procter & Gamble) discloses packages made of water-soluble films of polyvinyl alcohol which are filled with nonliquid synthetic detergents. This document does not discuss the particle sizes of the packaged detergents.

An individual dose of a detergent or bleach in a pouch which has one or more seams made of water-sensitive material is described in European patent application EP 143 476 (Akzo N.V.). The water-sensitive seam material proposed in this publication is a mixture of anionic and/or nonionic water-binding polymer and cationic polymer adhesive material.

Extremely large particles which are enclosed by a water-insoluble film are described in EP 385 529 (Procter & Gamble) This document discloses a jumbo-particulate textile softener composition whose 5 to 30 mm-sized dryer-activated softener particles are enclosed by a water-insoluble, porous film.

It has been found that problems relating to production arise in the case of the prior art detergent compositions packaged in water-soluble or water-dispersible containers. In the course of the packaging of the detergent compositions into the water-soluble container, fine particles remain adhering to the container and get into the seams which are formed when the container is sealed. As a result of these particles in the seal, the seams in question are not fully impervious toward the atmosphere, which can lead to stability problems, in the detergent composition, and to leaks through the seams in question. To solve these problems, DE 198 31 703 (Henkel KGaA) has proposed that at least 70% by weight of the particles of the detergent composition have particle sizes above 800 µm.

None of the documents mentioned discloses aqueous, liquid detergent compositions packaged in water-soluble or water-dispersible containers. It has been found that problems arise here which are similar to those with particulate compositions: the liquid detergent composition to be introduced into the container often continues to drip or has stringing properties, so that, when the containers are sealed shut, these strings or drips and thus product residues get into the seam where, as described above, they lead to leaks which have much more disastrous consequences in the case of liquid contents than in the case of particulate contents.

In the case of the liquid detergent compositions, it may additionally be the case that the drips or product strings which are included in the seam to be formed are subjected to such thermal stress when a heat-sealing method is used that the composition boils and can lead to further leaks, discolorations or, in the most serious case, even to accidents as a result of thermal decomposition.

Interestingly, a change in the viscosity of the liquid detergent composition does not lead to success; it instead has to be supported by suitable further measures in the course of product formulation, these measures leading to improved results even irrespective of the viscosity of the compositions.

The avoidance of these problems and the provision of a portioned, liquid, i.e. pourable, detergent composition in which the seams of the containers consisting of water-dispersible or water-soluble film are impervious toward the atmosphere is an object of the present invention. It has been shown that the problems mentioned of pervious seams and the subsequent problems resulting therefrom can be ruled out when the aqueous liquid detergent compositions to be portioned satisfy certain criteria with regard to the particle size of the particles suspended in the aqueous, liquid matrix.

DESCRIPTION OF THE INVENTION

The present invention therefore provides a portioned liquid detergent composition in a water-soluble or water-dispersible container, comprising a liquid phase and one or more solid particle(s) contained therein, characterized in that the solid particle(s) present has/have a particle size above 500 µm. Particularly preferred portioned detergent compositions are characterized in that the solid particle(s) present has/have a particle size above 600 µm, preferably above 700 µm, more preferably between 800 and 50,000 µm and in particular between 1000 and 25,000 µm.

Within the particle size range mentioned, the aforementioned problems of sealing remaining drips or liquid strings into the seam no longer arise. Apart from the aforementioned dispersed solid particle(s) having a particle size above 500 µm, inventive compositions may also comprise particles having a smaller size when they do not form the dispersed solid particles until after the sealing of the water-soluble or water-dispersible container, for example by fracture, or by precipitations of the liquid matrix as a result of transport or storage.

The three-dimensional shape of the dispersed solid particles is restricted merely by the technical possibilities in the course of their production. Possible three-dimensional shapes are all embodiments which can be handled viably, i.e., for example cubes, cuboids and corresponding three-dimensional elements having flat side surfaces, and also in particular cylindrical embodiments with circular or oval cross section. This last embodiment embraces tablet-shaped particles up to compact cylinder sections having a ratio of height to diameter above 1. Further possible three-dimensional shapes are spheres ("beads"), hemispheres, "stretched spheres" in the form of ellipsoidal capsules or flattened "lenticular" particles, as are regular polyhedra, for example tetrahedra, hexahedra, octahedra, dodecahedra, icosahedra. Also conceivable are star-shaped embodiments with 3, 4, 5, 6 or more points or fully irregular bodies which can be configured, for example, in a motif. Suitable motifs, depending upon the field of use of the inventive compositions, are, for example, animal figures such as dogs, horses or birds, floral motifs or the illustration of fruits. However, the motif-type embodiment may also relate to inanimate objects such as vehicles, tools, household objects or clothing. The surface of the solid particles may have unevenness depending upon the type of production process selected and/or a selected coating. Owing to the numerous possible embodiments for the dispersed solid particle(s) the inventive compositions are notable for advantages not only in their production. Owing to their particle size above 500 µm, these particles are additionally clearly perceptible visually to the consumer and in this way enable a visualization, particularly advantageous for product acceptance, of the multicomponent systems present in the inventive compositions. For instance, the visually perceptible multiphasicity of these compositions may illustrate, for example, the differing function of individual active substances (for example cleaning and additional functions such as glass protection, silver protection, etc.). The separation of the ingredients for their action in different cleaning cycles of a cleaning program (for example prewash and main wash or cleaning and rinse cycle) are also realized visibly to the consumer).

In the context of the present application, solid particles embrace substances and substance mixtures which have a solid, i.e. dimensionally stable not flowable, consistency. This category includes, for example, substances in the solid state, but also dimensionally stable substances such as dimensionally stable gels and combinations of these substances. Also referred to as solids are filled bodies having a solid outer shell, irrespective of the state of matter of the fillers present in these filled bodies.

In the context of the present application, solid particles are preferably powders and/or granules and/or extrudates and/or compactates and/or castings, which may either be of pure substances or of substance mixtures. The solids mentioned may be present in amorphous and/or crystalline and/or semicrystalline form.

Powder is a general term for a form of division of solid substances and/or substance mixtures, which is obtained by comminuting, i.e. triturating or grinding in a mortar (pulverizing), grinding in mills or as a consequence of atomization- or freeze-dryings. A particularly fine division is often known as atomization or micronization; the corresponding powders are referred to as micropowders.

According to the particle size, a rough division of the powders into coarse, fine and ultrafine powders is customary; pulverulent bulk materials are classified more precisely by their bulk density and by sieve analysis. However, powders preferred in the context of the present application have lower particle sizes of 500 µm, preferably of 600 µm and in particular of 800 µm. Methods for determining the lower particle size are based commonly on the aforementioned sieve analysis and are described in detail in the prior art.

Powders can be compressed and agglomerated by extruding, compressing, rolling, briqueting, pelleting and related methods. Any method disclosed in the prior art for agglomeration of particulate mixtures is suitable in principle for producing the dispersed solid particles present in the inventive compositions. In the context of the present invention, preferred agglomerates used as solid(s) are, in addition to the granules, the compactates and extrudates.

Granule materials refer to accumulations of granule particles. A granule particle (granule) is an asymmetric aggregate of powder particles. Granulation processes are described widely in the prior art. Granule materials may be produced by moist granulation, by dry granulation or compaction, and by melt-solidification granulation.

The most commonly used granulation technique is moist granulation, since this technique is subject to the fewest restrictions and leads the most reliably to granules having favorable properties. The moist granulation is effected by moistening the powder mixtures with solvents and/or solvent mixtures and/solutions of binders and/or solutions of adhesives, and is preferably carried out in mixers, fluidized beds or spray towers, and said mixers may be equipped, for example, with stirring and kneading tools. However, it is also possible to use combinations of fluidized bed(s) and mixer(s), or combinations of different mixers for the granulation. Depending on the starting material and on the desired product properties, the granulation is effected under the action of low to high shear forces.

When the granulation is effected in a spray tower, the starting substances used may, for example, be melts (melt-solidification) or, preferably aqueous, slurries (spray-drying) of solid substances which are sprayed in defined droplet size at the top of a tower, solidify or dry in free fall and occur as a granule at the bottom of the tower. The melt-solidification is generally suitable particularly for shaping low-melting substances which are stable in the region of the melt temperature (for example urea, ammonium nitrate and various formulations such as enzyme concentrates, medicaments, etc.); the corresponding granules are also referred to as prills. Spray-drying is used particularly for the production of laundry detergents or laundry detergent constituents.

Further agglomeration techniques described in the prior art are extruder or perforated roll granulations, in which powder mixtures optionally admixed with granulating liquid are plastically reshaped in the course of compression through perforated disks (extrusion) or on perforated rolls. The products of the extruder granulation are also referred to as extrudates.

Compactates can be produced, for example, by dry granulation techniques such as tableting or roll compaction. Compaction in tablet presses allows single- or multiphase tablets or briquettes to be produced. The multiphase tablets include not only the multilayer or sandwich tablets, but also, for example, the coated tablets and the inlay tablets (bull's-eye tablets). Just like the flakes obtained in compacting rolls, the briquettes may subsequently be comminuted after the compaction by counter-running toothed rolls or be passed through sieves. The size of the particles obtained by compaction may vary.

In the context of the present application, castings refer to solid substance particles which are produced by solidification and/or crystallization from melts or solutions. The solidification and/or crystallization is effected preferably in prefabricated dies. The castings removed from the dies after solidification may subsequently, depending on the size of the die and intended use of the casting, be used in their original size or, optionally after comminution, as solids in the inventive water-soluble containers.

Suitable matrix materials for castings which are produced by melt solidification are in particular meltable substances from the groups of the fats and/or triglycerides and/or fatty acids and/or fatty alcohols and/or waxes and/or paraffins. A comprehensive description of these substances can be found below in this document in connection with the description in the context of this application of preferred solid particles which have a coating. To avoid repetitions, reference is made at this point to the remarks there.

Dimensionally stable gels are a further particularly preferred solid in the context of the present invention. The term "dimensionally stable" refers to gels which have a intrinsic dimensional stability which makes them capable of assuming a fracture-stable, nondisintegrating three-dimensional shape under customary conditions of production, of storage, of transport -and of handling by the consumer, this three-dimensional shape not changing under the conditions specified even over a prolonged period, preferably 4 weeks, more preferably 8 weeks and in particular 32 weeks, i.e. persisting under the customary conditions of production, of storage, of transport and of handling by the consumer in the three-dimensional geometric shape resulting from the production, i.e., for example, not deliquescing, or returning to this three-dimensional geometric shape under the action of an external force customary under the conditions of preparation, of storage, of transport and of handling.

When it is necessary or desired, depending upon the field of application of the inventive composition, to meter different active substance(s) and/or active substance preparations present in the solid particles with time delay, this may be effected in a further preferred modification of the aforementioned invention by different mechanisms or, in other words, by the integration of different "switches" into the aforementioned solid particles.

Possible "switches" which influence the disintegration of the solid particles dispersed in the liquid matrix are physicochemical parameters in particularly preferred embodiments. Examples thereof which, however, are not to be interpreted as a restriction are time, i.e. the elapse of a certain time in which the walls (capsule, coating, etc.) of a solid are in contact with a certain medium, for example with an aqueous liquor, reliable time control having the prerequisite of linear dissolution kinetics;

temperature, i.e. the attainment of a certain temperature in the course of the temperature profile, for example of a washing, cleaning or rinse cycle, at which a capsule or coating material starts to melt, to disperse or to dissolve; the control via the temperature is a reliable and thus preferred embodiment owing to the temperature rising with each stage of the wash cycle, especially in the case of dishwasher detergents;

the pH, i.e. the attainment of a certain pH, for example in the course of a washing, cleaning or rinse cycle, in the aqueous liquor surrounding the inventive composition;

the ionic strength of a wash liquor;

the mechanical stability, for example, of a capsule, of a coating or of a compacted shaped body such as a tablet which, depending upon the time, upon the temperature or upon other parameters, may be a disintegration-determining factor;

the permeability, for example, of a capsule or coating for a certain, principally gaseous or liquid, component, preferably water; etc.

The basis for the use of such "switches" is generally appropriately selected coatings for the dispersed solid particles which can be used as such a switch owing to their melting point and/or their permeability for solvents and/or the influence of temperature and/or ionic strength and/or pH on their solubility. The present application therefore further preferably provides portioned detergent compositions in which the solid particle(s) present has/have a coating. For reasons of simpler producibility, solid particles preferred in accordance with the invention have a single-phase coating. However, it will be appreciated that multiphase coatings can also be realized in the context of the present applications.

The use of coated solid particles has a series of advantages. For instance, a coating of the dispersed solid particles may initially prevent the incipient dissolution or full dissolution or the swelling of these particles by the surrounding solvent or solvent mixture, which would in any case be detrimental to the appearance of the inventive compositions. In addition, a coating allows mutually incompatible constituents of a formulation to be separated spatially from one another, which increases the stability of these constituents and thus also the effectiveness of the corresponding compositions. Finally, a coating enables the time-controlled release in the active substances comprising coated solid particles by precise selection of the coating composition(s). Depending upon the chemical nature of the active substances present in the liquid matrix or in the dispersed solid particles, and the composition of the solvent mixture, the coating materials used may be water-soluble and/or water-insoluble substances or substance mixtures. It should be noted that a high water content of the liquid matrix does not fundamentally rule out the use of water-soluble coating materials, since the solubility of these materials can be lowered by an appropriate electrolyte content of the liquid matrix. For better perceptibility, the coatings may comprise dyes.

The coating layers described below may be applied to the solid particles to be coated, for example, by dipping or spraying processes. Further suitable processes include coating in coating pans or drum coaters.

Suitable coating materials or constituents of the coating, for example binders in combination with salts, preferably inorganic salts, are polymers or polymer mixtures from the group of the water-soluble polymers. Preferred substances from this group are selected from the a) water-soluble nonionic polymers from the group of
a1) polyvinylpyrrolidones,
a2) vinylpyrrolidone-vinyl ester copolymers,
a3) cellulose ethers
b) water-soluble amphoteric polymers from the group of
b1) alkylacrylamide-acrylic acid copolymers
b2) alkylacrylamide-methacrylic acid copolymers
b3) alkylacrylamide-methylmethacrylic acid copolymers
b4) alkylacrylamide-acrylic acid-alkylaminoalkyl-(meth)acrylic acid copolymers
b5) alkylacrylamide-methacrylic acid-alkylamino-alkyl (meth)acrylic acid copolymers
b6) alkylacrylamide-methylmethacrylic acid-alkyl-aminoalkyl(meth)acrylic acid copolymers
b7) alkylacrylamide-alkyl methacrylate-alkylaminoethyl methacrylate-alkyl methacrylate copolymers
b8) copolymers of
b8i) unsaturated carboxylic acids b8ii) cationically derivatized unsaturated carboxylic acids
b8iii) if desired, further ionic or nonionogenic monomers
c) water-soluble zwitterionic polymers from the group of
c1) acrylamidoalkyltrialkylammonium chloride-acrylic acid copolymers and their alkali metal and ammonium salts
c2) acrylamidoalkyltrialkylammonium chloride-methacrylic acid copolymers and their alkali metal and ammonium salts
c3) methacroylethyl betaine-methacrylate copolymers
d) water-soluble anionic polymers from the group of
d1) vinyl acetate-crotonic acid copolymers
d2) vinylpyrrolidone-vinyl acrylate copolymers
d3) acrylic acid-ethyl acrylate-N-tert-butylacrylamide terpolymers
d4) graft polymers of vinyl esters, esters of acrylic acid or methacrylic acid alone or in a mixture, copolymerized with crotonic acid, acrylic acid or methacrylic acid with polyalkylene oxides and/or polyalkylene glycols
d5) grafted and crosslinked copolymers from the copolymerization of
d5i) at least one monomer of the nonionic type,
d5ii) at least one monomer of the ionic type,
d5iii) polyethylene glycol, and
d5iv) a crosslinker
d6) copolymers obtained by copolymerizing at least one monomer from each of the three following groups:
d6i) esters of unsaturated alcohols and short-chain saturated carboxylic acids and/or esters of short-chain saturated alcohols and unsaturated carboxylic acids,
d6ii) unsaturated carboxylic acids,
d6iii) esters of long-chain carboxylic acids and unsaturated alcohols and/or esters of the carboxylic acids of group d6ii) with saturated or unsaturated, straight-chain or branched $C_{8-18}$ alcohol
d7) terpolymers of crotonic acid, vinyl acetate and an allyl or methallyl ester
d8) tetra- and pentapolymers of
d8i) crotonic acid or allyloxyacetic acid
d8ii) vinyl acetate or vinyl propionate
d8iii) branched allyl or methallyl esters
d8iv) vinyl ethers, vinyl esters or straight-chain allyl or methallyl esters
d9) crotonic acid copolymers with one or more monomers from the group consisting of ethylene, vinylbenzene, vinyl methyl ether, acrylamide, and water-soluble salts thereof
d10) terpolymers of vinyl acetate, crotonic acid, and vinyl esters of a saturated aliphatic α-branched monocarboxylic acid
e) water-soluble cationic polymers from the group of
e1) quaternized cellulose derivatives
e2) polysiloxanes with quaternary groups
e3) cationic guar derivatives
e4) polymeric dimethyldiallylammonium salts and their copolymers with esters and amides of acrylic acid and methacrylic acid
e5) copolymers of vinylpyrrolidone with quaternized derivatives of dialkylaminoacrylate and -methacrylate
e6) vinylpyrrolidone-methoimidazolinium chloride copolymers
e7) quaternized polyvinyl alcohol
e8) polymers indicated under the INCI designations Polyquaternium 2, Polyquaternium 17, Polyquaternium 18, and Polyquaternium 27.

Water-soluble polymers in the context of the invention are those polymers which are soluble in water to an extent of more than 2.5% by weight at room temperature.

The solid particles dispersed in the inventive liquid detergents are preferably coated with a polymer or polymer mixture, the polymer (and accordingly the overall mixture) or at least 50% by weight of the polymer mixture (and thus at least 50% of the coating) being selected from certain polymers. The coating consists entirely or to an extent of at least 50% of its weight of water-soluble polymers from the group of the nonionic, amphoteric, zwitterionic, anionic and/or cationic polymers. In a further preferred embodiment, the coating of the phosphate consists of a further inorganic salt which comprises one of the polymers mentioned as a binder. Preferred polymers from these groups have been listed above and are described in detail below.

Water-soluble polymers which are preferred in accordance with the invention are nonionic. Examples of suitable nonionogenic polymers are the following:

polyvinylpyrrolidones, as sold, for example, under the name Luviskol® (BASF). Polyvinylpyrrolidones are preferred nonionic polymers in the context of the invention.

Polyvinylpyrrolidones [poly(1-vinyl-2-pyrrolidinones)], abbreviated PVP, are polymers of the general formula (I)

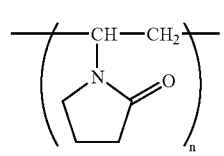

which are prepared by free-radical polymerization of 1-vinylpyrrolidone by processes of solution or suspension polymerization using free-radical initiators (peroxides, azo compounds). The ionic polymerization of the monomer affords only products having low molar masses. Commercial polyvinylpyrrolidones have molar masses in the range of approx. 2500-750,000 g/mol, which are characterized by specifying the K values and, depending on the K value, have glass transition temperatures of 130-175°. They are supplied as white, hygroscopic powders or as aqueous solutions. Polyvinylpyrrolidones are readily soluble in water and a multitude of organic solvents (alcohols, ketones, glacial acetic acid, chlorohydrocarbons, phenols, etc).

Vinylpyrrolidone-vinyl ester copolymers, as sold, for example, under the trademark Luviskol® (BASF). Luviskol® VA 64 and Luviskol® VA 73, each vinylpyrrolidone-vinyl acetate copolymers, are particularly preferred nonionic polymers. The vinyl ester polymers are polymers obtainable from vinyl esters and featuring the moiety of the formula (II)

as the characteristic basic structural unit of the macromolecules. Of these, the vinyl acetate polymers (R=CH$_3$) with polyvinyl acetates have the greatest industrial significance as by far the most important representatives.

The vinyl esters are polymerized free-radically by various processes (solution polymerization, suspension polymerization, emulsion polymerization, bulk polymerization). Copolymers of vinyl acetate with vinylpyrrolidone contain monomer units of the formulae (I) and (II)

Cellulose ethers, such as hydroxypropylcellulose, hydroxyethylcellulose and methylhydroxypropylcellulose, as sold, for example, under the trademarks Culminal® and Benecel® (AQUALON). Cellulose ethers can be described by the general formula (III)

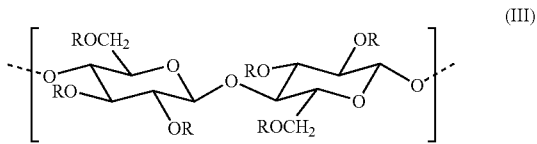

in which R is H or an alkyl, alkenyl, alkynyl, aryl or alkylaryl radical. In preferred products, at least one R in formula (III) is —CH$_2$CH$_2$CH$_2$—OH or —CH$_2$CH$_2$—OH. Cellulose ethers are prepared industrially by etherifying alkali metal cellulose (for example with ethylene oxide). Cellulose ethers are characterized by way of the average degree of substitution, DS, and/or by the molar degree of substitution, MS, which indicate how many hydroxyl groups of an anhydroglucose unit of cellulose have reacted with the etherifying reagent or how many moles of the etherifying reagent have been added, on average, to one anhydroglucose unit. Hydroxyethylcelluloses are water-soluble above a DS of approx. 0.6 or an MS of approx. 1. Commercial hydroxyethyl- and hydroxypropylcelluloses have degrees of substitution in the range of 0.85-1.35 (DS) and 1.5-3 (MS). Hydroxyethyl- and -propylcelluloses are sold as yellowish-white, odorless and tasteless powders in highly varying degrees of polymerization. Hydroxyethyl- and -propylcelluloses are soluble in cold and hot water and in some (aqueous) organic solvents, but insoluble in the majority of (anhydrous) organic solvents; their aqueous solutions are relatively insensitive to changes in pH or addition of electrolyte.

Further polymers preferred in accordance with the invention are water-soluble amphopolymers. The generic term amphopolymers embraces amphoteric polymers, i.e. polymers which includes both free amino groups and free —COOH or SO$_3$H groups in the molecule and which are capable of forming internal salts; zwitterionic polymers whose molecule includes quaternary ammonium groups and —COO$^-$ or —SO$_3^-$ groups, and those polymers which contain —COOH or SO$_3$H groups and quaternary ammonium groups. An example of an amphopolymer which can be used in accordance with the invention is the acrylic resin obtainable under the name Amphomer®, which is a copolymer of tert-butylaminoethyl methacrylate, N-(1,1,3,3-tetramethylbutyl)acrylamide, and two or more monomers from the group consisting of acrylic acid, methacrylic acid and their simple esters. Likewise preferred amphopolymers are composed of unsaturated carboxylic acids (e.g. acrylic and methacrylic acid), cationically derivatized unsaturated carboxylic acids (e.g. acrylamidopropyltrimethylammonium chloride) and, if desired, further ionic or nonionogenic monomers, as can be taken, for example, from DE-A 39 29 973 and the prior art cited therein. Terpolymers of acrylic acid, methyl acrylate and methacrylamidopropyltrimonium chloride, as obtainable commercially under the name Merquat® 2001 N, are particularly preferred amphopolymers in accordance with the invention. Further suitable amphoteric polymers are, for example, the octylacrylamide-methyl methacrylate-tert-butylaminoethyl methacrylate-2-hydroxypropyl methacrylate copolymers available under the names Amphomer® and Amphomer® LV-71 (DELFT NATIONAL)

Suitable zwitterionic polymers are, for example, acrylamidopropyltrimethylammonium chloride-acrylic acid or -methacrylic acid copolymers and their alkali metal salts and ammonium salts. Further suitable zwitterionic polymers are methacryloylethyl betaine-methacrylate copolymers, which are obtainable commercially under the name Amersette® (AMERCHOL).

Anionic polymers suitable in accordance with the invention include:

Vinyl acetate-crotonic acid copolymers, as commercially available, for example, under the names Resyn® (NATIONAL STARCH), Luviset® (BASF) and Gafset® (GAF).

In addition to monomer units of the abovementioned formula (II), these polymers also have monomer units of the general formula (IV):

$$[-CH(CH_3)-CH(COOH)-]_n \quad (IV)$$

Vinylpyrrolidone-vinyl acrylate copolymers, obtainable for example under the trademark Luviflex® (BASF). A preferred polymer is the vinylpyrrolidone-acrylate terpolymer obtainable under the name Luviflex® VBM-35 (BASF).

Acrylic acid/ethyl acrylate/N-tert-butylacrylamide terpolymers, which are sold, for example, under the name Ultrahold® strong (BASF).

Graft polymers of vinyl esters, esters of acrylic acid or methacrylic -acid alone or in a mixture, copolymerized with crotonic acid, acrylic acid or methacrylic acid with polyalkylene oxides and/or polyalkylene glycols.

Such grafted polymers of vinyl esters, esters of acrylic acid or methacrylic acid alone or in a mixture with other copolymerizable compounds onto polyalkylene glycols are obtained by polymerization under hot conditions in homogeneous phase, by stirring the polyalkylene glycols into the monomers of the vinyl esters, esters of acrylic acid or methacrylic acid, in the presence of free-radical initiators.

Suitable vinyl esters have been found to be, for example, vinyl acetate, vinyl propionate, vinyl butyrate, vinyl benzoate, and suitable esters of acrylic acid or methacrylic acid have been found to be those which are obtainable with low molecular weight aliphatic alcohols, i.e., in particular, ethanol, propanol, isopropanol, 1-butanol, 2-butanol, 2-methyl-1-propanol, 2-methyl-2-propanol, 1-pentanol, 2-pentanol, 3-pentanol, 2,2-dimethyl-1-propanol, 3-methyl-1-butanol, 3-methyl-2-butanol, 2-methyl-2-butanol, 2-methyl-1-butanol, 1-hexanol.

Useful polyalkylene glycols include in particular polyethylene glycols and polypropylene glycols. Polyethylene glycols are polymers of ethylene glycol which satisfy the general formula V

$$H-(O-CH_2-CH_2)_n-OH \quad (V)$$

in which n may assume values between 1 (ethylene glycol) and several thousand. For polyethylene glycols there exist various nomenclatures, which may lead to confusion. It is common practice in industry to specify the average relative molar weight after "PEG", so that "PEG 200" characterizes a polyethylene glycol having a relative molar mass of approx. 190 to, approx. 210. For cosmetic ingredients, a different nomenclature is used, in which the abbreviation PEG is followed by a hyphen which is followed directly by a number which corresponds to the number n in the above-mentioned formula V. According to this nomenclature (known as the INCI nomenclature, CTFA International Cosmetic Ingredient Dictionary and Handbook, 5th Edition, The Cosmetic, Toiletry and Fragrance Association, Washington, 1997), for example, PEG-4, PEG-6, PEG-8, PEG-9, PEG-10, PEG-12, PEG-14 and PEG-16 may be used. Polyethylene glycols are available commercially, for example, under the trade names Carbowax® PEG 200 (Union Carbide), Emkapol® 200 (ICI Americas), Lipoxol® 200 MED (HÜLS America), Polyglycol® E-200 (Dow Chemical); Alkapol® PEG 300 (Rhône-Poulenc), Lutrol® E300 (BASF), and the corresponding trade names with higher numbers.

Polypropylene glycols (abbreviation PPGs) are polymers of propylene glycol which satisfy the general formula VI

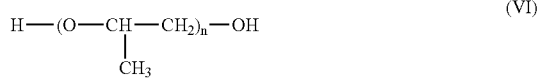

in which n may assume values between 1 (propylene glycol) and several thousand. Of industrial significance here are in particular di-, tri-, and tetrapropylene glycol, i.e., the representatives where n=2, 3 and 4 in formula VI.

In particular, it is possible to use the vinyl acetate copolymers grafted onto polyethylene glycols and the polymers of vinyl acetate and crotonic acid grafted onto polyethylene glycols.

Grafted and crosslinked copolymers from the copolymerization of
  i) at least one monomer of the nonionic type,
  ii) at least one monomer of the ionic type,
  iii) polyethylene glycol, and
  iv) a crosslinker The polyethylene glycol used has a molecular weight of between 200 and several million, preferably between 300 and 30,000. The nonionic monomers may be of very different types and preference is given among them to the following: vinyl acetate, vinyl stearate, vinyl laurate, vinyl propionate, allyl stearate, allyl laurate, diethyl maleate, allyl acetate, methyl methacrylate, cetyl vinyl ether, stearyl vinyl ether, and 1-hexene.

The ionic monomers may equally be of very different types, and particular preference among these is given to the presence in the graft polymers of crotonic acid, allyloxyacetic acid, vinylacetic acid, maleic acid, acrylic acid, and methacrylic acid.

Preferred crosslinkers are ethylene glycol dimethacrylate, diallyl phthalate, ortho-, meta- and paradivinylbenzene, tetraallyloxyethane, and polyallylsaccharoses containing 2 to 5 allyl groups per molecule of saccharin.

The above-described grafted and crosslinked copolymers are formed preferably from:
  i) from 5 to 85% by weight of at least one monomer of the nonionic type,
  ii) from 3 to 80% by weight of at least one monomer of the ionic type,
  iii) from 2 to 50% by weight, preferably from 5 to 30% by weight, of polyethylene. glycol, and
  iv) from 0.1 to 8% by weight of a crosslinker, the percentage of the crosslinker depending on the ratio of the overall weights of i), ii) and iii).

Copolymers obtained by copolymerizing at least one monomer from each of the three following groups:
  i) esters of unsaturated alcohols and short-chain saturated-carboxylic acids and/or esters of short-chain saturated alcohols and unsaturated carboxylic acids,
  ii) unsaturated carboxylic acids,
  iii) esters of long-chain carboxylic acids and unsaturated alcohols and/or esters of the carboxylic acids of group ii) with saturated or unsaturated, straight-chain or branched $C_{8-18}$ alcohol.

Short-chain carboxylic acids and alcohols in this context are those having from 1 to 8 carbon atoms, and the carbon chains of these compounds may optionally be interrupted by divalent heteroatomic groups such as —O—, —NH—, and —S—.

Terpolymers of crotonic acid, vinyl acetate, and an allyl or methallyl ester

These terpolymers contain monomer units of the general formulae (II) and (IV) (see above) and also monomer units of one or more allyl or methallyl esters of the formula VII:

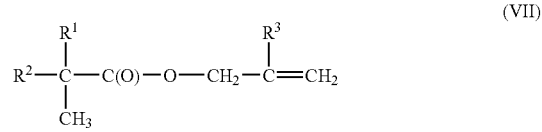

where $R^3$ is —H or —$CH_3$, $R^2$ is —$CH_3$ or —$CH(CH_3)_2$ and $R^1$ is —$CH_3$ or a saturated straight-chain or branched $C_{1-6}$-alkyl radical and the sum of the carbon atoms in the radicals $R^1$ and $R^2$ is preferably 7, 6, 5, 4, 3 or 2.

The aforementioned terpolymers result preferably from the copolymerization of from 7 to 12% by weight of crotonic acid, from 65 to 86% by weight, preferably from 71 to 83% by weight, of vinyl acetate and from 8 to 20% by weight, preferably from 10 to 17% by weight, of allyl or methallyl esters of the formula VII.

Tetra- and pentapolymers of
  i) crotonic acid or allyloxyacetic acid
  ii) vinyl acetate or vinyl propionate
  iii) branched allyl or methallyl esters
  iv) vinyl ethers, vinyl esters or straight-chain allyl or methallyl esters.

Crotonic acid copolymers with one or more monomers from the group of ethylene, vinylbenzene, vinyl methyl ether, acrylamide and the water-soluble salts thereof.

Terpolymers of vinyl acetate, crotonic acid and vinyl esters of a saturated aliphatic α-branched monocarboxylic acid.

Further polymers which can be used with preference as coating constituents are cationic polymers. Among the cationic polymers, preference is given to the permanently cationic polymers. "Permanently cationic" refers in accordance with the invention to those polymers which, irrespective of the pH of the composition (i.e. both of the coating and of the tablet), have a cationic group. These are generally polymers which include a quaternary nitrogen atom, for example in the form of an ammonium group.

Preferred cationic polymers are, for example:

Cationic polymers which are preferred in accordance with the invention are quaternized cellulose derivatives and also polymeric dimethyldiallylammonium salts and copolymers thereof. Cationic cellulose derivatives, especially the commercial product Polymer® JR 400, are very particularly preferred cationic polymers.

- quaternized cellulose derivatives, as available commercially under the names Celquat® and Polymer JR®. The compounds Celquat® H 100, Celquat® L 200 and Polymer JR® 400 are preferred quaternized cellulose derivatives,
- polysiloxanes with quaternary groups, for example the commercially available products Q2-7224 (manufacturer: Dow Corning; a stabilized trimethylsilylamodimethicone), Dow Corning® 929 emulsion (comprising a hydroxyamino-modified silicone, also referred to as amodimethicone), SM-2059 (manufacturer: General Electric), SLM-55067 (manufacturer: Wacker), and Abil®-Quat 3270 and 3272 (manufacturer: Th. Goldschmidt; diquaternary polydimethylsiloxanes, Quaternium-80),
- cationic guar derivatives, such as in particular the products sold under the trade names Cosmedia® Guar and Jaguar®,
- polymeric dimethyldiallylammonium salts and their copolymers with esters and amides of acrylic acid and methacrylic acid. The products available commercially under the names Merquat® 100 (poly(dimethyldiallylammonium chloride)) and Merquat® 550 (dimethyldiallylammonium chloride-acrylamide copolymer) are examples of such cationic polymers.
- Copolymers of vinylpyrrolidone with quaternized derivatives of dialkylamino acrylate and methacrylate, for example diethyl sulfate-quaternized vinylpyrrolidone-dimethylamino methacrylate copolymers. Such compounds are available commercially under the names Gafquat® 734 and Gafquat® 755.
- Vinylpyrrolidone-methoimidazolinium chloride copolymers, as supplied under the name Luviquat®.
- Quaternized polyvinyl alcohol and also polymers known under the names
- Polyquaternium 2
- Polyquaternium 17,
- Polyquaternium 18, and
- Polyquaternium 27, having quaternary nitrogen atoms in the polymer main chain. These polymers are designated in accordance with the INCI nomenclature; detailed information can be found in the CTFA International Cosmetic Ingredient Dictionary and Handbook, 5th Edition, The Cosmetic, Toiletry and Fragrance Association, Washington, 1997, which is expressly incorporated herein by reference.

A particularly preferred coating material in the context of the present application for the dispersed solid particles is polyvinyl alcohol (PVA). With regard to the degree of hydrolysis and the molecular weight of the polyvinyl alcohols used with preference for the coating, the remarks made below in the description with regard to the preferred container materials to which reference is made at this point to avoid repetitions apply.

As already mentioned, the coating of the solid particles may also consist of a mixture of the aforementioned polymers with salts, preferably inorganic salts.

In summary, preference is given in the context of the present application to detergent compositions in which the coating of the solid particle(s) dispersed in the liquid matrix comprises at least one substance selected from the group of the water-soluble organic polymers, preferably of the water-soluble organic homo- and/or copolymers, more preferably from the group of the water-soluble homopolymers, especially preferably from the group of the polyethylene glycols and/or polypropylene glycols and in particular from the group of the polyethylene glycols and/or polypropylene glycols having a molecular weight above 2000, and particular preference is given in the selection of the aforementioned coating materials, with regard to their processibility and thermal stability, to those substances which have a melting point above 30° C., preferably above 60° C., more preferably above 90° C. and in particular above 120° C.

A second group of coating materials preferred in accordance with the invention is that of the water-insoluble coating materials, in particular the coating materials from the group of the fats, triglycerides and waxes.

Fat(s) or triglyceride(s) is the name for compounds of glycerol in which the three hydroxyl groups of glycerol have been esterified by carboxylic acids. The naturally occurring fats are triglycerides which generally contain different fatty acids in the same glycerol molecule. However, it is also possible by hydrolysis of the fats and subsequent esterification or reaction with acyl chlorides to obtain synthetic triglycerides in which there is only one bonded fatty acid (for example tripalmitin, triolein or tristearin). Preference is given to natural and/or synthetic fats and/or mixtures of both as coating material for the dispersed solids in the context of the present invention.

In the present application, fatty acids refer to aliphatic saturated or unsaturated carboxylic acids having a branched or unbranched carbon chain. For the preparation of the fatty acids, there exists a multitude of preparative methods. While the lower fatty acids are based usually on oxidative processes starting from alcohols and/or aldehydes and also aliphatic or acyclic hydrocarbons, the higher homologs are for the most part also obtainable nowadays in the simplest way by hydrolyzing natural fats. The advances in the sector of transgenic plants have recently made available almost unlimited means of varying the fatty acid spectrum in the stored fats of oil plants. In the context of the present invention, preferred fatty acids have a melting point which allows processing of these fats as material or constituent of a casting. Particularly advantageous fatty acids have been found to have a melting point above 25° C. Preferred matrix materials and/or constituents are therefore capric acid and/or undecanoic acid and/or lauric acid and/or tridecanoic acid and/or myristic acid and/or pentadecanoic acid and/or palmitic acid and/or margaric acid and/or stearic acid and/or nonadecanoic acid and/or arachic acid and/or erucic acid and/or eleostearic acid. However, fatty acids having a melting point below 25° C. may also be constituent of the coating of the dispersed solid particles.

Fatty alcohol is a collective term for linear, saturated or unsaturated primary alcohols which have from 6 to 22 carbon atoms and are obtainable by reduction of the triglycerides, fatty acids or fatty acid esters. Depending on the preparative process, the fatty alcohols may be saturated or unsaturated. Myristyl alcohol and/or 1-pentadecanol and/or cetyl alcohol and/or 1-heptadecanol and/or stearyl alcohol and/or erucyl alcohol and/or 1-nonadecanol and/or arachidyl alcohol and/or 1-heneicosanol and/or behenyl alcohol and/or erucyl alcohol and/or brassidyl alcohol are preferred constituents of the coatings of the solid particle(s) dispersed in the liquid matrix of inventive compositions.

It has likewise been found to be advantageous when the solid particles dispersed in the liquid matrix comprise waxes as a matrix material. Preferred waxes have a melting range which is between about 45° C. and about 75° C. This means in the present case that the melting range occurs within the specified temperature interval and does not designate the width of the melting range. Waxes having such a melting range are dimensionally stable at room temperature but melt at temperatures, typical for machine dishwashing, of from 30° C. to 90° C. and are therefore readily water-dispersible at these temperatures.

"Waxes" refer to a series of natural or synthetic substances which melt without decomposition generally above 40° C. and are comparatively nonviscous and nonstringing even slightly above the melting point. They have a strongly temperature-dependent consistency and solubility.

According to their origin, the waxes are divided into three groups, the natural waxes, chemically modified waxes and the synthetic waxes.

The natural waxes include, for example, plant waxes such as candelilla wax, carnauba wax, Japan wax, esparto grass wax, cork wax, guaruma wax, rice germ oil wax, sugarcane wax, ouricury wax or montan wax, animal waxes such as beeswax, shellac wax, spermaceti, lanolin (wool wax), or uropygial grease, mineral waxes such as ceresin or ozokerite (earth wax), or petrochemical waxes such as petrolatum, paraffin waxes or microwaxes.

The chemically modified waxes include, for example, hard waxes such as montan ester waxes, sassol waxes or hydrogenated jojoba waxes.

Synthetic waxes generally refer to polyalkylene waxes or polyalkylene glycol waxes. The meltable or softenable substances which can be used for the compositions hardenable by cooling are also compounds from other substance classes which fulfill the requirements mentioned with regard to the softening point. Suitable synthetic compounds have been found to be, for example, higher esters of phthalic acid, in particular dicyclohexyl phthalate, which is obtainable commercially under the name Unimoll® 66 (Bayer AG). Also suitable are synthetic waxes made from lower carboxylic acids and fatty alcohols, for example dimyristyl tartrate which is obtainable under the name Cosmacol® ETLP (Condea). Conversely, it is also possible to use synthetic or semisynthetic esters of lower alcohols with fatty acids from native sources. This substance class includes, for example, Tegin® 90 (Goldschmidt), a glycerol monostearate palmitate. Shellac, for example Schellack-KPS-Dreiring-SP (Kalkhoff GmbH) can also be used in accordance with the invention as a coating material.

Likewise included in the waxes in the context of the present invention are, for example, what are known as the wax alcohols. Wax alchols are relatively high molecular weight, water-insoluble fatty alcohols having generally from about 22 to 40 carbon atoms. The wax alcohols occur, for example, as a main constituent of many natural waxes in the form of wax esters of high molecular weight fatty acids (wax acids). Examples of wax alcohols are lignoceryl alcohol (1-tetracosanol), cetyl alcohol, myristyl alcohol or melissyl alcohol. The coating of the solid particles coated in accordance with the invention may optionally also comprise wool wax alcohols, which refer to triterpenoid and steroid alcohols, for example lanolin which is available, for example, under the trade name Argowax® (Pamentier & Co).

In a further preferred embodiment, the dispersed solid particles have paraffin wax in a predominant proportion as the coating material. This means that at least 50% by weight of the coating material, preferably more, consists of paraffin wax. Particularly suitable paraffin wax contents (based on the total weight of the coating materials) are about 60% by weight, about 70% by weight or about 80% by weight, and particular preference is given to even higher proportions of, for example, more than 90% by weight. In a particular embodiment of the invention, the entire amount of the coating material consists of paraffin wax.

Paraffin waxes consist mainly of alkanes, and low proportions of iso- and cycloalkanes. The paraffin to be used in accordance with the invention preferably has substantially no constituents having a melting point of more than 70° C., more preferably of more than 60° C.

Preferred solid particles have, as the coating material or as a constituent of the coating material, at least one paraffin wax having a melting range of from 40° C. to 60° C.

Further advantageous constituents of the coating of solid particles are wax alcohols, i.e. fatty alcohols having approx. 24-36 carbon atoms, which, in the form of wax esters of relatively high molecular weight fatty acids (wax acids) are the main constituent of many natural waxes. Examples of preferred wax alcohols which should be mentioned here are lignoceryl alcohol, ceryl alcohol, myricyl alcohol or melissyl alcohol.

It will be appreciated that, in the case that an inventive composition has more than one coated dispersed solid particle in the liquid matrix, these particles may have different coatings.

It is preferred in the context of the present invention that the amount(s) of the coating substance(s), based on the total weight of the coated dispersed solid particle(s), is/are between 0.5 and 15% by weight, preferably between 1 and 12% by weight and in particular between 2 and 8% by weight.

As detailed above, coated dispersed solid particles are suitable for formulating mutually incompatible active substances or moisture-sensitive active substances in a storage-stable compact supply form. A further advantage of the present invention results from the size of the dispersed solid particles above 500 μm compared to compositions having dispersed solid particles of smaller size, since, with increasing particle size, the falling ratio of particle surface area to particle volume results in a smaller amount of the coating composition having to be used to coat the same volume of contents. In a preferred embodiment, the reduction, achieved by enlarging the solid particles, of the solid surface is already sufficient to stabilize mutually incompatible active substances which are present separately in the liquid matrix and the dispesed solid particle. Such solid particles have a size above 5000 μm, preferably above 8000 μm, more preferably in the range from 10,000 to 25,000 μm and in particular in the range from 12,000 to 20,000 μm.

The aforementioned active substances sensitive toward decomposition include, for example, the enzymes and the bleaches.

Enzymes are used in detergents generally formulated on support materials, so that the preferred route for the stabilization of such enzymes in the context of the present application is the incorporation of these enzymes into the coated or uncoated dispersed solid particles. The present invention therefore preferably further provides portioned detergent compositions, characterized in that the dispersed solid particle(s) contain(s) at least one enzyme, preferably from the group of the proteases, amylases or lipases, in amounts of from 0.01 to 15% by weight, preferably from 0.1 to 10% by weight and in particular from 0.2 to 7% by weight, based in each case on the total weight of the enzyme-containing dispersed solid particle(s). For a detailed description of the aforementioned enzymes, reference is made to the sections below to avoid repetitions.

The present application further preferably provides inventive portioned detergent compositions, characterized in that the dispersed solid particle(s) contain(s) at least one bleach, preferably from the group of the compounds which supply $H_2O_2$ in water, more preferably from the group of sodium perborate tetrahydrate, sodium perborate monohydrate or sodium percarbonate, in amounts of from 0.1 to 50% by weight, preferably from 0.5 to 40% by weight and in particular from 1.0 to 30% by weight, based in each case on the total weight of the bleach-containing dispersed solid particle(s).

The present application further preferably provides inventive portioned detergent compositions, characterized in that in that the dispersed solid particle(s) contain(s) at least one polymer, preferably a polymer from the group of the homo- or copolymeric carboxylic acids and/or of the homo- or copolymeric polycarboxylic acids and/or of the homo- or copolymeric sulfonic acids, in amounts of from 1 to 70% by weight, preferably of from 2 to 60% by weight and in particular of from 5 to 50% by weight, based in each case on the total weight of the polymer-containing dispersed solid particle(s)

The present application further preferably provides inventive portioned detergent compositions, characterized in that the dispersed solid particle(s) contain(s) at least one surfactant, preferably an anionic surfactant, more preferably an alkylbenzenesulfonate, or a nonionic surfactant, preferably an alkoxylated nonionic surfactant, in particular an ethoxylated nonionic surfactant, in amounts of from 0.5 to 30% by weight, preferably from 1 to 25% by weight and in particular from 2 to 20% by weight, based in each case on the total weight of the surfactant-containing dispersed solid particle (s).

The inventive liquid detergent compositions which are packaged in the containers made of water-soluble or water-dispersible films may be mobile to highly viscous. In the context of the present invention, "fluid" indicates compositions which are flowable at room temperature and can run out of vessels under the action of gravity. As already mentioned, the viscosity of the detergent compositions does not play the decisive role in solving the problem of continued dripping and stringing, and container seam leaks resulting therefrom. The advantages of the inventive compositions with regard to the solution of the problems outlined can, though, be further extended when the viscosity of the compositions is within certain ranges. Particular preference is given to inventive portioned detergent compositions in which the liquid detergent composition has a viscosity (Brookfield viscometer LVT-II at 20 rpm and 20° C., spindle 3) of from 500 to 100,000 mPas, preferably from 1000 to 50,000 mPas, more preferably from 1200 to 10,000 mPas and in particular from 1300 to 5000 mPas.

The inventive compositions are packaged in containers made of water-soluble or water-dispersible film. However, the use of such films does not fundamentally rule out the packaging of aqueous compositions. Compositions having a water content below 5% by weight generally do not attack water-dispersible or water-soluble packaging materials, for example polyvinyl alcohol films (PVA films). Inventive compositions preferred in the context of the present application, the liquid matrix is therefore anhydrous and has a water content below 6% by weight, preferably between 0.5 and 5% by weight, more preferably between 1 and 4% by weight, based in each case on the total weight of the detergent composition. In spite of the use of water-soluble or water-dispersible container materials, there exist even for the packaging of aqueous compositions having water contents above 6% by weight various means of preventing the undesired dissolution of the packaging-forming substances by the compositions present. For instance, the European patent EP 518 689 B1 (Rhône-Poulenc Agrochimie) describes the addition of organic or inorganic salts to aqueous compositions which results in an increase in the electrolyte concentration and a reduction in the water solubility of the packaging materials, such as polyethylene oxide, methylcellulose or polyvinyl alcohol. The prior art also describes the coating of water-soluble films with water-insoluble films (laminate films) or particles of PVdC (polyvinylidene dichloride) or PTFE (polytetrafluoroethylene). Of the abovementioned methods for solubility reduction, the increase in the electrolyte concentration has been found to be particularly advantageous in the context of the present invention. This method enables preferred detergent compositions present in the containers to have a water content above 6% by weight without them starting to dissolve the water-soluble or water-dispersible container surrounding them. In a further preferred embodiment of the present invention, the liquid matrix of the portioned detergent composition is aqueous and has a water content of above 6% by weight, preferably between 10 and 70% by weight, more preferably between 20 and 60% by weight and in particular between 30 and 50% by weight, based in each case on the total weight of the detergent composition. Such aqueous detergent compositions contain dissolved salts in the liquid matrix, the proportion of these salts in the total weight of the detergent composition being preferably at least 5% by weight, more preferably at least 7% by weight and in particular at least 12% by weight.

The inventive compositions comprise a liquid matrix which, apart from the water, may also comprise further nonaqueous solvents. These nonaqueous solvents stem, for example, from the groups of the monoalcohols, diols, triols and polyols, the ethers, esters and/or amides. Particular preference is given to nonaqueous solvents which are water-soluble, "water-soluble" solvents in the context of the present application being solvents which are fully miscible with water at room temperature, i.e. without a miscibility gap.

Nonaqueous solvents which can be used in the inventive compositions stem preferably from the group of mono- or polyhydric alcohols, alkanolamines or glycol ethers, as long as they are miscible with water within the concentration range specified. Preference is given to selecting the solvents from ethanol, n- or isopropanol, butanols, glycol, propane- or butanediol, glycerol, diglycol, propyl- or butyldiglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol methyl or ethyl ether, methoxy-, ethoxy- or butoxytriglycol, 1-butoxyethoxy-2-propanol, 3-methyl-3-methoxybutanol, propylene glycol t-butyl ether and mixtures of these solvents.

A portioned detergent composition which is particularly preferred in the context of the present invention is characterized in that it contains nonaqueous solvent(s) in amounts of from 0.1 to 70% by weight, preferably of from 0.5 to 60% by weight, more preferably of from 1 to 50% by weight, even more preferably of from 2 to 40% by weight and in particular of from 2.5 to 30% by weight, based in each case on the entire composition, preferred nonaqueous solvent(s) being selected from the group of the nonionic surfactants which are liquid at room temperature, of the polyethylene glycols and polypropylene glycols, glycerol, glyceryl carbonate, triacetin, ethylene glycol, propylene glycol, propylene carbonate, hexylene glycol, ethanol and n-propanol and/or isopropanol.

The nonionic surfactants which are liquid at room temperature are described in detail below as washing or cleaning substances.

Polyethylene glycols (abbreviation PEG) which can be used in accordance with the invention are liquid at room temperature. PEGs are polymers of ethylene glycol which satisfy the general formula (I)

where n can assume values between 1 (ethylene glycol, see below) and approx. 16. For polyethylene glycols, there exist various nomenclatures, which can lead to confusion. It is common practice in industry to specify the average relative molar weight after "PEG", so that "PEG 200" characterizes a polyethylene glycol having a relative molar mass of from approx. 190 to approx. 210. According to this nomenclature, the industrially conventional polyethylene glycols PEG 200, PEG 300, PEG 400 and PEG 600 can be used in the context of the present invention.

For cosmetic ingredients, a different nomenclature is used in which the abbreviation PEG is followed by a hyphen which is followed directly by a number which corresponds to the number n in the abovementioned formula. According to this nomenclature (known as INCI nomenclature, CTFA International Cosmetic Ingredient Dictionary and Handbook, 5th edition, The Cosmetic, Toiletry and Fragrance Association, Washington, 1997), PEG-4, PEG-6, PEG-8, PEG-9, PEG-10, PEG-12, PEG-14 and PEG-16, for example, can be used in accordance with the invention.

Polyethylene glycols are commercially available, for example, under the trade names Carbowax® PEG 200 (Union Carbide), Emkapol® 200 (ICI Americas), Lipoxol® 200 MED (Hüls America), Polyglycol® E-200 (Dow Chemical), Alkapol® PEG 300 (Rhône-Poulenc), Lutrol® E300 (BASF), and the corresponding trade names with higher numbers.

Polypropylene glycols (abbreviation PPG) which can be used in accordance with the invention are polymers of propylene glycol which satisfy the general formula (II)

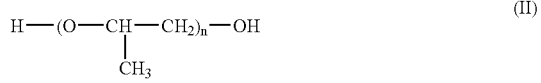

where n can assume values between 1 (propylene glycol, see below) and approx. 12. Of industrial importance here are in particular di-, tri- and tetrapropylene glycol, i.e. the representatives where n=2, 3 and 4 in the above formula.

Glycerol is a colorless, clear, low-mobility, odorless, sweet-tasting hygroscopic liquid of density 1.261, which solidifies at 18.2° C. Glycerol was originally just a by-product of fat hydrolysis, but is nowadays synthesized industrially in large amounts. Most industrial processes start from propene, which is processed via the allyl chloride and epichlorohydrin intermediates to give glycerol. A further industrial process is the hydroxylation of allyl alcohol with hydrogen peroxide over a $WO_3$ catalyst via the glycide stage.

Glyceryl carbonate is accessible by transesterification of ethylene carbonate or dimethyl carbonate with glycerol to form ethylene glycol and/or methanol as by-products. A further synthetic route starts from glycidol (2,3-epoxy-1-propanol), which is reacted with $CO_2$ under pressure in the presence of catalysts to give glyceryl carbonate. Glyceryl carbonate is a clear, mobile liquid with a density of 1.398 $gcm^{-3}$ which boils at 125-130° C. (0.15 mbar).

Ethylene glycol (1,2-ethanediol, "glycol") is a colorless, viscous, sweet-tasting, highly hygroscopic liquid which is miscible with water, alcohols and acetone and has a density of 1.113. The solidification point of ethylene glycol is −11.5° C.; the liquid boils at 198° C. Ethylene glycol is obtained industrially from ethylene oxide by heating with water under pressure. Promising preparative processes are also based on the acetoxylation of ethylene and subsequent hydrolysis or on synthesis gas reactions.

There exist two isomers of propylene glycol, 1,3-propanediol and 1,2-propanediol. 1,3-Propanediol (trimethylene glycol) is a neutral, colorless and odorless, sweet-tasting liquid of density 1.0597, which solidifies at −32° C. and boils at 214° C. 1,3-Propanediol is prepared from acrolein and water with subsequent catalytic hydrogenation.

Of considerably greater industrial importance is 1,2-propanediol (propylene glycol), which is an oily, colorless, virtually odorless liquid, which has a density of 1.0381 and which solidifies at −60° C. and boils at 188° C. 1,2-Propanediol is prepared from propylene oxide by an addition reaction of water.

Propylene carbonate is a clear, readily mobile liquid with a density of 1.21 $gcm^{-3}$; the melting point is −49° C.; the boiling point is 242° C. Propylene carbonate is also obtainable on the industrial scale by reacting propylene oxide and $CO_2$ at 200° C. and 80 bar.

In an aqueous matrix which preferably also comprises one or more of the aforementioned or other nonaqueous solvents, solids of the inventive particle size are suspended. These solids, just like the liquid matrix, may comprise one or more constituents from the group of the bleaches, bleach activators, polymers, builders, surfactants, enzymes, electrolytes, pH modifiers, fragrances, perfume carriers, dyes, hydrotropes, foam inhibitors, antiredeposition agents, optical brighteners, graying inhibitors, shrink preventatives, anticrease agents, dye transfer inhibitors, antimicrobial active ingredients, germicides, fungicides, antioxidants, corrosion inhibitors, antistats, repellency and impregnation agents, swelling and antislip agents, nonaqueous solvents, fabric softeners, protein hydrolyzates and UV absorbers. The present application therefore further provides a portioned detergent composition, characterized in that the solid particle(s) and/or the liquid matrix present comprise(s) at least one active substance from the group of the bleaches, bleach activators, polymers, builders, surfactants, enzymes, electrolytes, pH modifiers, fragrances, perfume carriers, dyes, hydrotropes, foam inhibitors, antiredeposition agents, optical brighteners, graying inhibitors, shrink preventatives, anticrease agents, dye transfer inhibitors, antimicrobial active ingredients, germicides, fungicides, antioxidants, corrosion inhibitors, antistats, repellency and impregnation agents, swelling and antislip agents, nonaqueous solvents, fabric softeners, protein hydrolyzates and UV absorbers, for example from the groups of the builders, cobuilders, polymers, bleaches, bleach activators, silver protectants, optical brighteners, enzymes, etc. Preference is given to builders being the main constituent of the suspended solid phase.

Builders are used in the inventive compositions primarily to bind calcium and magnesium. Customary builders which may be present in the context of the invention, for example, in amounts of from 22.5 to 45% by weight, preferably of from 25 to 40% by weight and in particular of from 27.5 to 35% by weight, based in each case on the overall composition, are the low molecular weight polycarboxylic acids and salts thereof, the homopolymeric and copolymeric polycarboxylic acids and salts thereof, the carbonates, phosphates and sodium and potassium silicates. For the inventive cleaning compositions, preference is given to using trisodium citrate and/or pentasodium tripolyphosphate and silicatic builders from the class of alkali metal disilicates. In general, in the case of the alkali metal salts, the potassium salts are to be preferred over the sodium salts since they often have a greater solubility in water. Preferred water-soluble builders are, for example, tripotassium citrate, potassium carbonate and the potassium waterglasses.

Particularly preferred machine dishwasher detergents comprise, as builders, phosphates, preferably alkali metal phosphates, with particular preference pentasodium triphosphate or pentapotassium triphosphate (sodium tripolyphosphate or potassium tripolyphosphate).

Alkali metal phosphates is the collective term for the alkali metal (in particular sodium and potassium) salts of the various phosphoric acids, for which a distinction can be drawn between metaphosphoric acids $(HPO_3)_n$ and orthophosphoric acid $H_3PO_4$, in addition to higher molecular weight representatives. The phosphates combine a number of advantages: they act as alkali carriers, prevent limescale deposits and additionally contribute to the cleaning performance.

Sodium dihydrogenphosphate, $NaH_2PO_4$, exists as the dihydrate (density 1.91 $gcm^{-3}$, melting point 60°) and as the monohydrate (density 2.04 $gcm^{-3}$). Both salts are white powders which are very readily soluble in water, lose the water of crystallization upon heating and undergo conversion at 200° C. to the weakly acidic diphosphate (disodium hydrogendiphosphate, $Na_2H_2P_2O_7$), at a higher temperature to sodium trimetaphosphate $(Na_3P_3O_9)$ and Maddrell's salt (see below). $NaH_2PO_4$ is acidic; it is formed when phosphoric acid is adjusted to a pH of 4.5 using sodium hydroxide solution and the slurry is sprayed. Potassium dihydrogenphosphate (primary or monobasic potassium phosphate, potassium diphosphate, PDP) $KH_2PO_4$, is a white salt of density 2.33 $gcm^{-3}$, has a melting point of 253° [decomposition with formation of potassium polyphosphate $(KPO_3)_x$] and is readily soluble in water.

Disodium hydrogenphosphate (secondary sodium phosphate), $Na_2HPO_4$, is a colorless, very readily water-soluble crystalline salt. It exists in anhydrous form and with 2 mol of water (density 2.066 $gcm^{-3}$, water loss at 95°), 7 mol of water (density 1.68 $gcm^{-3}$, melting point 48° with the loss of 5 $H_2O$) and 12 mol of water (density 1.52 $gcm^{-3}$, melting point 35° with loss of 5 $H_2O$), becomes anhydrous at 100° and converts to the diphosphate $Na_4P_2O_7$ upon more intense heating. Disodium hydrogenphosphate is prepared by neutralizing phosphoric acid with sodium carbonate solution using phenolphthalein as an indicator. Dipotassium hydrogenphosphate (secondary or dibasic potassium phosphate), $K_2HPO_4$, is an amorphous white salt which is readily soluble in water.

Trisodium phosphate, tertiary sodium phosphate, $Na_3PO_4$, are colorless crystals which in the form of the dodecahydrate have a density of 1.62 $gcm^{-3}$ and a melting point of 73-76° C. (decomposition), in the form of the decahydrate (corresponding to 19-20% of $P_2O_5$) have a melting point of 100° C., and in anhydrous form (corresponding to 39-40% of $P_2O_5$) have a density of 2.536 $gcm^{3-}$. Trisodium phosphate is readily soluble in water with an alkaline reaction and is prepared by evaporatively concentrating a solution of exactly 1 mol of disodium phosphate and. 1 mol of NaOH. Tripotassium phosphate (tertiary or tribasic potassium phosphate), $K_3PO_4$, is a white, deliquescent, granular powder of density 2.56 $gcm^{-3}$, has a melting point of 1340° and is readily soluble in water with an alkaline reaction. It is formed, for example, when Thomas slag is heated with charcoal and potassium sulfate. Despite the higher price, the more readily soluble and therefore highly effective potassium phosphates are often preferred in the detergents industry over the corresponding sodium compounds.

Tetrasodium diphosphate (sodium pyrophosphate), $Na_4P_2O_7$, exists in anhydrous form (density 2.534 $gcm^{-3}$, melting point 988°, 880° also reported) and as the decahydrate (density 1.815-1.836 $gcm^{-3}$, melting point 94° with loss of water). Both substances are colorless crystals which are soluble in water with an alkaline reaction. $Na_4P_2O_7$ is formed when disodium phosphate is heated at >200° or by reacting phosphoric acid with sodium carbonate in the stoichiometric ratio and dewatering the solution by spraying. The decahydrate complexes heavy metal salts and water hardness constituents and therefore reduces the hardness of the water. Potassium diphosphate (potassium pyrophosphate), $K_4P_2O_7$, exists in the form of the trihydrate and is a colorless, hygroscopic powder with a density of 2.33 $gcm^{-3}$ which is soluble in water, the pH of the 1% strength solution at 25° being 10.4.

Condensation of the $NaH_2PO_4$ or of the $KH_2PO_4$ gives rise to higher molecular weight sodium and potassium phosphates, for which a distinction can be drawn between cyclic representatives, the sodium and potassium metaphosphates, and catenated types, the sodium and potassium polyphosphates. Especially for the latter, a multitude of names are in use: fused or calcined phosphates, Graham's salt, Kurrol's and Maddrell's salt. All higher sodium and potassium phosphates are referred to collectively as condensed phosphates.

The industrially important pentasodium triphosphate, $Na_5P_3O_{10}$ (sodium tripolyphosphate) is a nonhygroscopic, white, water-soluble salt which is anhydrous or crystallizes with 6 $H_2O$ and has the general formula NaO—[P(O)(ONa)—O]$_n$—Na where n=3. About 17 g of the crystalline anhydrous salt dissolve at room temperature in 100 g of water, approx. 20 g at 60°, and about 32 g at 100°; after heating the solution to 100° for two hours, about 8% orthophosphate and 15% diphosphate are formed by hydrolysis. In the case of the preparation of pentasodium triphosphate, phosphoric acid is reacted with sodium carbonate solution or sodium hydroxide solution in the stoichiometric ratio and the solution is dewatered by spraying. Similarly to Graham's salt and sodium diphosphate, pentasodium triphosphate dissolves many insoluble metal compounds (including lime soaps, etc.). Pentapotassium triphosphate, $K_5P_3O_{10}$ (potassium tripolyphosphate), is commercially available, for example, in the form of a 50% by weight solution (>23% $P_2O_5$, 25% $K_2O$). The potassium polyphosphates are widely used in the detergent industry.

Preferred machine dishwashing detergents contain from 20 to 60% by weight of one or more water-soluble builders, preferably citrates and/or phosphates, preferably alkali metal phosphates, with particular preference pentasodium triphosphate or pentapotassium triphosphate (sodium tripolyphosphate or potassium tripolyphosphate).

In preferred embodiments of the present invention, the content of water-soluble builders in the compositions lies within narrow limits. Preference is given here to machine dishwasher detergents which contain the water-soluble builder(s) in amounts of from 22.5 to 55% by weight, preferably from 25 to 50% by weight and in particular from 27.5 to 45% by weight, based in each case on the overall composition.

With particular preference, the inventive compositions may comprise condensed phosphates as water-softening substances. These substances form a group of phosphates, also known as fused or calcined phosphates owing to their preparation, which can be derived from acidic salts of orthophosphoric acid (phosphoric acids) by condensation. The condensed phosphates can be divided into the metaphosphates $[M_n(PO_3)_n]$ and polyphosphates $(M^I{}_{n+2}P_nO_{3n+1}$ or $M^I{}_nH_2P_nO_{3n+1})$.

The term "metaphosphates" was originally the general term for condensed phosphates of the composition $M_n[P_nO_{3n}]$ (M=monovalent metal), but is today usually restricted to salts with ring-shaped cyclo(poly)phosphate anions. When n=3, 4, 5, 6, etc., the terms used are tri-, tetra-, penta-, hexametaphosphates, etc. According to the systematic nomenclature of isopolyanions, the anion where n=3, for example, is referred to as cyclotriphosphate.

Metaphosphates are obtained as accompanying substances of Graham's salt, incorrectly referred to as sodium hexametaphosphate, by melting $NaH_2PO_4$ at temperatures above 620° C. to also form Maddrell's salt as an intermediate. This and Kurrol's salt are linear polyphosphates which are today not usually included in the metaphosphates, but which can likewise be used with preference as water-softening substances in the context of the present invention.

The crystalline, water-insoluble Maddrell's salt, $(NaPO_3)_x$ where x>1000, which can be obtained at 200-300° C. from $NaH_2PO_4$, converts at about 600° C. to the cyclic metaphosphate $[Na_3(PO_3)_3]$ which melts at 620° C. Depending on the reaction conditions, the quenched, glassy melt is the water-soluble Graham's salt, $(NaPO_3)_{40-50}$, or a glassy condensed phosphate of the composition $(NaPO_3)_{15-20}$, which is known as Calgon. For both products the incorrect name hexametaphosphates is still in use. Kurrol's salt, $(NaPO_3)_n$ where n is >>5000, likewise arises from the melt at 600° C. of the Maddrell's salt, when it is left for a short time at about 500° C. It forms highly polymeric water-soluble fibers.

Particularly preferred water-softening substances from the aforementioned classes of condensed phosphates which have been found to be useful are the "hexametaphosphates" Budit® H6 and H8 from Budenheim.

In summary, particularly preferred portioned detergent compositions are characterized in that the dispersed solid particles comprise one or more water-soluble organic and/or inorganic salts, preferably water-soluble builders, preferably citrates and/or phosphates, preferentially alkali metal phosphates, with particular preference pentasodium triphosphate or pentapotassium triphosphate (sodium tripolyphosphate or potassium tripolyphosphate), preference being given to compositions which contain the dispersed solids mentioned in amounts of from 5 to 70% by weight, preferably of from 10 to 65% by weight, more preferably of from 15 to 60% by weight, even more preferably of from 20 to 55% by weight and in particular of from 25 to 50% by weight, based in each case on the overall composition.

In addition to the aqueous matrix and the builders suspended therein, further ingredients may be present in the inventive detergent compositions. The next most important class of substance in quantitative terms to be mentioned here is that of the surfactants, of which nonionic surfactants are of prominent significance.

The nonionic surfactants used are preferably alkoxylated, advantageously ethoxylated, in particular primary alcohols having preferably from 8 to 18 carbon atoms and on average from 1 to 12 mol of ethylene, oxide (EO) per mole of alcohol in which the alcohol radical may be linear or preferably 2-methyl-branched, or may contain a mixture of linear and methyl-branched radicals, as are typically present in oxo alcohol radicals. However, especially preferred alcohol ethoxylates have linear radicals of alcohols of natural origin having from 12 to 18 carbon atoms, for example of coconut, palm, tallow fat or oleyl alcohol, and on average from 2 to 8 EO per mole of alcohol. The preferred ethoxylated alcohols include, for example, $C_{12-14}$-alcohols having 3 EO or 4 EO, $C_{9-11}$-alcohol having 7 EO, $C_{13-15}$-alcohols having 3 EO, 5 EO, 7 EO or 8 EO, $C_{12-18}$-alcohols having 3 EO, 5 EO or 7 EO and mixtures thereof, such as mixtures of $C_{12-14}$-alcohol having 3 EO and $C_{12-18}$-alcohol having 5 EO. The degrees of ethoxylation specified are statistical average values which may be an integer or a fraction for a specific product. Preferred alcohol ethoxylates have a narrowed homolog distribution (narrow range ethoxylates, NRE). In addition to these nonionic surfactants, it is also possible to use fatty alcohols having more than 12 EO. Examples thereof are tallow fatty alcohol having 14 EO, 25 EO, 30 EO or 40 EO.

In addition, further nonionic surfactants which may be used are also alkyl glycosides of the general formula $RO(G)_x$ in which R is a primary straight-chain or methyl-branched, in particular 2-methyl-branched, aliphatic radical having from 8 to 22, preferably from 12 to 18, carbon atoms and G is the symbol which is a glycose unit having 5 or 6 carbon atoms, preferably glucose. The degree of oligomerization x, which specifies the distribution of monoglycosides and oligoglycosides, is any number between 1 and 10; x is preferably from 1.2 to 1.4.

A further class of nonionic surfactants used with preference, which are used either as the sole nonionic surfactant or in combination with other nonionic surfactants, are alkoxylated, preferably ethoxylated or ethoxylated and propoxylated, fatty acid alkyl esters, preferably having from 1 to 4 carbon atoms in the alkyl chain.

Nonionic surfactants of the amine oxide type, for example N-cocoalkyl-N,N-dimethylamine oxide and N-tallow alkyl-N,N-hydroxyethylamine oxide, and of the fatty acid alkanolamide type may also be suitable. The amount of these nonionic surfactants is preferably not more than that of the ethoxylated fatty alcohols, in particular not more than half thereof.

Further suitable surfactants are polyhydroxy fatty acid amides of the formula (III)

(III)

in which RCO is an aliphatic acyl radical having from 6 to 22 carbon atoms, $R^1$ is hydrogen, an alkyl or hydroxyalkyl radical having from 1 to 4 carbon atoms and [Z] is a linear or branched polyhydroxyalkyl radical having from 3 to 10 carbon atoms and from 3 to 10 hydroxyl groups. The polyhydroxy fatty acid amides are known substances which can typically be obtained by reductively aminating a reducing sugar with ammonia, an alkylamine or an alkanolamine, and subsequently acylating with a fatty acid, a fatty acid alkyl ester or a fatty acid chloride.

The group of polyhydroxy fatty acid amides also includes compounds of the formula (IV)

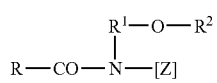

(IV)

in which R is a linear or branched alkyl or alkenyl radical having from 7 to 12 carbon atoms, $R^1$ is a linear, branched or cyclic alkyl radical or an aryl radical having from 2 to 8 carbon atoms and $R^2$ is a linear, branched or cyclic alkyl radical or an aryl radical or an oxyalkyl radical having from 1 to 8 carbon atoms, preference being given to $C_{1-4}$-alkyl or phenyl radicals, and [Z] is a linear polyhydroxyalkyl radical whose alkyl chain is substituted by at least two hydroxyl groups, or alkoxylated, preferably ethoxylated or propoxylated, derivatives of this radical.

[Z] is preferably obtained by reductive amination of a reduced sugar, for example glucose, fructose, maltose, lactose, galactose, mannose or xylose. The N-alkoxy- or N-aryloxy-substituted compounds can be converted to the desired polyhydroxy fatty acid amides by reaction with fatty acid methyl esters in the presence of an alkoxide as catalyst.

The preferred surfactants used are low-foaming nonionic surfactants. With particular preference, the inventive machine dishwasher detergents comprise a nonionic surfactant which has a melting point above room temperature. Accordingly, preferred compositions are characterized in that they comprise nonionic surfactant(s) with a melting point above 20° C., preferably above 25° C., more preferably between 25 and 60° C. and in particular between 26.6 and 43.3° C.

Suitable nonionic surfactants which have melting or softening points in the temperature range specified are, for example, low-foaming nonionic surfactants which may be solid or highly viscous at room temperature. When nonionic surfactants which have a high viscosity at room temperature are used, they preferably have a viscosity above 20 Pas, preferably above 35 Pas and in particular above 40 Pas. Nonionic surfactants which have a waxlike consistency at room temperature are also preferred.

Nonionic surfactants which are solid at room temperature and are to be used with preference stem from the groups of alkoxylated nonionic surfactants, in particular the ethoxylated primary alcohols and mixtures of these surfactants with structurally complex surfactants, such as polyoxypropylene/polyoxyethylene/polyoxypropylene (PO/EO/PO) surfactants. Such (PO/EO/PO) nonionic surfactants are additionally notable for good foam control.

In a preferred embodiment of the present invention, the nonionic surfactant with a melting point above room temperature is an ethoxylated nonionic surfactant which has resulted from the reaction of a monohydroxyalkanol or alkylphenol having from 6 to 20 carbon atoms with preferably at least 12 mol, more preferably at least 15 mol, in particular at least 20 mol, of ethylene oxide per mole of alcohol or alkylphenol.

A nonionic surfactant which is solid at room temperature and is to be used with particular preference is obtained from a straight-chain fatty alcohol having from 16 to 20 carbon atoms ($C_{16-20}$-alcohol), preferably a $C_{18}$-alcohol, and at least 12 mol, preferably at least 15 mol and in particular at least 20 mol, of ethylene oxide. Of these, the "narrow range ethoxylates" (see above) are particularly preferred.

Accordingly, particularly preferred inventive compositions comprise ethoxylated nonionic surfactant(s) which has/have been obtained from $C_{6-20}$-monohydroxyalkanols or $C_{6-20}$-alkylphenols or $C_{16-20}$-fatty alcohols and more than 12 mol, preferably more than 15 mol and in particular more than 20 mol, of ethylene oxide per mole of alcohol.

The nonionic surfactant preferably additionally has propylene oxide units in the molecule. Preferably, such PO units make up up to 25% by weight, more preferably up to 20% by weight and in particular up to 15% by weight, of the total molar mass of the nonionic surfactant. Particularly preferred nonionic surfactants are ethoxylated monohydroxyalkanols or alkylphenols which additionally have polyoxyethylene-polyoxypropylene block copolymer units. The alcohol or alkylphenol moiety of such nonionic surfactant molecules preferably makes up more than 30% by weight, more preferably more than 50% by weight and in particular more than 70% by weight, of the total molar mass of such nonionic surfactants. Preferred detergent compositions are characterized in that they comprise ethoxylated and propoxylated nonionic surfactants in which the propylene oxide units in the molecule make up up to 25% by weight, preferably up to 20% by weight and in particular up to 15% by weight, of the total molar mass of the nonionic surfactant.

Further nonionic surfactants which have melting points above room temperature and are to be used with particular preference contain from 40 to 70% of a polyoxypropylene/polyoxyethylene/polyoxypropylene block polymer blend which contains 75% by weight of an inverse block copolymer of polyoxyethylene and polyoxypropylene having 17 mol of ethylene oxide and 44 mol of propylene oxide, and 25% by weight of a block copolymer of polyoxyethylene and polyoxypropylene initiated with trimethylolpropane and containing 24 mol of ethylene oxide and 99 mol of propylene oxide per mole of trimethylolpropane.

Nonionic surfactants which can be used with particular preference, are obtainable, for example, under the name Poly Tergent® SLF-18 from Olin Chemicals.

A further preferred inventive detergent composition comprises nonionic surfactants of the formula

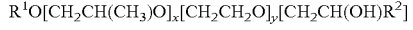

in which $R^1$ is a linear or branched aliphatic hydrocarbon radical having from 4 to 18 carbon atoms or mixtures thereof, $R^2$ is a linear or branched hydrocarbon radical having from 2 to 26 carbon atoms or mixtures thereof, and x is a value between 0.5 and 1.5, and y is a value of at least 15.

Further nonionic surfactants which can be used with preference are the terminally capped poly(oxyalkylated) nonionic surfactants of the formula

in which $R^1$ and $R^2$ are linear or branched, saturated or unsaturated, aliphatic or aromatic hydrocarbon radicals having from 1 to 30 carbon atoms, $R^3$ is H or a methyl, ethyl, n-propyl, isopropyl, n-butyl, 2-butyl or 2-methyl-2-butyl radical, x is a value between 1 and 30, k and j are values between 1 and 12, preferably between 1 and 5. When the value x is ≧2, each $R^3$ in the above formula may be different. $R^1$ and $R^2$ are preferably linear or branched, saturated or unsaturated, aliphatic or aromatic hydrocarbon radicals having from 6 to 22 carbon atoms, particular preference being given to radicals having from 8 to 18 carbon atoms. For the $R^3$ radical, particular preference is given to H, —CH$_3$ or —CH$_2$CH$_3$. Particularly preferred values for x are in the range from 1 to 20, in particular from 6 to 15.

As described above, each $R^3$ in the above formula may be different if x is ≧2. This allows the alkylene oxide unit in the square brackets to be varied. When x is, for example, 3, the $R^3$ radical may be selected so as to form ethylene oxide ($R^3$=H) or propylene oxide ($R^3$=CH$_3$) units which can be joined together in any sequence, for example (EO)(PO)(EO), (EO)(EO)(PO), (EO)(EO)(EO), (PO)(EO)(PO), (PO)(PO)(EO) and (PO)(PO)(PO) The value 3 for x is selected here by way of example and it is entirely possible for it to be larger, the scope of variation increasing with increasing x values and embracing, for example, a large number of (EO) groups combined with a small number of (PO) groups, or vice versa.

Especially preferred terminally capped poly-(oxyalkylated) alcohols of the above formula have values of k=1 and j=1, so that the above formula is simplified to

R$^1$O[CH$_2$CH(R$^3$)O]$_x$CH$_2$CH(OH)CH$_2$OR$^2$.

In the latter formula, $R^1$, $R^2$ and $R^3$ are each as defined above and x is a number from 1 to 30, preferably from 1 to 20 and in particular from 6 to 18. Particular preference is given to surfactants in which the $R^1$ and $R^2$ radicals have from 9 to 14 carbon atoms, $R^3$ is H and x assumes values of from 6 to 15.

If the latter statements are summarized, preference is given to inventive detergent compositions which comprise terminally capped poly(oxyalkylated) nonionic surfactants of the formula

R$^1$O[CH$_2$CH(R$^3$)O]$_x$[CH$_2$]$_k$CH(OH)[CH$_2$]$_j$OR$^2$ in which $R^1$ and $R^2$ are linear or branched, saturated or unsaturated, aliphatic or aromatic hydrocarbon radicals having from 1 to 30 carbon atoms, $R^3$ is H or a methyl, ethyl, n-propyl, isopropyl, n-butyl, 2-butyl or 2-methyl-2-butyl radical, x is a value between 1 and 30, k and j are values between 1 and 12, preferably between 1and 5, particular preference being given to surfactants of the

R$^1$O[CH$_2$CH(R$^3$)O]$_x$CH$_2$CH(OH)CH$_2$OR$^2$ type in which x is a number from 1 to 30, preferably from 1 to 20 and in particular from 6 to 18.

In conjunction with the surfactants mentioned, it is also possible, in particular in textile detergents, to use anionic, cationic and/or amphoteric surfactants, but, owing to their foaming behavior, they are only of minor importance in machine dishwashing detergents and in most cases are used only in amounts below 10% by weight, usually even below 5% by weight, for example from 0.01 to 2.5% by weight, based in each case on the composition. The inventive compositions can thus also comprise anionic, cationic and/or amphoteric surfactants as the surfactant component.

The anionic surfactants used are, for example, those of the sulfonate and sulfate type. Useful surfactants of the sulfonate type are preferably $C_{9-13}$-alkylbenzenesulfonates, olefinsulfonates, i.e. mixtures of alkene- and hydroxyalkanesulfonates, and disulfonates, as are obtained, for example, from $C_{12-18}$-monoolefins with terminal or internal double bond by sulfonation with gaseous sulfur trioxide and subsequent alkaline or acidic hydrolysis of the sulfonation products. Also suitable are alkanesulfonates which are obtained from $C_{12-18}$-alkanes, for example by sulfochlorination or sulfoxidation with subsequent hydrolysis or neutralization. The esters of α-sulfo fatty acids (ester sulfonates), e.g. the α-sulfonated methyl esters of hydrogenated coconut, palm kernel or tallow fatty acids are also likewise suitable.

Further suitable anionic surfactants are sulfated fatty acid glycerol esters. Fatty acid glycerol esters refer to the mono-, di- and triesters, and mixtures thereof, as are obtained in the preparation by esterification of a monoglycerol with from 1 to 3 mol of fatty acid or in the transesterification of triglycerides with from 0.3 to 2 mol of glycerol. Preferred sulfated fatty acid glycerol esters are the sulfation products of saturated fatty acids having from 6 to 22 carbon atoms, for example of caproic acid, caprylic acid, capric acid, myristic acid, lauric acid, palmitic acid, stearic acid or behenic acid.

Preferred alk(en)yl sulfates are the alkali metal and in particular the sodium salts of the sulfuric monoesters of $C_{12}$-$C_{18}$ fatty alcohols, for example of coconut fatty alcohol, tallow fatty alcohol, lauryl, myristyl, cetyl or stearyl alcohol, or of $C_{10}$-$C_{20}$ oxo alcohols and those monoesters of secondary alcohols of these chain lengths. Also preferred are alk(en)yl sulfates of the chain length mentioned which contain a synthetic straight-chain alkyl radical prepared on a petrochemical basis and which have analogous degradation behavior to the equivalent compounds based on fatty chemical raw materials. From the washing point of view, preference is given to the $C_{12}$-$C_{16}$-alkyl sulfates and $C_{12}$-$C_{15}$-alkyl sulfates, and $C_{14}$-$C_{15}$-alkyl sulfates. 2,3-Alkyl sulfates, which can be obtained as commercial products from the Shell Oil Company under the name DAN® are also suitable anionic surfactants.

Also suitable are the sulfuric monoesters of the straight-chain or branched $C_{7-21}$-alcohols ethoxylated with 1 to 6 mol of ethylene oxide, such as 2-methyl-branched $C_{9-11}$-alcohols, with on average 3.5 mol of ethylene oxide (EO) or $C_{12-18}$-fatty alcohols with from 1 to 4 EO. Owing to their high tendency to foam, they are used in detergents only in relatively small amounts, for example in amounts of from 1 to 5% by weight.

Further suitable anionic surfactants are also the salts of alkylsulfosuccinic acid, which are also referred to as sulfosuccinates or as sulfosuccinic esters and are the monoesters and/or diesters of sulfosuccinic acid with alcohols, preferably fatty alcohols and in particular ethoxylated fatty alcohols. Preferred sulfosuccinates contain $C_{8-18}$ fatty alcohol radicals or mixtures thereof. Especially preferred sulfosuccinates contain a fatty alcohol radical which is derived from ethoxylated fatty alcohols which, considered alone, constitute nonionic surfactants (for description see below). In this context, particular preference is again given to sulfosuccinates whose fatty alcohol radicals are derived from ethoxylated fatty alcohols with a narrowed homolog distribution. It is also equally possible to use alk(en)ylsuccinic acid having preferably from 8 to 18 carbon atoms in the alk(en)yl chain or salts thereof.

Suitable further anionic surfactants are in particular soaps. Suitable soaps are saturated fatty acid soaps, such as the salts of lauric acid, myristic acid, palmitic acid, stearic acid, hydrogenated erucic acid and behenic acid, and soap mixtures derived in particular from natural fatty acids, for example coconut, palm kernel or tallow fatty acids.

The anionic surfactants including the soaps may be present in the form of their sodium, potassium or ammonium salts, and also in the form of soluble salts of organic bases, such as mono-, di- or triethanolamine. The anionic surfactants are preferably present in the form of their sodium or potassium salts, in particular in the form of the sodium salts.

As cationic active substances, the inventive compositions may, for example, comprise cationic compounds of the formulae V, VI or VII:

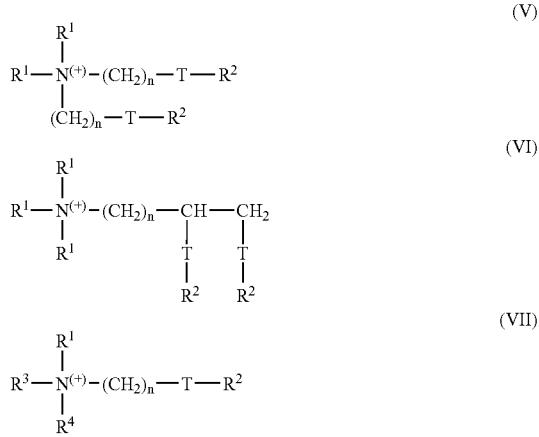

in which each $R^1$ group is independently selected from $C_{1-6}$-alkyl, -alkenyl or -hydroxyalkyl groups; each $R^2$ group is independently selected from $C_{8-28}$-alkyl or -alkenyl groups; $R^3=R^1$ or $(CH_2)_n$-T-$R^2$; $R^4=R^1$ or $R^2$ or $(CH_2)_n$-T-$R^2$; T=—$CH_2$—, —O—CO— or —CO—O— and n is an integer from 0 to 5.

In addition to the surfactants and builders, bleaches, bleach activators, enzymes, silver protectants, dyes and fragrances, etc., in particular are preferred ingredients of machine dishwasher detergents. In addition, further ingredients may be present, preference being given to inventive machine dishwasher detergents which additionally comprise one or more substances from the group of acidifiers, chelate complexing agents or of film-inhibiting polymers.

Useful acidifiers are both inorganic acids and also organic acids, as long as they are compatible with the other ingredients. For reasons of consumer protection and of handling safety, the solid mono-, oligo- and polycarboxylic acids in particular can be used. From this group preference is given in turn to citric acid, tartaric acid, succinic acid, malonic acid, adipic acid, maleic acid, fumaric acid, oxalic acid, and polyacrylic acid. The anhydrides of these acids can also be used as acidifiers, and maleic anhydride and succinic anhydride in particular are commercially available. Organic sulfonic acids, such as amidosulfonic acid, can likewise be used. A substance which is commercially available and can likewise be used with preference as an acidifier in the context of the present invention is Sokalan® DCS (trade mark of BASF), a mixture of succinic acid (max. 31% by weight), glutaric acid (max. 50% by weight) and adipic acid (max. 33% by weight).

A further possible group of ingredients is that of the chelate complexing agents. Chelate complexing agents are substances which form cyclic compounds with metal ions, an individual ligand occupying more than one coordination site on a central atom, i.e. being at least "bidentate". In this case, normally extended compounds are thus closed to give rings by complex formation via an ion. The number of bound ligands depends on the coordination number of the central ion.

Chelate complexing agents which are customary and preferred in the context of the present invention are, for example, polyoxycarboxylic acids, polyamines, ethylenediaminetetraacetic acid (EDTA) and nitrilotriacetic acid (NTA). Also usable in accordance with the invention are complex-forming polymers, i.e. polymers which bear functional groups either in the main chain itself or pendent to it, which can act as ligands and react with suitable metal atoms generally to form chelate complexes. The polymer-bound ligands of the resulting metal complexes can stem from just one macromolecule or else belong to different polymer chains. The latter leads to the crosslinking of the material when the complex-forming polymers have not already been crosslinked beforehand via covalent bonds.

Complexing groups (ligands) of customary complex-forming polymers are iminodiacetic acid, hydroxyquinoline, thiourea, guanidine, dithiocarbamate, hydroxamic acid, amidoxime, aminophosphoric acid, (cyclic) polyamino, mercapto, 1,3-dicarbonyl and crown ether radicals, some of which have very specific activities toward ions of different metals. Basis polymers of many complex-forming polymers, which are also commercially significant, are polystyrene, polyacrylates, polyacrylonitriles, polyvinyl alcohols, polyvinylpyridines and polyethylenimines. Natural polymers, such as cellulose, starch or chitin are also complex-forming polymers. In addition, they may be provided with further ligand functionalities as a result of polymer-analogous modifications.

In the context of the present invention, particular preference is given to machine dishwashing detergents which contain one or more chelate complexing agents from the groups of
(i) polycarboxylic acids in which the sum of the carboxyl and any hydroxyl groups is at least 5,
(ii) nitrogen-containing mono- or polycarboxylic acids,
(iii) geminal diphosphonic acids,
(iv) aminophosphonic acids,
(v) phosphonopolycarboxylic acids,
(vi) cyclodextrins in amounts above 0.1% by weight, preferably above 0.5% by weight, more preferably above 1% by weight and in particular above 2.5% by weight, based in each case on the weight of the dishwashing detergent.

In the context of the present invention, it is possible to use all complexing agents of the prior art. These may belong to different chemical groups. Preference is given to using the following, individually or in a mixture with one another:
a) polycarboxylic acids in which the sum of the carboxyl and any hydroxyl groups is at least 5, such as gluconic acid,
b) nitrogen-containing mono- or polycarboxylic acids, such as ethylenediaminetetraacetic acid (EDTA), N-hydroxyethylethylenediaminetriacetic acid, diethylenetriaminepentaacetic acid, hydroxyethyliminodiacetic acid, nitridodiacetic acid-3-propionic acid, isoserinediacetic acid, N,N-di(β-hydroxyethyl)glycine, N-(1,2-dicarboxy-2-hydroxyethyl)glycine, N-(1,2-dicarboxy-2-hydroxyethyl)aspartic acid or nitrilotriacetic acid (NTA),
c) geminal diphosphonic acids, such as 1-hydroxyethane-1,1-diphosphonic acid (HEDP), higher homologs thereof having up to 8 carbon atoms, and hydroxyl- or amino-containing derivatives thereof and 1-aminoethane-1,1-diphosphonic acid, higher homologs thereof having up to 8 carbon atoms, and hydroxyl- or amino-containing derivatives thereof, d) aminophosphonic acids, such as ethylenediaminetetra (methylenephosphonic acid), diethylenetriaminepenta (methylenephosphonic acid) or nitrilotri(methylenephosphonic acid), e) phosphonopolycarboxylic acids, such as 2-phosphonobutane-1,2,4-tricarboxylic acid, and f) cyclodextrins.

In the context of this patent application, polycarboxylic acids a) refer to carboxylic acids, including monocarboxylic acids, in which the sum of carboxyl and the hydroxyl groups present in the molecule is at least 5. Preference is given to complexing agents from the group of nitrogen-containing polycarboxylic acids, in particular EDTA. At the alkaline pH values of the treatment solutions required in accordance with the invention, these complexing agents are at least partially in the form of anions. It is unimportant whether they are introduced in the form of acids or in the form of salts. In the case of use in the form of salts, preference is given to alkali metal, ammonium or alkylammonium salts, in particular sodium salts.

Film-inhibiting polymers may likewise be present in the inventive compositions. These substances, which may have chemically different structures, stem, for example, from the groups of low molecular weight polyacrylates, having molar masses between 1000 and 20,000 daltons, and preference is given to polymers with molar masses below 15,000 daltons.

Film-inhibiting polymers may also have cobuilder properties. Organic cobuilders which may find use in the inventive machine dishwashing detergents are in particular polycarboxylates/polycarboxylic acids, polymeric polycarboxylates, aspartic acid, polyacetals, dextrins, further organic cobuilders (see below) and phosphonates. These substance classes are described below.

Organic builder substances which can be used are, for example, the polycarboxylic acids usable in the form of their sodium salts, polycarboxylic acids referring to carboxylic acids which bear more than one acid function. Examples of these are citric acid, adipic acid, succinic acid, glutaric acid, malic acid, tartaric acid, maleic acid, fumaric acid, sugar acids, aminocarboxylic acids, nitrilotriacetic acid (NTA), as long as such a use is not objectionable on ecological grounds, and mixtures thereof. Preferred salts are the salts of the polycarboxylic acids such as citric acid, adipic acid, succinic acid, glutaric acid, tartaric acid, sugar acids and mixtures thereof.

The acids themselves may also be used. In addition to their builder action, the acids typically also have the property of an acidifying component and thus also serve to establish a lower and milder pH of detergents. In this connection, particular mention should be made of citric acid, succinic acid, glutaric acid, adipic acid, gluconic acid and any mixtures thereof.

Also suitable as builders or scale inhibitors are polymeric polycarboxylates; these are, for example, the alkali metal salts of polyacrylic acid or of polymethacrylic acid, for example those having a relative molecular mass of from 500 to 70,000 g/mol.

In the context of this document, the molar masses specified for polymeric polycarboxylates are weight-average molar masses $M_w$ of the particular acid form, always having been determined by means of gel-permeation chromatography (GPC) using a UV detector. The measurement was made against an external polyacrylic acid standard which, owing to its structural similarity to the polymers under investigation, affords realistic molar weight values. These figures deviate considerably from the molar weight data obtained when polystyrenesulfonic acids are used as the standard. The molar masses measured against polystyrenesulfonic acids are generally distinctly higher than the molar masses specified in this document.

Suitable polymers are in particular polyacrylates which preferably have a molecular mass of from 2000 to 20,000 g/mol. Owing to their superior solubility, preference within this group may be given in turn to the short-chain polyacrylates which have molar masses of from 2000 to 10,000 g/mol and more preferably from 3000 to 5000 g/mol.

Also suitable are copolymeric polycarboxylates, especially those of acrylic acid with methacrylic acid and of acrylic acid or methacrylic acid with maleic acid. Copolymers which have been found to be particularly suitable are those of acrylic acid with maleic acid which contain from 50 to 90% by weight of acrylic acid and 50 to 10% by weight of maleic acid. Their relative molecular mass, based on free acids, is generally from 2000 to 70,000 g/mol, preferably from 20,000 to 50,000 g/mol and in particular from 30,000 to 40,000 g/mol.

The (co)polymeric polycarboxylates can either be used in the form of powders or in the form of aqueous solutions. The (co)polymeric polycarboxylate content of the compositions is preferably from 0.5 to 20% by weight, in particular from 3 to 10% by weight.

Also especially preferred are biodegradable polymers composed of more than two different monomer units, for example those which contain, as monomers, salts of acrylic acid or of maleic acid, and vinyl alcohol or vinyl alcohol derivatives, or those which contain, as monomers, salts of acrylic acid and of 2-alkylallyl-sulfonic acid, and sugar derivatives. Further preferred copolymers are those which preferably have, as monomers, acrolein and acrylic acid/acrylic acid salts or acrolein and vinyl acetate.

Further preferred builder substances which should likewise be mentioned are polymeric aminodicarboxylic acids, salts thereof or precursor substances thereof. Particular preference is given to polyaspartic acids or salts and derivatives thereof, which also have a bleach-stabilizing effect in addition to cobuilder properties.

Further suitable builder substances are polyacetals which can be obtained by reacting dialdehydes with polyolcarboxylic acids which have from 5 to 7 carbon atoms and at least 3 hydroxyl groups. Preferred polyacetals are obtained from dialdehydes such as glyoxal, glutaraldehyde, terephthalaldehyde, and mixtures thereof, and from polyolcarboxylic acids such as gluconic acid and/or glucoheptonic acid.

Further suitable organic builder substances are dextrins, for example oligomers or polymers of carbohydrates, which can be obtained by partial hydrolysis of starches. The hydrolysis can be carried out by customary, for example-acid-catalyzed or enzyme-catalyzed, processes. The hydrolysis products preferably have average molar masses in the range from 400 to 500,000 g/mol. Preference is given to a polysaccharide having a dextrose equivalent (DE) in the range from 0.5 to 40, in particular from 2 to 30, where DE is a common measure of the reducing action of a polysaccharide compared to dextrose, which has a DE of 100. It is also possible to use maltodextrins with a DE between 3 and 20 and dry glucose syrups with a DE between 20 and 37, and also yellow dextrins and white dextrins having relatively high molar masses in the range from 2000 to 30,000 g/mol.

The oxidized derivatives of such dextrins are their reaction products with oxidizing agents which are capable of oxidizing at least one alcohol function of the saccharide ring to the carboxylic acid function. A product oxidized on $C_6$ of the saccharide ring may be particularly advantageous.

Oxydisuccinates and other derivatives of disuccinates, preferably ethylenediamine disuccinate, are also further suitable cobuilders. In this case, ethylenediamine N,N'-disuccinate (EDDS) is preferably used in the form of its sodium or magnesium salts. In this connection, preference is also given to glycerol disuccinates and glycerol trisuccinates. Suitable use amounts in zeolite-containing and/or silicate-containing formulations are from 3 to 15% by weight.

Further organic cobuilders which can be used are, for example, acetylated hydroxycarboxylic acids or salts thereof, which may also be present in lactone form and which contain at least 4 carbon atoms and at least one hydroxyl group and a maximum of two acid groups.

A further class of substances having cobuilder properties is that of the phosphonates. These are in particular hydroxyalkane- and aminoalkanephosphonates. Among the hydroxyalkanephosphonates, 1-hydroxyethane-1,1-diphosphonate (HEDP) is of particular significance as a cobuilder. It is preferably used in the form of the sodium salt, the disodium salt giving a neutral reaction and the tetrasodium salt an alkaline reaction (pH 9). Useful aminoalkanephosphonates are preferably ethylenediaminetetramethylenephosphonate (EDTMP), diethylenetriaminepentamethylenephosphonate (DTPMP) and higher homologs thereof. They are preferably used in the form of the neutrally reacting sodium salts, for example as the hexasodium salt of EDTMP or as the hepta- and octasodium salt of DTPMP. From the class of the phosphonates, preference is given to using HEDP as a builder. In addition, the aminoalkanephosphonates have a marked heavy metal-binding capacity. Accordingly, especially when the compositions also comprise bleaches, it may be preferable to use aminoalkanephosphonates, especially DTPMP, or mixtures of the phosphonates mentioned.

The inventive portioned compositions may additionally comprise copolymers of unsaturated carboxylic acids, monomers containing sulfonic acid groups and optionally further ionic or nonionogenic monomers. These copolymers have the effect that the dishes treated with such compositions become distinctly cleaner in the course of subsequent cleaning operations than dishes which have been washed with conventional compositions. An additional positive effect which arises is a shortening of the drying time of the dishes treated with the detergent, i.e. the consumer can then take the dishes out of the machine sooner and reuse them after the cleaning program has finished.

The invention is characterized by improved "cleanability" of the treated substrates in the course of later cleaning operations and by a considerable shortening of the drying time compared with comparable compositions without the use of polymers containing sulfonic acid groups. In the context of the inventive teaching, drying time is generally understood as having the literal meaning of the word, i.e. the time which lapses before a surface of dishes treated in a dishwasher has dried, but in particular the time which lapses before 90% of a surface treated with a detergent or a rinse aid in concentrated or dilute form has dried.

It is also advantageous that the polymers mentioned act in suitable amounts as a salt replacement. When such compositions are used, the consumer does not have to replenish the regenerating salt supply of his/her dishwasher but nevertheless obtains streak-free, mark-free and film-free dishes.

In the context of the present invention, preference is given to unsaturated carboxylic acids of the formula VIII as a monomer $$R^1(R^2)C=C(R^3)COOH \quad \text{(VIII)}$$

in which $R^1$ to $R^3$ are each independently —H, —$CH_3$, a straight-chain or branched saturated alkyl radical having from 2 to 12 carbon atoms, a straight-chain or branched, mono- or polyunsaturated alkenyl radical having from 2 to 12 carbon atoms, alkyl or alkenyl radicals as defined above and substituted by —$NH_2$, —OH or —COOH, or are —COOH or —COOR$^4$ where $R^4$ is a saturated or unsaturated, straight-chain or branched hydrocarbon radical having from 1 to 12 carbon atoms.

Among the unsaturated carboxylic acids which can be described by the formula I, preference is given in particular to acrylic acid ($R^1=R^2=R^3=H$), methacrylic acid ($R^1=R^2=H; R^3=CH_3$) and/or maleic acid ($R^1=COOH; R^2=R^3=H$).

The monomers containing sulfonic acid groups are preferably those of the formula IX $$R^5(R^6)C=C(R^7)—X—SO_3H \quad \text{(IX)}$$

in which $R^5$ to $R^7$ are each independently —H, —$CH_3$, a straight-chain or branched saturated alkyl radical having from 2 to 12 carbon atoms, a straight-chain or branched, mono- or polyunsaturated alkenyl radical having from 2 to 12 carbon atoms, alkyl or alkenyl radicals as defined above and substituted by —$NH_2$, —OH or —COOH, or are —COOH or —COOR$^4$ where $R^4$ is a saturated or unsaturated, straight-chain or branched hydrocarbon radical having from 1 to 12 carbon atoms, and X is an optionally present spacer group which is selected from —$(CH_2)_n$— where n=from 0 to 4, —COO—$(CH_2)_k$— where k=from 1 to 6, —C(O)—NH—C(CH$_3$)$_2$— and —C(O)—NH—CH(CH$_2$CH$_3$)—.

Among these monomers, preference is given to those of the formulae IXa, IXb and/or IXc $$H_2C=CH—X—SO_3H \quad \text{(IXa)}$$

$$H_2C=C(CH_3)—X—SO_3H \quad \text{(IXb)}$$

$$HO_3S—X—(R^6)C=C(R^7)—X—SO_3H \quad \text{(IXc)}$$

in which $R^6$ and $R^7$ are each independently selected from —H, —$CH_3$, —$CH_2CH_3$, —$CH_2CH_2CH_3$, —$CH(CH_3)_2$ and X is an optionally present spacer group which is selected from —$(CH_2)_n$— where n=from 0 to 4, —COO—$(CH_2)_k$— where k=from 1 to 6, —C(O)—NH—C(CH$_3$)$_2$— and —C(O)—NH—CH(CH$_2$CH$_3$)—.

Particularly preferred monomers containing sulfonic acid groups are 1-acrylamido-1-propanesulfonic acid (X=—C(O)NH—CH(CH$_2$CH$_3$) in formula IXa), 2-acrylamido-2-propanesulfonic acid (X=—C(O)NH—C(CH$_3$)$_2$ in formula IXa), 2-acrylamido-2-methyl-1-propanesulfonic acid (X=—C(O)NH—CH(CH$_3$)CH$_2$— in formula IXa), 2-methacrylamido-2-methyl-1-propanesulfonic acid (X=—C(O)NH—CH(CH$_3$)CH$_2$— in formula IXb), 3-methacrylamido-2-hydroxypropanesulfonic acid. (X=—C(O)NH—CH$_2$CH(OH)CH$_2$ in formula IXb), allylsulfonic acid (X=CH$_2$ in formula IXa), methallylsulfonic acid (X=CH$_2$ in formula IXb), allyloxybenzenesulfonic acid (X=—CH$_2$—O—C$_6$H$_4$— in formula IXa), methallyloxybenzenesulfonic acid (X=—CH$_2$—O—C$_6$H$_4$— in formula IXb), 2-hydroxy-3-(2-propenyloxy)propanesulfonic acid, 2-methyl-2-propene-1-sulfonic acid (X=CH$_2$ in formula IXb), styrenesulfonic acid (X=C$_6$H$_4$ in formula IXa), vinylsulfonic acid (X not present in formula IXa), 3-sulfopropyl acrylate (X=—C(O)NH—CH$_2$CH$_2$CH$_2$— in formula IXa), 3-sulfopropyl methacrylate (X=—C(O)NH—CH$_2$CH$_2$CH$_2$— in formula IXb), sulfomethacrylamide (X=—C(O)NH— in formula IXb), sulfomethylmethacrylamide (X=—C(O)NH—CH$_2$— in formula IXb) and water-soluble salts of the acids mentioned.

Useful further ionic or nionogenic monomers are in particular ethylenically unsaturated compounds. The content of monomers of group iii) in the polymers used in accordance with the invention is preferably less than 20% by weight, based on the polymer. Polymers to be used more preferably consist only of monomers of groups i) and ii).

In summary, particular preference is given to copolymers of
i) unsaturated carboxylic acids of the formula VIII

$$R^1(R^2)C=C(R^3)COOH \quad (VIII)$$

in which $R^1$ to $R^3$ are each independently —H, —CH$_3$, a straight-chain or branched saturated alkyl radical having from 2 to 12 carbon atoms, a straight-chain or branched, mono- or polyunsaturated alkenyl radical having from 2 to 12 carbon atoms, alkyl or alkenyl radicals as defined above and substituted by —NH$_2$, —OH or —COOH, or are —COOH or —COOR$^4$ where $R^4$ is a saturated or unsaturated, straight-chain or branched hydrocarbon radical having from 1 to 12 carbon atoms,
  ii) monomers of the formula IX containing sulfonic acid groups

$$R^5(R^6)C=C(R^7)—X—SO_3H \quad (IX)$$

in which $R^5$ to $R^7$ are each independently —H, —CH$_3$, a straight-chain or branched saturated alkyl radical having from 2 to 12 carbon atoms, a straight-chain or branched, mono- or polyunsaturated alkenyl radical having from 2 to 12 carbon atoms, alkyl or alkenyl radicals as defined above and substituted by —NH$_2$, —OH or —COOH, or are —COOH or —COOR$^4$ where $R^4$ is a saturated or unsaturated, straight-chain or branched hydrocarbon radical having from 1 to 12 carbon atoms, and X is an optionally present spacer group which is selected from —(CH$_2$)$_n$— where n=from 0 to 4, —COO—(CH$_2$)$_k$— where k=from 1 to 6, —C(O)—NH—C(CH$_3$)$_2$— and —C(O)—NH—CH (CH$_2$CH$_3$)—
  iii) optionally further ionic or nionogenic monomers.
Particularly preferred copolymers consist of
  i) one or more unsaturated carboxylic acids from the group of acrylic acid, methacrylic acid and/or maleic acid,
  ii) one or more monomers containing sulfonic acid groups of the formulae IXa, IXb and/or IXc:

$$H_2C=CH—X—SO_3H \quad (IXa)$$

$$H_2C=C(CH_3)—X—SO_3H \quad (IXb)$$

$$HO_3S—X—(R^6)C=C(R^7)—X—SO_3H \quad (IXc)$$

in which $R^6$ and $R^7$ are each independently selected from —H, —CH$_3$, —CH$_2$CH$_3$, —CH$_2$CH$_2$CH$_3$, —CH(CH$_3$)$_2$ and X is an optionally present spacer group which is selected from —(CH$_2$)$_n$— where n=from 0 to 4, —COO—(CH$_2$)$_k$— where k=from 1 to 6, —C(O)—NH—C(CH$_3$)$_2$— and —C(O)—NH—CH (CH$_2$CH$_3$)—
  iii) optionally further ionic or nionogenic monomers.
The copolymers present in the compositions in accordance with the invention may comprise the monomers from groups i) and ii) and optionally iii) in varying amounts, and it is possible to combine any of the representatives from group i) with any of the representatives from group ii) and any of the representatives from group iii). Particularly preferred polymers have certain structural units which are described below.

Thus, preference is given, for example, to inventive compositions which are characterized in that they comprise one or more copolymers which contain structural units of the formula X

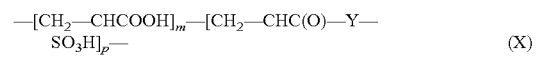
$$—[CH_2—CHCOOH]_m—[CH_2—CHC(O)—Y—SO_3H]_p— \quad (X)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—.

These polymers are prepared by copolymerization of acrylic acid with an acrylic acid derivative containing sulfonic acid groups. Copolymerizing the acrylic acid derivative containing sulfonic acid groups with methacrylic acid leads to another polymer, the use of which in the inventive compositions is likewise preferred and which is characterized in that the compositions comprise one or more copolymers which contain structural units of the formula XI

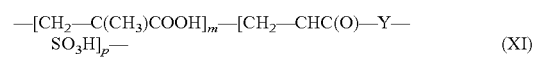
$$—[CH_2—C(CH_3)COOH]_m—[CH_2—CHC(O)—Y—SO_3H]_p— \quad (XI)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—.

Acrylic acid and/or methacrylic acid can also be copolymerized entirely analogously with methacrylic acid derivatives containing sulfonic acid groups, which changes the structural units within the molecule. Thus, inventive compositions which comprise one or more copolymers which contain structural units of the formula XII

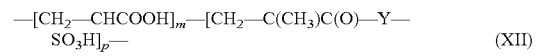
$$—[CH_2—CHCOOH]_m—[CH_2—C(CH_3)C(O)—Y—SO_3H]_p— \quad (XII)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—, are likewise a preferred embodiment of the present invention, just like compositions which are characterized in that they comprise one or more copolymers which contain structural units of the formula XIII

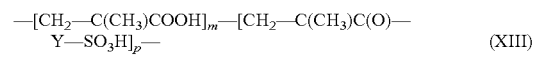
$$—[CH_2—C(CH_3)COOH]_m—[CH_2—C(CH_3)C(O)—Y—SO_3H]_p— \quad (XIII)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—.

Instead of acrylic acid and/or methacrylic acid, or in addition thereto, it is also possible to use maleic acid as a particularly preferred monomer from group i). This leads to compositions preferred in accordance with the invention which are characterized in that they comprise one or more copolymers which contain structural units of the formula XIV $$—[HOOCCH—CHCOOH]_m—[CH_2—CHC(O)—Y—SO_3H]_p— \quad (XIV)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—, and to compositions which are characterized in that they comprise one or more copolymers which contain structural units of the formula XV $$—[HOOCCH—CHCOOH]_m—[CH_2—C(CH_3)C(O)O—Y—SO_3H]_p— \quad (XV)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—.

In summary, preference is given to machine dishwashing detergents according to the invention which comprise, as ingredient b), one or more copolymers which contain structural units of the formulae X and/or XI and/or XII and/or XIII and/or XIV and/or XV $$—[CH_2—CHCOOH]_m—[CH_2—CHC(O)—Y—SO_3H]_p— \quad (X)$$

$$—[CH_2—C(CH_3)COOH]_m—[CH_2—CHC(O)—Y—SO_3H]_p— \quad (XI)$$

$$—[CH_2—CHCOOH]_m—[CH_2—C(CH_3)C(O)—Y—SO_3H]_p— \quad (XII)$$

$$—[CH_2—C(CH_3)COOH]_m—[CH_2—C(CH_3)C(O)—Y—SO_3H]_p— \quad (XIII)$$

$$—[HOOCCH—CHCOOH]_m[CH_2—CHC(O)—Y—SO_3H]_p— \quad (XIV)$$

$$—[HOOCCH—CHCOOH]_m—[CH_2—C(CH_3)C(O)—Y—SO_3H]_p— \quad (XV)$$

in which m and p are each a whole natural number between 1 and 2000, and Y is a spacer group which is selected from substituted or unsubstituted, aliphatic, aromatic or araliphatic hydrocarbon radicals having from 1 to 24 carbon atoms, preference being given to spacer groups in which Y is —O—(CH$_2$)$_n$— where n=from 0 to 4, is —O—(C$_6$H$_4$)—, is —NH—C(CH$_3$)$_2$— or —NH—CH(CH$_2$CH$_3$)—.

In the polymers, some or all of the sulfonic acid groups may be in neutralized form, i.e. the acidic hydrogen atom of the sulfonic acid group may be replaced in some or all of the sulfonic acid groups by metal ions, preferably alkali metal ions and in particular by sodium ions. Corresponding compositions which are characterized in that the sulfonic acid groups within the copolymer are present in partially or completely neutralized form are preferred in accordance with the invention.

The monomer distribution of the copolymers used in the inventive compositions is, in the case of copolymers which contain only monomers from groups i) and ii), preferably in each case from 5 to 95% by weight of i) or ii), more preferably from 50 to 90% by weight of monomer from group i) and from 10 to 50% by weight of monomer from group ii), based in each case on the polymer.

In the case of terpolymers, particular preference is given to those which contain from 20 to 85% by weight of monomer from group i), from 10 to 60% by weight of monomer from group ii), and from 5 to 30% by weight of monomer from group iii).

The molar mass of the polymers used in the inventive compositions can be varied in order to adapt the properties of the polymers to the desired intended use.

Preferred machine dishwasher detergents are characterized in that the copolymers have molar masses of from 2000 to 200,000 gmol$^{-1}$, preferably from 4000 to 25,000 gmol$^{-1}$ and in particular from 5000 to 15,000 gmol$^{-1}$.

The content of one or more copolymers in the inventive compositions can vary depending on the intended use and desired product performance, and preferred inventive machine dishwashing detergents are characterized in that they contain the copolymer(s) in amounts of from 0.25 to 50% by weight, preferably from 0.5 to 35% by weight, more preferably from 0.75 to 20% by weight and in particular from 1 to 15% by weight.

For viscosity control, the inventive compositions may comprise further ingredients whose use allows, for example, the settling behavior or the pourability and/or flowability to be controlled in a targeted manner. In nonaqueous systems, combinations of structure-imparting agents and thickeners in particular have been found to be useful.

Machine dishwasher detergents preferred in the context of the present invention further contain a) from 0.1 to 1.0% by weight of one or more structure-imparting agents from the group of bentonites and/or at least partially etherified sorbitols and b) from 5.0 to 30% by weight of one or more thickeners from the group of carbonates, sulfates and amorphous or crystalline disilicates.

The structure-imparting agent a) stems from the group of the bentonites and/or at least partly etherified sorbitols. These substances are used in order to ensure the physical stability of the compositions and to adjust the viscosity. Although conventional thickening agents such as polyacrylates or polyurethanes do not work in nonaqueous media, it is possible to regulate the viscosity using the substances mentioned in the nonaqueous system.

Bentonites are contaminated clays which are formed as a result of the weathering of volcanic tuffs. Owing to their high content of montmorillonite, bentonites have valuable properties such as swellability, ion-exchange capacity and thixotropy. It is possible to modify the properties of the bentonites according to the intended use. Bentonites are often in the form of a clay constituent in tropical soils and are extracted in the form of sodium bentonite, e.g. in Wyoming, USA. Sodium bentonite has the most favorable performance properties (swellability), so that its use is preferred in the context of the present invention. Naturally occurring calcium bentonites originate, for example, from Mississippi, USA or Texas, USA or from Landshut, Germany. The naturally recovered calcium bentonites are converted artificially into the more swellable sodium bentonites by replacing calcium with sodium.

The main constituents of the bentonites are montmorillonites, which can also be used in pure form in the context of the present invention. Montmorillonites are clay minerals which belong to the phyllosilicates and here to the dioctahedral smectites, and which crystallize in a monoclinic, pseudohexagonal manner. Montmorillonites form predominantly white, gray-white to yellowish, readily friable masses which appear completely amorphous and which swell in water, but do not become plastic and which can be described by the general formulae

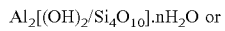
$Al_2[(OH)_2/Si_4O_{10}].nH_2O$ or

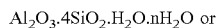
$Al_2O_3.4SiO_2.H_2O.nH_2O$ or

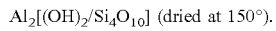
$Al_2[(OH)_2/Si_4O_{10}]$ (dried at 150°).

Preferred machine dishwasher detergents are characterized in that montmorillonites are used as structure-imparting agents. Montmorillonites have a three-layer structure which consists of two tetrahedron layers which are crosslinked electrostatically via the cations of an octahedron intermediate layer. The layers are not joined rigidly, but rather can swell as a result of reversible intercalation of water (in 2-7 times the amount) and other substances, for example alcohols, glycols, pyridine, α-picoline, ammonium compounds, hydroxy-aluminosilicate ions etc. The abovementioned formulae constitute only approximate formulae since montmorillonites have a large ion-exchange capacity. For instance, Al can be replaced by Mg, $Fe^{2+}$, $Fe^{3+}$, Zn, Cr, Cu and other ions. The consequence of such a substitution is that the layers are negatively charged, which is balanced by other cations, particularly $Na^+$ and $Ca^{2+}$.

In combination with the bentonites, or as a replacement for them when their use is not desired, it is possible to use at least partially etherified sorbitols as structure-imparting agents.

Sorbitol is a 6-hydric alcohol belonging to the hexitols (sugar alcohol), which intramolecularly eliminates one or two moles of water relatively readily and forms cyclic ethers (for example sorbitan and sorbide). The elimination of water is also possible intermolecularly, in which case noncyclic ethers form from sorbitol and the alcohols in question. Here too, the formation of monoethers and bisethers is possible, and it is also possible for higher degrees of etherification such as 3 and 4 to arise. At least partially etherified sorbitols to be used with preference in the context of the present invention are dietherified sorbitols, of which dibenzylidenesorbitol is particularly preferred. Preference is given here to machine dishwasher detergents which comprise dietherified sorbitols, in particular dibenzylidenesorbitol, as structure-imparting agent.

The inventive compositions can contain the structure-imparting agents in amounts of from 0.1 to 1.0% by weight, based on the overall composition and on the active substance of the structure-imparting agents. Preferred agents contain the structure-imparting agent in amounts of from 0.2 to 0.9% by weight, preferably in amounts of from 0.25 to 0.75% by weight and in particular in amounts of from 0.3 to 0.5% by weight, based in each case on the overall composition.

As thickeners, the preferred inventive compositions can comprise inorganic salts from the group of carbonates, sulfates and amorphous or crystalline disilicates. In principle, it is possible in this context to use the salts mentioned of all metals, of which preference is given to the alkali metal salts. Particularly preferred thickeners in the context of the present invention are alkali metal carbonate(s), alkali metal sulfate(s) and/or amorphous and/or crystalline alkali metal disilicate(s), preferably sodium carbonate, sodium sulfate and/or amorphous or crystalline sodium disilicate.

The preferred inventive compositions contain the thickeners in amounts of from 5 to 30% by weight, based on the overall composition. Particularly preferred compositions contain the thickener or the thickeners in amounts of from 7.5 to 28% by weight, preferably in amounts of from 10 to 26% by weight and in particular in amounts of from 12.5 to 25% by weight, based in each case on the overall composition.

With regard to an increased settling stability, it is preferred that the solids present in the inventive compositions are used in very finely divided form. This is advantageous especially in the case of the inorganic thickeners and in the case of the bleaches. Preference is given here to inventive machine dishwasher detergents in which the average particle size of the bleaches and thickeners, and of the optional builders to be used, is less than 75 μm, preferably less than 50 μm and in particular less than 25 μm.

To establish a higher viscosity which may be desired, the inventive liquid machine dishwasher detergents can also comprise other viscosity regulators and/or thickeners. All known thickeners can be used in this context, i.e. those based on natural or synthetic polymers.

Polymers which stem from nature and find use as thickeners are, for example, agar agar, carrageenan, tragacanth, gum arabic, alginates, pectins, polyoses, guar flour, carob seed flour, starch, dextrins, gelatin and casein.

Modified natural substances stem primarily from the group of modified starches and celluloses; carboxymethylcellulose and other cellulose ethers, hydroxyethylcellulose and hydroxypropylcellulose, and seed flour ethers are mentioned here by way of example.

Machine dishwasher detergents preferred in the context of the present invention contain, as thickeners, hydroxyethylcellulose and/or hydroxypropylcellulose, preferably in amounts of from 0.01 to 4.0% by weight, more preferably in amounts of from 0.01 to 3.0% by weight and in particular in amounts of from 0.01 to 2.0% by weight, based in each case on the overall composition.

A large group of thickeners which find wide use in very diverse fields of application are the fully synthetic polymers, such as polyacrylic and polymethacrylic compounds, vinyl polymers, polycarboxylic acids, polyethers, polyimines, polyamides and polyurethanes.

Thickeners from the substance classes mentioned are widely commercially available and are available, for example, under the trade names Acusol®-820 (methacrylic (stearyl alcohol-20-EO) ester-acrylic acid copolymer, 30% in water, Rohm & Haas), Dapral®-GT-282-S (alkyl polyglycol ether, Akzo), Deuterol®-Polymer-11 (dicarboxylic acid copolymer, Schöner GmbH), Deuteron®-XG (anionic heteropolysaccharide based on β-D-glucose, D-mannose, D-glucuronic acid, Schöner GmbH), Deuteron®-XN (nonionogenic polysaccharide, Schöner GmbH), Dicrylan®-Verdicker-O (ethylene oxide adduct, 50% in water/isopropanol, Pfersse Chemie), EMA®-81 and EMA®-91 (ethylene-maleic anhydride copolymer, Monsanto), Verdicker-QR-1001 (polyurethane emulsion, 19-21% in water/diglycol ether, Rohm & Haas), Mirox®-AM (anionic acrylic acid-acrylic ester copolymer dispersion, 25% in water, Stockhausen), SER-AD-FX-1100 (hydrophobic urethane polymer, Servo Delden), Shellflo®-S (high molecular weight polysaccharide, stabilized with formaldehyde, Shell), and Shellflo®-XA (xanthan biopolymer, stabilized with formaldehyde, Shell).

A polymeric thickener to be used with preference is xanthan, a microbial anionic heteropolysaccharide which is produced by Xanthomonas campestris and a few other species under aerobic conditions and has a molar mass of from 2 to 15 million daltons. Xanthan is formed from a chain having β-1,4-bonded glucose (cellulose) with side chains. The structure of the subgroups consists of glucose, mannose, glucuronic acid, acetate and pyruvate, the number of pyruvate units determining the viscosity of the xanthan.

Thickeners which are likewise to be used with preference in the context of the present invention are polyurethanes or modified polyacrylates which, based on the overall composition, can be used, for example, in amounts of from 0.1 to 5% by weight.

Polyurethanes (PUR) are prepared by polyaddition of dihydric and higher alcohols and isocyanates and can be described by the general formula XVI

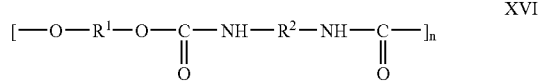

XVI in which $R^1$ is a low molecular weight or polymeric diol radical, $R^2$ is an aliphatic or aromatic group and n is a natural number. $R^1$ is preferably a linear or branched $C_{2-12}$-alk(en)yl group, but may also be a radical of a higher alcohol, which forms crosslinked polyurethanes which differ from the above formula XVI in that further —O—CO—NH groups are bonded to the $R^1$ radical.

Industrially important PURs are prepared from polyester- and/or polyetherdiols and, for example, from tolylene 2,4- or 2,6-diisocyanate (TDI, $R^2=C_6H_3$—$CH_3$), methylene 4,4'-di(phenylisocyanate) (MDI, $R^2=C_6H_4$—$CH_2$—$C_6H_4$) or hexamethylene diisocyanate [HMDI, $R^2=(CH_2)_6$].

Commercial thickeners based on polyurethane are obtainable, for example, under the names Acrysol®PM 12 V (mixture of 3-5% modified starch and 14-16% PUR resin in water, Rohm & Haas), Borchigel® L75-N (nonionogenic PUR dispersion, 50% in water, Borchers), Coatex® BR-100-P (PUR dispersion, 50% in water/butyl glycol, Dimed), Nopco® DSX-1514 (PUR dispersion, 40% in water/butyl triglycol, Henkel-Nopco), QR 1001 thickener (20% PUR emulsion in water/diglycol ether, Rohm & Haas) and Rilanit® VPW-3116 (PUR dispersion, 43% in water, Henkel). For the purposes of the present invention, when aqueous dispersions are used, it should be ensured that the water content of the inventive compositions remains within the above-specified limits. If the use of aqueous dispersions is not possible for these reasons, it is possible to use dispersions in other solvents, or else the solids.

Modified polyacrylates which can be used in the context of the present invention are derived, for example, from acrylic acid or methacrylic acid and can be described by the general formula XVII

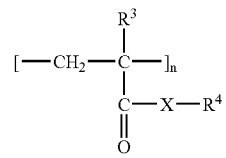

XVII in which $R^3$ is H or a branched or unbranched $C_{1-4}$-alk(en)yl radical, X is N—$R^5$ or O, $R^4$ is an optionally alkoxylated, branched or unbranched, possibly substituted $C_{8-22}$-alk(en)yl radical, $R^5$ is H or $R^4$, and n is a natural number. Such modified polyacrylates are generally esters or amides of acrylic acid or of an α-substituted acrylic acid. Among these polymers, preference is given to those in which $R^3$ is H or a methyl group. In the case of the polyacrylamides (X=N—$R^5$), both mono-N-substituted ($R^5$=H) and di-N-substituted ($R^5$=$R^4$) amide structures are possible, and the two hydrocarbon radicals which are bonded to the N atom can each be selected independently from optionally alkoxylated branched or unbranched $C_{8-22}$-alk(en)yl radicals. Among the polyacrylic esters (X=O), preference is given to those in which the alcohol has been obtained from natural or synthetic fats or oils and is additionally alkoxylated, preferably ethoxylated. Preferred degrees of alkoxylation are between 2 and 30, particular preference being given to degrees of alkoxylation between 10 and 15.

Since the polymers which can be used are technical-grade compounds, the specification of the radicals bonded to X is a statistical average value which can vary in the individual case with regard to chain length and/or degree of alkoxylation. The formula XVII merely specifies formulae for idealized homopolymers. However, it is also possible in the context of the present invention to use copolymers in which the fraction of monomer units which satisfy the formula XVII is at least 30% by weight. For example, it is also possible to use copolymers of modified polyacrylates and acrylic acid or salts thereof which still have acidic hydrogen atoms or basic —COO⁻ groups.

Modified polyacrylates to be used with preference in the context of the present invention are polyacrylate-polymethacrylate copolymers which satisfy the formula XVIIa

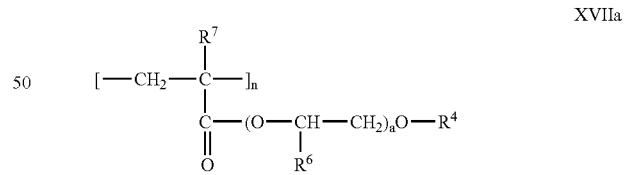

XVIIa in which $R^4$ is a preferably unbranched, saturated or unsaturated $C_{8-22}$-alk(en)yl radical, $R^6$ and $R^7$ are each independently H or $CH_3$, the degree of polymerization n is a natural number and the degree of alkoxylation a is a natural number between 2 and 30, preferably between 10 and 20. $R^4$ is preferably a fatty alcohol radical which has been obtained from natural or synthetic sources, the fatty alcohol again preferably being ethoxylated ($R^6$=H).

Products of the formula XVIIa are commercially available, for example under the name Acusol® 820 (Rohm & Haas) in the form of 30% by weight dispersions in water. In the commercial product mentioned, R⁴ is a stearyl radical, R⁶ is a hydrogen atom, R⁷ is H or CH₃ and the degree of ethoxylation a is 20. That which was stated above with regard to the water content of the compositions also applies to this dispersion.

Portioned detergent compositions which are preferred in the context of the present invention additionally contain from 0.01 to 5% by weight, preferably from 0.02 to 4% by weight, more preferably from 0.05 to 3% by weight and in particular from 0.1 to 1.5% by weight, of a thickener, preferably a polymeric thickener, preferred thickeners being hydroxyethylcellulose and/or hydroxypropylcellulose and/or thickeners from the group of the polysaccharides, preferably xanthan, of the polyurethanes or of the modified polyacrylates, with particular preference of thickeners of the formula XVII

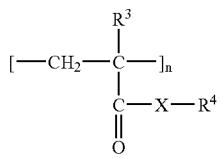

XVII in which R³ is H or a branched or unbranched $C_{1-4}$-alk(en)yl radical, X is N—R⁵ or O, R⁴ is an optionally alkoxylated, branched or unbranched, possibly substituted $C_{8-22}$-alk(en)yl radical, R⁵ is H or R⁴ and n is a natural number.

In addition to the substances from the substance classes mentioned, the inventive compositions may comprise further customary ingredients of detergents, of which bleaches, bleach activators, enzymes, silver protectants, colorants and fragrances are of particular significance. These substances are described below.

Among the compounds which serve as bleaches and supply H₂O₂ in water, sodium perborate tetrahydrate and sodium perborate monohydrate are of particular significance. Further bleaches which can be used are, for example, sodium percarbonate, peroxypyrophosphates, citrate perhydrates, and H₂O₂-supplying peracidic salts or peracids, such as perbenzoates, peroxophthalates, diperazelaic acid, phthaloimino peracid or diperdodecanedioic acid. Inventive detergents may also comprise bleaches from the group of organic bleaches. Typical organic bleaches are the diacyl peroxides, for example dibenzoyl peroxide. Further typical organic bleaches are the peroxy acids, particular examples being the alkyl peroxy acids and the aryl peroxy acids. Preferred representatives are (a) the peroxybenzoic acid and ring-substituted derivatives thereof, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid [phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid and N,N-terephthaloyldi (6-aminopercaproic acid) may be used.

Bleaches used in the inventive detergents for machine dishwashing may also be substances which release chlorine or bromine. Among suitable chlorine- or bromine-releasing materials, useful examples include heterocyclic N-bromoamides and N-chloroamides, for example trichloroisocyanuric acid, tribromoisocyanuric acid, dibromoisocyanuric acid and/or dichloroisocyanuric acid (DICA) and/or salts thereof with cations such as potassium and sodium. Hydantoin compounds, such as 1,3-dichloro-5,5-dimethylhydantoin, are likewise suitable. Bleach activators, which boost the action of the bleaches, have already been mentioned above as a possible ingredient of the rinse aid particles. Known bleach activators are compounds which contain one or more N— and/or O-acyl groups, such as substances from the class of anhydrides, esters, imides and acylated imidazoles or oximes. Examples are tetraacetylethylenediamine TAED, tetraacetylmethylenediamine TAMD and tetraacetylhexylenediamine TAHD, but also pentaacetyl-glucose PAG, 1,5-diacetyl-2,2-dioxohexahydro-1,3,5-triazine DADHT and isatoic anhydride ISA.

Bleach activators which may be used are compounds which, under perhydrolysis conditions, give aliphatic peroxocarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified, and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate, 2,5-diacetoxy-2,5-dihydrofuran, n-methylmorpholiniumacetonitrile methylsulfate (MMA), and enol esters, and also acetylated sorbitol and mannitol or mixtures thereof (SORMAN), acylated sugar derivatives, in particular pentaacetylglucose (PAG), pentaacetylfructose, tetraacetylxylose and octaacetyllactose, and acetylated, optionally N-alkylated, glucamine and gluconolactone, and/or N-acylated lactams, for example N-benzoyl-caprolactam. Hydrophilically substituted acylacetals and acyllactams are likewise used with preference. Combinations of conventional bleach activators can also be used.

Further bleach activators used with preference in the context of the present application are compounds from the group of cationic nitriles, in particular cationic nitrile of the formula

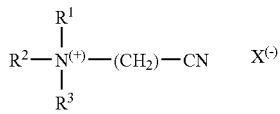

in which R¹ is —H, —CH₃, a $C_{2-24}$-alkyl or -alkenyl radical, a substituted $C_{2-24}$-alkyl or -alkenyl radical having at least one substituent from the group of —Cl, —Br, —OH, —NH₂, —CN, an alkyl- or alkenylaryl radical with a $C_{1-24}$-alkyl group, or is a substituted alkyl- or alkenylaryl radical having a $C_{1-24}$-alkyl group and at least one further substituent on the aromatic ring, R² and R³ are each independently selected from —CH₂—CN, —CH₃, —CH₂—CH₃, —CH₂—CH₂—CH₃, —CH(CH₃)—CH₃, —CH₂—OH, —CH₂—CH₂—OH, —CH(OH)—CH₃, —CH₂—

CH$_2$—CH$_2$—OH, —CH$_2$—CH(OH)—CH$_3$, —CH(OH)—CH$_2$—CH$_3$, —(CH$_2$CH$_2$—O)$_n$H where n=1, 2, 3, 4, 5 or 6 and X is an anion.

Particularly preferred inventive compositions comprise a cationic nitrile of the formula

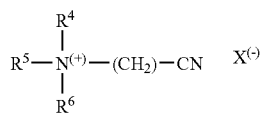

in which R$^4$, R$^5$ and R$^6$ are each independently selected from —CH$_3$, —CH$_2$—CH$_3$, —CH$_2$—CH$_2$—CH$_3$, —CH(CH$_3$)—CH$_3$, where R$^4$ may additionally also be —H and X is an anion, where preferably R$^5$=R$^6$=—CH$_3$ and in particular R$^4$=R$^5$=R$^6$=—CH$_3$, particular preference being given to compounds of the formulae (CH$_3$)$_3$N$^{(+)}$CH$_2$—CN X$^-$, (CH$_3$CH$_2$)$_3$N$^{(+)}$CH$_2$—CN X$^-$, (CH$_3$CH$_2$CH$_2$)$_3$N$^{(+)}$CH$_2$—CN X$^-$, (CH$_3$CH(CH$_3$))$_3$N$^{(+)}$CH$_2$—CN X$^-$, or (HO—CH$_2$—CH$_2$)$_3$N$^{(+)}$CH$_2$—CN X$^-$, particular preference from the group of these substances being given in turn to the cationic nitrile of the formula (CH$_3$)$_3$N$^{(+)}$CH$_2$—CN X$^-$ in which X$^-$ is an anion which is selected from the group of chloride, bromide, iodide, hydrogensulfate, methosulfate, p-toluenesulfonate (tosylate) or xylenesulfonate.

In addition to the conventional bleach activators, or instead of them, it is also possible to incorporate bleach catalysts into the rinse aid particles. These substances are bleach-boosting transition metal salts or transition metal complexes, for example salen or carbonyl complexes of Mn, Fe, Co, Ru or Mo. It is also possible to use Mn, Fe, Co, Ru, Mo, Ti, V and Cu complexes with N-containing tripod ligands, and also Co—, Fe—, Cu— and Ru-ammine complexes as bleach catalysts.

Preference is given to using bleach activators from the group of polyacylated alkylenediamines, in particular tetraacetylethylenediamine (TAED), N-acylimides, in particular N-nonanoylsuccinimide (NOSI), acylated phenolsulfonates, in particular n-nonanoyl- or isononanoyloxybenzenesulfonate (n- or iso-NOBS), n-methyl-morpholinioacetonitrile methylsulfate (MMA), preferably in amounts up to 10% by weight, in particular 0.1% by weight to 8% by weight, particularly 2 to 8% by weight and more preferably 2 to 6% by weight, based on the overall composition.

Bleach-boosting transition metal complexes, in particular with the central atoms Mn, Fe, Co, Cu, Mo, V, Ti and/or Ru, preferably selected from the group of manganese and/or cobalt salts and/or complexes, more preferably the cobalt (ammine) complexes, the cobalt (acetate) complexes, the cobalt (carbonyl) complexes, the chlorides of cobalt or manganese, and manganese sulfate, are used in customary amounts, preferably in an amount up to 5% by weight, in particular from 0.0025% by weight to 1% by weight and more preferably from 0.01% by weight to 0.25% by weight, based in each case on the overall composition. In specific cases, however, it is also possible to use a greater amount of bleach activator.

To increase the washing or cleaning performance, inventive compositions may contain enzymes, in which case it is possible in principle to use any enzymes established for these purposes in the prior art. These include in particular proteases, amylases, lipases, hemicellulases, cellulases or oxidoreductases, and preferably mixtures thereof. These enzymes are in principle of natural origin; starting from the natural molecules, improved variants are available for use in detergents and are preferably used accordingly. Inventive compositions preferably contain enzymes in total amounts of from 1×10$^{-6}$ to 5 percent by weight based on active protein. The protein concentration may be determined with the aid of known methods, for example the BCA method (bicinchoninic acid; 2,2'-biquinolyl-4,4'-dicarboxylic acid) or the biuret method.

Among the proteases, preference is given to those of the subtilisin type. Examples thereof include the subtilisins BPN' and Carlsberg, protease PB92, the subtilisins 147 and 309, *Bacillus lentus* alkaline protease, subtilisin DY and the enzymes thermitase and proteinase K which can be classified to the subtilases but no longer to the subtilisins in the narrower sense, and the proteases TW3 and TW7. The subtilisin Carlsberg is available in a developed form under the trade name Alcalase® from Novozymes A/S, Bagsværd, Denmark. The subtilisins 147 and 309 are sold under the trade names Esperase® and Savinase® respectively by Novozymes. The variants listed under the name BLAP® are derived from the protease of *Bacillus lentus* DSM 5483.

Further examples of useful proteases are the enzymes available under the trade names Durazym®, Relase®, Everlase®, Nafizym, Natalase®, Kannase® and Ovozymes® from Novozymes, those under the trade names Purafect®, Purafect®OxP and Properase® from Genencor, that under the trade name Protosol® from Advanced Biochemicals Ltd., Thane, India, that under the trade name Wuxi® from Wuxi Snyder Bioproducts Ltd., China, those under the trade names Proleather® and Protease P® from Amano Pharmaceuticals Ltd., Nagoya, Japan and that under the name Proteinase K-16 from Kao-Corp., Tokyo, Japan.

Examples of amylases which can be used in accordance with the invention are the α-amylases from *Bacillus licheniformis*, from *B. amyloliquefaciens* or from *B. stearothermophilus* and developments thereof which have been improved for use in detergents. The *B. licheniformis* enzyme is available from Novozymes under the name Termamyl® and from Genencor under the name Purastar®ST. Development products of this α-amylase are obtainable from Novozymes under the trade names Duramyl® and Termamyl®ultra, from Genencor under the name Purastar®OxAm and from Daiwa Seiko Inc., Tokyo, Japan as Keistase®. The *B. amyloliquefaciens* α-amylase is sold by Novozymes under the name BAN®, and variants derived from the *B. stearothermophilus* α-amylase under the names BSG® and Novamyl®, likewise from Novozymes.

Enzymes which should additionally be emphasized for this purpose are the α-amylase from *Bacillus* sp. A 7-7 (DSM 12368), and the cyclodextrin glucanotransferase (CG-Tase) from *B. agaradherens* (DSM 9948); it is equally possible to use fusion products of the molecules mentioned.

Also suitable are the developments of α-amylase from *Aspergillus niger* and *A. oryzae,* which are available under the trade names Fungamyl® from Novozymes. Another commercial product is Amylase-LT®, for example.

Inventive compositions may comprise lipases or cutinases, especially owing to their triglyceride-cleaving activities, but also in order to generate peracids in situ from suitable precursors. Examples thereof include the lipases which were originally obtainable from *Humicola lanuginosa* (*Thermomyces lanuginosus*) or have been developed, in particular those with the D96L amino acid substitution. They are sold, for example, under the trade names Lipolase®, Lipolase®Ultra, LipoPrime®, Lipozyme® and Lipex® by Novozymes. It is additionally possible, for example, to use the cutinases which have originally been isolated from *Fusarium solani pisi* and *Humicola insolens*. Lipases which are also useful can be obtained under the designations Lipase CE®, Lipase P®, Lipase B®, Lipase CES®, Lipase AKG®, *Bacillis* sp. Lipase®, Lipase AP®, Lipase M-AP® and Lipase AML® from Amano. Examples of lipases and cutinases from Genencor which can be used are those whose starting enzymes have originally been isolated from *Pseudomonas mendocina* and *Fusarium solanii*. Other important commercial products include the M1 Lipase® and Lipomax® preparations originally sold by Gist-Brocades and the enzymes sold under the names Lipase MY-30®, Lipase OF® and Lipase PL® by Meito Sangyo KK, Japan, and also the product Lumafast® from Genencor.

Inventive compositions may, especially when they are intended for the treatment of textiles, comprise cellulases, depending on the purpose either as pure enzymes, as enzyme preparations or in the form of mixtures in which the individual components advantageously complement one another with respect to their different performance aspects. These performance aspects include in particular contributions to the primary washing performance, to the secondary washing performance of the composition (antiredeposition action or graying inhibition) and finishing (fabric action), up to exerting a "stone-wash" effect.

A useful fungal, endoglucanase(EG)-rich cellulase preparation and developments thereof are supplied under the trade name Celluzyme® from Novozymes. The products Endolase® and Carezyme®, likewise available from Novozymes, are based on the *H. insolens* DSM 1800 50 kD EG and 43 kD EG respectively. Further commercial products of this company, which may be used, are Cellusoft® and Renozyme®. It is equally possible to use the *Melahocarpus* 20 kD EG cellulase, which is available under the trade names Ecostone® and Biotouch® from AB Enzymes, Finland. Further commercial products from AB Enzymes are Econase® and Ecopulp®. A further suitable cellulase from *Bacillus* sp. CBS 670.93 is available under the trade name Puradax® from Genencor. Other commercial products from Genencor are Genencor detergent cellulase L and IndiAge®Neutra.

Inventive compositions may comprise further enzymes which are combined under the term hemicellulases. These include, for example, mannanases, xanthane lyases, pectin lyases (=pectinases), pectin esterases, pectate lyases, xyloglucanases (=xylanases), pullulanases and β-glucanases. Suitable mannanases are available, for example, under the names Gamanase® and Pektinex AR® from Novozymes, under the name Rohapec® B1L from AB Enzymes and under the name Pyrolase® from Diversa Corp., San Diego, Calif., USA. The β-glucanase obtained from *B. subtilis* is available under the name Cereflo® from Novozymes.

In order to enhance the bleaching action, inventive detergents may comprise oxidoreductases, for example oxidases, oxygenases, catalases, peroxidases, such as haloperoxidases, chloroperoxidases, bromoperoxidases, lignin peroxidases, glucose peroxidases or manganese peroxidases, dioxygenases or laccases (phenol oxidases, polyphenol oxidases). Suitable commercial products include Denilite® 1 and 2 from Novozymes. Advantageously, preferably organic, more preferably aromatic, compounds which interact with the enzymes are additionally added in order to enhance the activity of the oxidoreductases concerned (enhancers), or to ensure the electron flux in the event of large differences in the redox potentials of the oxidizing enzymes and the soilings (mediators).

The enzymes used in inventive compositions either derive originally from microorganisms, for example of the genera *Bacillus, Streptomyces, Humicola,* or *Pseudomonas,* and/or are produced in biotechnology processes known per se by suitable microorganisms, for instance by transgenic expression hosts of the genera *Bacillus* or filamentous fungi.

The enzymes in question are favorably purified via processes which are established per se, for example via precipitation, sedimentation, concentration, filtration of the liquid phases, microfiltration, ultrafiltration, the action of chemicals, deodorization or suitable combinations of these steps.

The enzymes may be added to inventive compositions in any form established in the prior art. These include, for example, the solid preparations obtained by granulation, extrusion or lyophilization, or, especially in the case of liquid or gel-form compositions, solutions of the enzymes, advantageously highly concentrated, low in water and/or admixed with stabilizers.

Alternatively, the enzymes may be encapsulated either for the solid or for the liquid administration form, for example by spray-drying or extrusion of the enzyme solution together with a preferably natural polymer, or in the form of capsules, for example those in which the enzymes are enclosed as in a solidified gel, or in those of the core-shell type, in which an enzyme-containing core is coated with a water-, air- and/or chemical-impermeable protective layer. It is possible in layers applied thereto to additionally apply further active ingredients, for example stabilizers, emulsifiers, pigments, bleaches or dyes. Such capsules are applied by methods known per se, for example by agitated or roll granulation or in fluidized bed processes. Advantageously, such granules, for example as a result of application of polymeric film formers, are low-dusting and storage-stable owing to the coating.

It is also possible to formulate two or more enzymes together, so that a single granule has a plurality of enzyme activities.

A protein and/or enzyme present in an inventive composition may be protected, particularly during storage, from damage, for example inactivation, denaturation or decay, for instance by physical influences, oxidation or proteolytic cleavage. When the proteins and/or enzymes are obtained microbially, particular preference is given to inhibiting proteolysis, especially when the compositions also comprise proteases. For this purpose, inventive compositions may comprise stabilizers; the provision of such compositions constitutes a preferred embodiment of the present invention.

One group of stabilizers is that of reversible protease inhibitors. Frequently, benzamidine hydrochloride, borax, boric acids, boronic acids or salts or esters thereof are used, and of these in particular derivatives having aromatic groups, for example ortho-, meta- or para-substituted phenylboronic acids, or the salts or esters thereof. Peptide aldehydes, i.e. oligopeptides with reduced C-terminus are also suitable. Peptidic protease inhibitors which should be mentioned include ovomucoid and leupeptin; an additional option is the formation of fusion proteins of proteases and peptide inhibitors.

Further enzyme stabilizers are amino alcohols such as mono-, di-, triethanol- and -propanolamine and mixtures thereof, aliphatic carboxylic acids up to $C_{12}$, such as succinic acid, other dicarboxylic acids or salts of the acids mentioned. Terminally capped fatty acid amide alkoxylates can also be used as stabilizers.

Lower aliphatic alcohols, but in particular polyols, for example glycerol, ethylene glycol, propylene glycol or sorbitol, are other frequently used enzyme stabilizers. Diglycerol phosphate also protects against denaturation by physical influences. Calcium salts are likewise used, for example calcium acetate or calcium formate, as are magnesium salts.

Polyamide oligomers or polymeric compounds such as lignin, water-soluble vinyl copolymers or such as cellulose ethers, acrylic polymers and/or polyamides stabilize the enzyme preparation against influences including physical influences or pH fluctuations. Polyamine N-oxide-containing polymers act simultaneously as enzyme stabilizers and as dye transfer inhibitors. Other polymeric stabilizers are the linear $C_8$-$C_{18}$ polyoxyalkylenes. Alkylpolyglycosides can likewise stabilize the enzymatic components of the inventive composition and even increase their performance. Crosslinked N-containing compounds fulfill a double function as soil release agents and as enzyme stabilizers.

Reducing agents and antioxidants, such as sodium sulfite or reducing sugars, increase the stability of the enzymes against oxidative decay.

Preference is given to using combinations of stabilizers, for example of polyols, boric acid and/or borax, the combination of boric acid or borate, reducing salts and succinic acid or other dicarboxylic acids or the combination of boric acid or borate with polyols or polyamino compounds and with reducing salts. The action of peptide-aldehyde stabilizers can be increased by the combination with boric acid and/or boric acid derivatives and polyols, and further enhanced by the additional use of divalent cations, for example calcium ions.

Particular preference is given in the context of the present invention to the use of liquid enzyme formulations. Preference is given here to inventive compositions which additionally contain enzymes and/or enzyme preparations, preferably solid and/or liquid protease preparations and/or amylase preparations, in amounts of from 1 to 5% by weight, preferably of from 1.5 to 4.5% by weight and in particular from 2 to 4% by weight, based in each case on the overall composition.

Dyes and fragrances may be added to the inventive compositions in order to improve the esthetic impression of the resulting products and to provide the consumer with not only the performance, but also with a visually and sensorily "typical and unmistakable" product. The perfume oils and/or fragrances used may be individual odorant compounds, for example the synthetic products of the ester, ether, aldehyde, ketone, alcohol and hydrocarbon type. Odorant compounds of the ester type are, for example, benzyl acetate, phenoxyethyl isobutyrate, p-tert-butylcyclohexyl acetate, linalyl acetate, dimethylbenzylcarbinyl acetate, phenylethyl acetate, linalyl benzoate, benzyl formate, ethyl methylphenyglycinate, allyl cyclohexylpropionate, styrallyl propionate and benzyl salicylate. The ethers include, for example, benzyl ethyl ether; the aldehydes include, for example, the linear alkanals having 8-18 carbon atoms, citral, citronellal, citronellyloxyacetaldehyde, cyclamen aldehyde, hydroxycitronellal, lilial and bourgeonal; the ketones include, for example, the ionones, α-isomethylionone and methyl cedryl ketone; the alcohols include anethole, citronellol, eugenol, geraniol, linalool, phenylethyl alcohol and terpineol; the hydrocarbons include primarily the terpenes such as limonene and pinene. However, preference is given to using mixtures of different odorants which together produce a pleasing fragrance note. Such perfume oils may also comprise natural odorant mixtures, as are obtainable from vegetable sources, for example pine oil, citrus oil, jasmine oil, patchouli oil, rose oil or ylang-ylang oil. Likewise suitable are muscatel, sage oil, chamomile oil, clove oil, balm oil, mint oil, cinnamon leaf oil, lime blossom oil, juniperberry oil, vetiver oil, olibanum oil, galbanum oil and labdanum oil, and also orange blossom oil, neroli oil, orange peel oil and sandalwood oil.

The fragrances can be incorporated directly into the inventive detergents, but it may also be advantageous to apply the fragrances to carriers which intensify the adhesion of the perfume to the laundry and ensure long-lasting fragrance of the textiles by slower fragrance release. Useful such carrier materials have been found to be, for example, cyclodextrins, and the cyclodextrin-perfume complexes may additionally also be coated with further auxiliaries.

In order to improve the esthetic impression of the inventive compositions, it (or parts thereof) may be colored with suitable dyes. Preferred dyes, whose selection presents no difficulty at all to the person skilled in the art, have high storage stability and insensitivity toward the other ingredients of the compositions and to light, and also have no pronounced substantivity toward the substrates to be treated with the compositions, such as textiles, glass, ceramic or plastic dishes, so as not to stain them.

In order to protect the ware or the machine, the inventive detergents may comprise corrosion inhibitors, and particularly silver protectants are of particular significance in the field of machine dishwashing. The known substances of the prior art can be used. Generally, it is possible in particular to use silver protectants selected from the group of the triazoles, the benzotriazoles, the bisbenzotriazoles, the aminotriazoles, the alkylaminotriazoles and the transition metal salts or complexes. Particular preference is given to using benzotriazole and/or alkylaminotriazole. Frequently also found in cleaning formulations are active chlorine-containing agents which can significantly reduce the corrosion of the silver surface. In chlorine-free detergents, particularly oxygen- and nitrogen-containing organic redox-active compounds, such as di- and trihydric phenols, for example hydroquinone, pyrocatechol, hydroxyhydroquinone, gallic acid, phloroglucine, pyrogallol and derivatives of these classes of compound are used. Salt- and complex-type inorganic compounds, such as salts of the metals Mn, Ti, Zr, Hf, V, Co and Ce, also frequently find use. Preference is given in this context to the transition metal salts which are selected from the group of manganese and/or cobalt salts and/or complexes, more preferably cobalt(ammine) complexes, cobalt(acetate) complexes, cobalt (carbonyl)complexes, the chlorides of cobalt or manganese, and manganese sulfate. Zinc compounds may likewise be used to prevent corrosion on the ware.

Instead of or in addition to the above-described silver protectants, for example the benzotriazoles, it is possible to use redox-active substances in the inventive portioned detergent compositions. These substances are preferably inorganic redox-active substances from the group of the manganese, titanium, zirconium, hafnium, vanadium, cobalt and cerium salts and/or complexes, the metals preferably being in one of the oxidation states II, III, IV, V or VI.

The metal salts or metal complexes used should be at least partially soluble in water. The counterions suitable for the salt formation include all customary singly, doubly or triply negatively charged inorganic anions, for example oxide, sulfate, nitrate, fluoride, but also organic anions, for example stearate.

Metal complexes in the context of the invention are compounds which consist of a central atom and one or more ligands, and optionally additionally one or more of the abovementioned anions. The central atom is one of the abovementioned metals in one of the abovementioned oxidation states. The ligands are neutral molecules or anions which are mono- or polydentate; the term "ligands" in the context of the invention is explained in more detail, for example, in "Römpp Chemie Lexikon, Georg Thieme Verlag, Stuttgart/New York, 9th edition, 1990, page 2507". When the charge of the central atom and the charge of the ligand(s) within a metal complex do not add up to zero, depending on whether there is a cationic or an-anionic charge excess, either one or more of the abovementioned anions or one or more cations, for example sodium, potassium, ammonium ions, ensure that the charge balances. Suitable complexing agents are, for example, citrate, acetyl acetonate or 1-hydroxyethane-1,1-diphosphonate.

The definition of "oxidation state" customary in chemistry is reproduced, for example, in "Römpp Chemie Lexikon, Georg Thieme Verlag, Stuttgart/New York, 9th edition, 1991, page 3168".

Particularly preferred metal salts and/or metal complexes are selected from the group of $MnSO_4$, Mn(II) citrate, Mn(II) stearate, Mn(II) acetylacetonate, Mn(II) 1-hydroxyethane-1,1-diphosphonate, $V_2O_5$, $V_2O_4$, $VO_2$, $TiOSO_4$, $K_2TiF_6$, $K_2ZrF_6$, $CoSO_4$, $Co(NO_3)_2$, $Ce(NO_3)_3$, and mixtures thereof, so that preferred inventive machine dishwasher detergents are characterized in that the metal salts and/or metal complexes are selected from the group consisting of $MnSO_4$, Mn(II) citrate, Mn(II) stearate, Mn(II) acetylacetonate, Mn(II) 1-hydroxyethane-1,1-diphosphonate, $V_2O_5$, $V_2O_4$, $VO_2$, $TiOSO_4$, $K_2TiF_6$, $K_2ZrF_6$, $CoSO_4$, $Co(NO_3)_2$, $Ce(NO_3)_3$.

These metal salts or metal complexes are generally commercial substances which can be used in the inventive compositions for the purpose of silver corrosion protection without prior cleaning. For example, the mixture of penta- and tetravalent vanadium ($V_2O_5$, $VO_2$, $V_2O_4$) known from the preparation of $SO_3$ (contact process) is therefore suitable, as is the titanyl sulfate $TiOSO_4$ which is obtained by diluting a $Ti(SO_4)_2$ solution.

The inorganic redox-active substances, especially metal salts or metal complexes, are preferably coated, i.e. covered completely with a material which is water-tight but slightly soluble at the cleaning temperatures, in order to prevent their premature disintegration or oxidation in the course of storage. Preferred coating materials which are applied by known methods, for instance melt coating method according to Sandwik from the foods industry, are paraffins, microcrystalline waxes, waxes of natural origin, such as carnauba wax, candelilla wax, beeswax, relatively high-melting alcohols, for example hexadecanol, soaps or fatty acids. The coating material which is solid at room temperature is applied to the material to be coated in the molten state, for example by centrifuging finely divided material to be coated in a continuous stream through a likewise continuously generated spray-mist zone of the molten coating material. The melting point has to be selected such that the coating material readily dissolves or rapidly melts during the silver treatment. The melting point should ideally be in the range between 45° C. and 65° C. and preferably in the 50° C. to 60° C. range.

The metal salts and/or metal complexes mentioned are present in the inventive portioned detergent compositions, especially machine dishwasher detergents, preferably in an amount of from 0.05 to 6% by weight, preferably from 0.2 to 2.5% by weight, based on the overall composition.

A further important criterion for assessing a machine dishwasher detergent is, aside from its cleaning performance, the visual appearance of the dry dishes on completion of cleaning. Any calcium carbonate deposits which arise on dishes or in the interior of the machine might, for example, impair customer satisfaction and thus have a causal influence on the economic success of such a detergent. A further problem which has existed for some time in machine dishwashing is the corrosion of glassware, which can usually manifest itself by the appearance of clouding, smearing and scratches, but also by an iridescence of the glass surface. The observed effects are based essentially on two operations, the exit of alkali metal and alkaline earth metal ions from the glass in conjunction with a hydrolysis of the silicate network, and secondly in a deposition of silicatic compounds on the glass surface.

The problems mentioned can be solved using the inventive compositions when, in addition to the aforementioned obligatory and any optional ingredients, certain glass corrosion inhibitors are incorporated into the compositions. Preferred inventive compositions therefore additionally comprise one or more magnesium and/or zinc salts and/or magnesium and/or zinc complexes.

A preferred class of compounds which can be added to the inventive compositions to prevent glass corrosion is that of insoluble zinc salts. These can position themselves during the dishwashing operation on the glass surface, where they prevent metal ions from the glass network from going into solution, and also the hydrolysis of the silicates. Additionally, these insoluble zinc salts also prevent the deposition of silicate on the surface of the glass, so that the glass is protected from the consequences outlined above.

In the context of this preferred embodiment, insoluble zinc salts are zinc salts which have a maximum solubility of 10 grams of zinc salt per liter of water at 20° C. Examples of insoluble zinc salts which are particularly preferred in accordance with the invention are zinc silicate, zinc carbonate, zinc oxide, basic zinc carbonate ($Zn_2(OH)_2CO_3$), zinc hydroxide, zinc oxalate, zinc monophosphate ($Zn_3(PO_4)_2$), and zinc pyrophosphate ($Zn_2(P_2O_7)$).

The zinc compounds mentioned are used in the inventive compositions in amounts which bring about a content of zinc ions in the compositions of between 0.02 and 10% by weight, preferably between 0.1 and 5.0% by weight and in particular between 0.2 and 1.0% by weight, based in each case on the composition. The exact content in the compositions of zinc salt or zinc salts is by its nature dependent on the type of the zinc salts—the less soluble the zinc salt used, the higher its concentration in the inventive compositions.

Since the insoluble zinc salts remain for the most part unchanged during the dishwashing operation, the particle size of the salts is a criterion to be considered, so that the salts do not adhere to glassware or parts of the machine. Preference is given here to inventive liquid aqueous machine dishwasher detergents in which the insoluble zinc salts have a particle size below 1.7 millimeters.

When the maximum particle size of the insoluble zinc salts is less than 1.7 mm, there is no risk of insoluble residues in the dishwasher. The insoluble zinc salt preferably has an average particle size which is distinctly below this value in order to further minimize the risk of insoluble residues, for example an average particle size of less than 250 μm. The lower the solubility of the zinc salt, the more important this is. In addition, the glass corrosion-inhibiting effectiveness increases with decreasing particle size. In the case of very sparingly soluble zinc salts, the average particle size is preferably below 100 μm. For even more sparingly soluble salts, it may be lower still; for example, average particle sizes below 100 μm are preferred for the very sparingly soluble zinc oxide.

A further preferred class of compounds is that of magnesium and/or zinc salt(s) of at least one monomeric and/or polymeric organic acid. These have the effect that, even upon repeated use, the surfaces of glassware are not altered as a result of corrosion, and in particular no clouding, smears or scratches, and also no iridescence of the glass surfaces, are caused.

Even though all magnesium and/or zinc salt(s) of monomeric and/or polymeric organic acids may be present in accordance with the invention in the claimed compositions, preference is given, as described above, to the magnesium and/or zinc salts of monomeric and/or polymeric organic acids from the groups of the unbranched, saturated or unsaturated monocarboxylic acids, the branched, saturated or unsaturated monocarboxylic acids, the saturated and unsaturated dicarboxylic acids, the aromatic mono-, di- and tricarboxylic acids, the sugar acids, the hydroxy acids, the oxo acids, the amino acids and/or the polymeric carboxylic acids. In the context of the present invention, preference is in turn given within these groups to the acids specified below:

From the group of unbranched, saturated or unsaturated monocarboxylic acids: methanoic acid (formic acid), ethanoic acid (acetic acid), propanoic acid (propionic acid), pentanoic acid (valeric acid), hexanoic acid (caproic acid), heptanoic acid (enanthic acid), octanoic acid (caprylic acid), nonanoic acid (pelargonic acid), decanoic acid (capric acid), undecanoic acid, dodecanoic acid (lauric acid), tridecanoic acid, tetradecanoic acid (myristic acid), pentadecanoic acid, hexadecanoic acid (palmitic acid), heptadecanoic acid (margaric acid), octadecanoic acid (stearic acid), eicosanoic acid (arachic acid), docosanoic acid (behenic acid), tetracosanoic acid (lignoceric acid), hexacosanoic acid (cerotic acid), triacotanoic acid (melissic acid), 9c-hexadecenoic acid (palmitoleic acid), 6c-octadecenoic acid (petroselic acid), 6t-octadecenoic acid (petroselaidic acid), 9c-octadecenoic acid (oleic acid), 9t-octadecenoic acid (elaidic acid), 9c,12c-octadecadienoic acid (linoleic acid), 9t,12t-octadecadienoic acid (linolaidic acid) and 9c,12c,15c-octadecatrienoic acid (linolenic acid).

From the group of branched, saturated or unsaturated monocarboxylic acids: 2-methylpentanoic acid, 2-ethylhexanoic acid, 2-propylheptanoic acid, 2-butyloctanoic acid, 2-pentylnonanoic acid, 2-hexyldecanoic acid, 2-heptylundecanoic acid, 2-octyldodecanoic acid, 2-nonyltridecanoic acid, 2-decyltetradecanoic acid, 2-undecylpentadecanoic acid, 2-dodecylhexadecanoic acid, 2-tridecylheptadecanoic acid, 2-tetradecyloctadecanoic acid, 2-pentadecylnonadecanoic acid, 2-hexadecyleicosanoic acid, 2-heptadecyleneicosanoic acid.

From the group of unbranched, saturated or unsaturated di- or tricarboxylic acids: propanedioic acid (malonic acid), butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), 2c-butenedioic acid (maleic acid), 2t-butenedioic acid (fumaric acid), 2-butynedicarboxylic acid (acetylenedicarboxylic acid).

From the group of aromatic mono-, di- and tricarboxylic acids: benzoic acid, 2-carboxybenzoic acid (phthalic acid), 3-carboxybenzoic acid (isophthalic acid), 4-carboxybenzoic acid (terephthalic acid), 3,4-dicarboxy-benzoic acid (trimellitic acid), 3,5-dicarboxybenzoic acid (trimesionic acid).

From the group of sugar acids: galactonic acid, mannonic acid, fructonic acid, arabinonic acid, xylonic acid, ribonic acid, 2-deoxyribonic acid, alginic acid.

From the group of hydroxy acids: hydroxyphenylacetic acid (mandelic acid), 2-hydroxypropionic acid (lactic acid), hydroxysuccinic acid (malic acid), 2,3-dihydroxybutanedioic acid (tartaric acid), 2-hydroxy-1,2,3-propanetricarboxylic acid (citric acid), ascorbic acid, 2-hydroxybenzoic acid (salicylic acid), 3,4,5-trihydroxybenzoic acid (gallic acid).

From the group of oxo acids: 2-oxopropanoic acid (pyruvic acid), 4-oxopentanoic acid (levulinic acid).

From the group of amino acids: alanine, valine, leucine, isoleucine, proline, tryptophan, phenylalanine, methionine, glycine, serine, tyrosine, threonine, cysteine, aspargine, glutamine, aspartic acid, glutamic acid, lysine, arginine, histidine.

From the group of polymeric carboxylic acids: polyacrylic acid, polymethacrylic acid, alkylacrylamide/acrylic acid copolymers, alkylacrylamide/methacrylic acid copolymers, alkylacrylamide/methylmethacrylic acid copolymers, copolymers of unsaturated carboxylic acids, vinyl acetate/crotonic acid copolymers, vinylpyrrolidone/vinyl acrylate copolymers.

The spectrum of the zinc salts, preferred in accordance with the invention, of organic acids, preferably of organic carboxylic acids, ranges from salts which are sparingly soluble or insoluble in water, i.e. have a solubility below 100 mg/l, preferably below 10 mg/l, in particular have zero solubility, to those salts which have a solubility in water above 100 mg/l, preferably above 500 mg/l, more preferably above 1 g/l and in particular above 5 g/l (all solubilities at water temperature 20° C.). The first group of zinc salts includes, for example, zinc citrate, zinc oleate and zinc stearate; the group of soluble zinc salts includes, for example, zinc formate, zinc acetate, zinc lactate and zinc gluconate.

In a further preferred embodiment of the present invention, the compositions according to the invention comprise at least one zinc salt, but no magnesium salt of an organic acid, preferably at least one zinc salt of an organic carboxylic acid, more preferably a zinc salt from the group of zinc stearate, zinc oleate, zinc gluconate, zinc acetate, zinc lactate and/or zinc citrate. Preference is also given to zinc ricinoleate, zinc abietate and zinc oxalate.

A composition which is preferred in the context of the present invention contains zinc salt in amounts of from 0.1 to 5% by weight, preferably from 0.2 to 4% by weight and in particular from 0.4 to 3% by weight, or zinc in oxidized form (calculated as $Zn^{2+}$) in amounts of from 0.01 to 1% by weight, preferably from 0.02 to 0.5% by weight and in particular from 0.04 to 0.2% by weight, based in each case on the total weight of the machine dishwasher detergent.

The inventive portioned detergent compositions are packaged in water-dispersible or water-soluble containers. The appropriate packaging materials are known from the prior art and stem, for example, from the group of (acetalized) polyvinyl alcohol, polyvinylpyrrolidone, polyethylene oxide, gelatin and mixtures thereof.

Particularly preferred inventive portioned detergent compositions are characterized in that the water-soluble or water-dispersible container comprises one or more water-soluble polymer(s), preferably a material from the group of (optionally acetalized) polyvinyl alcohol (PVAL), polyvinylpyrrolidone, polyethylene oxide, gelatin, cellulose, and derivatives thereof and mixtures thereof.

"Polyvinyl alcohols" (abbreviation PVAL, sometimes also PVOH) is the name for polymers of the general structure

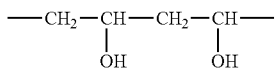

which also comprise structural units of the

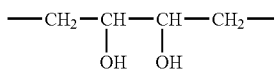

type in small fractions (approx. 2%).

Commercial polyvinyl alcohols, which are supplied as white-yellowish powders or granules with degrees of polymerization in the range from approx. 100 to 2500 (molar masses from approx. 4000 to 100,000 g/mol), have degrees of hydrolysis of 98-99 or 87-89 mol %, and thus also comprise a residual content of acetyl groups. The polyvinyl alcohols are characterized on the part of the manufacturer by specifying the degree of polymerization of the starting polymer, the degree of hydrolysis, the hydrolysis number or the solution viscosity.

Depending on the degree of hydrolysis, polyvinyl alcohols are soluble in water and a few strongly polar organic solvents (formamide, dimethylformamide, dimethyl sulfoxide); they are not attacked by (chlorinated) hydrocarbons, esters, fats and oils. Polyvinyl alcohols are classified as toxicologically uncontroversial and are at least partially biodegradable. The water solubility can be reduced by aftertreatment with aldehydes (acetalization), by complexing with nickel or copper salts or by treatment with dichromates, boric acid or borax. The coatings made of polyvinyl alcohol are largely impenetratable to gases such as oxygen, nitrogen, helium, hydrogen, carbon dioxide, but allow steam to pass through.

In the context of the present invention, it is preferred for the water-soluble or water-dispersible container to comprise a polyvinyl alcohol whose degree of hydrolysis is from 70 to 100 mol %, preferably from 80 to 90 mol %, more preferably from 81 to 89 mol % and in particular from 82 to 88 mol %.

The materials used for the containers are preferably polyvinyl alcohols of a certain molecular weight range, preference being given in accordance with the invention to the water-soluble or water-dispersible container comprising a polyvinyl alcohol whose molecular weight is in the range from 10,000 to 100,000 gmol$^{-1}$, preferably from 11,000 to 90,000 gmol$^{-1}$, more preferably from 12,000 to 80,000 gmol$^{-1}$ and in particular from 13,000 to 70,000 gmol$^{-1}$.

The degree of polymerization of such preferred polyvinyl alcohols is between about 200 and about 2100, preferably between about 220 and about 1890, more preferably between about 240 and about 1680 and in particular between about 260 and about 1500.

The polyvinyl alcohols described above are widely available commercially, for example under the trade name Mowiol® (Clariant). Polyvinyl alcohols which are particularly suitable in the context of the present invention are, for example, Mowiol® 3-83, Mowiol® 4-88, Mowiol® 5-88 and Mowiol® 8-88.

Further polyvinyl alcohols which are particularly suitable as a material for the container can be taken from the table below:

| Name | Degree of hydrolysis [%] | Molar mass [kDa] | Melting point [° C.] |
|---|---|---|---|
| Airvol ® 205 | 88 | 15-27 | 230 |
| Vinex ® 2019 | 88 | 15-27 | 170 |
| Vinex ® 2144 | 88 | 44-65 | 205 |
| Vinex ® 1025 | 99 | 15-27 | 170 |
| Vinex ® 2025 | 88 | 25-45 | 192 |
| Gohsefimer ® 5407 | 30-28 | 23 600 | 100 |
| Gohsefimer ® LL02 | 41-51 | 17 700 | 100 |

Further polyvinyl alcohols suitable as a material for the container are ELVANOL® 51-05, 52-22, 50-42, 85-82, 75-15, T-25, T-66, 90-50 (trademark of Du Pont), ALCOTEX® 72.5, 78, B72, F80/40, F88/4, F88/26, F88/40, F88/47 (trade mark of Harlow Chemical Co.), Gohsenol® NK-05, A-300, AH-22, C-500, GH-20, GL-03, GM-14L, KA-20, KA-500, KH-20, KP-06, N-300, NH-26, NM11Q, KZ-06 (trademark of Nippon Gohsei K.K.)

The water solubility of PVAL can be altered by aftertreatment with aldehydes (acetalization) or ketones (ketalization). In this context, particularly preferred polyvinyl alcohols which are particularly advantageous due to their exceptionally good solubility in cold water have been found to be those which are acetalized or ketalized with the aldehyde and keto groups, respectively, of saccharides or polysaccharides or mixtures thereof. The reaction products of PVAL and starch can be used exceptionally advantageously.

In addition, the solubility in water can be altered by complexation with nickel or copper salts or by treatment with dichromates, boric acid, borax, and thus be adjusted selectively to desired values. Films of PVAL are largely impenetratable to gases such as oxygen, nitrogen, helium, hydrogen, carbon dioxide, but allow steam to pass through.

Examples of suitable water-soluble PVAL films are the PVAL films obtainable under the name "SOLUBLON®" from Syntana Handelsgesellschaft E. Harke GmbH & Co. Their solubility in water can be adjusted to a precise degree, and films of this product series are obtainable which are soluble in the aqueous phase in all temperature ranges relevant for the application.

Polyvinylpyrrolidones, referred to for short as PVP, can be described by the following general formula:

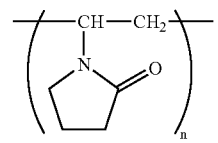

PVPs are prepared by free-radical polymerization of 1-vinylpyrrolidone. Commercially available PVPs have molar masses in the range from approx. 2500 to 750,000 g/mol and are supplied as white, hygroscopic powders or as aqueous solutions.

Polyethylene oxides, PEOX for short, are polyalkylene glycols of the general formula

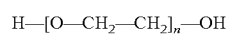

which are prepared industrially by base-catalyzed polyaddition of ethylene oxide (oxirane) in systems containing usually small amounts of water, with ethylene glycol as the starter molecule. They have molar masses in the range from about 200 to 5,000,000 g/mol, corresponding to degrees of polymerization n of from about 5 to >100,000. Polyethylene oxides have an extremely low concentration of reactive hydroxyl end groups and exhibit only weak glycol properties.

Gelatin is a polypeptide (molar mass: from approx. 15,000 to >250,000 g/mol) which is obtained primarily by hydrolysis of the collagen present in skin and bones of animals under acidic or alkaline conditions. The amino acid composition of the gelatin corresponds substantially to that of the collagen from which it has been obtained and varies depending on its provenance. The use of gelatin as a water-soluble coating material is extremely widespread, especially in pharmacy in the form of hard or soft gelatin capsules. Owing to its high cost in comparison to the abovementioned polymers-, gelatin finds use in the form of films only to a small extent.

In the context of the present invention, preference is also given to inventive compositions whose packaging consists of at least partially water-soluble film composed of at least one polymer from the group of starch and starch derivatives, cellulose and cellulose derivatives, in particular methylcellulose and mixtures thereof.

Starch is a homoglycan, the glucose units being linked α-glycosidically. Starch is made up of two components of different molecular weight: of from approx. 20 to 30% of straight-chain amylose (MW from approx. 50,000 to 150,000) and from 70 to 80% of branched-chain amylopectin (MW from approx. 300,000 to 2,000,000). In addition, small amounts of lipids, phosphoric acid and cations are also present. While the amylose forms long, helical, intertwined chains having from approx. 300 to 1200 glucose molecules owing to the binding in the 1,4-arrangement, the chain branches in the case of amylopectin after, on average, 25 glucose building blocks by a 1,6-bond to give a branch-like structure having from about 1500 to 12,000 molecules of glucose. In addition to pure starch, suitable substances for the preparation of water-soluble coatings of the laundry detergent, dishwasher detergent and cleaning composition portions in the context of the present invention are also starch derivatives which are obtainable from starch by polymer-like reactions. Such chemically modified starches include, for example, products of esterifications or etherifications in which hydroxyl hydrogen atoms have been substituted. However, starches in which the hydroxyl groups have been replaced by functional groups which are not bonded via an oxygen atom can also be used as starch derivatives. The group of starch derivatives includes, for example, alkali metal starches, carboxymethyl starch (CMS), starch esters and starch ethers, and also amino starches.

Pure cellulose has the formal gross composition $(C_6H_{10}O_5)_n$ and, considered in a formal sense, constitutes a β-1,4-polyacetal of cellobiose which is itself formed from two molecules of glucose. Suitable celluloses consist of from approx. 500 to 5000 glucose units and accordingly have average molar masses of from 50,000 to 500,000. Cellulose-based disintegrants which can be used in the context of the present invention are also cellulose derivatives which are obtainable from cellulose by polymer-like reactions. Such chemically modified celluloses comprise, for example, products of esterifications or etherifications in which hydroxyl hydrogen atoms have been substituted. However, celluloses in which the hydroxyl groups have been replaced by functional groups which are not bonde via an oxygen atom can also be used as cellulose derivatives. The group of cellulose derivatives includes, for example, alkali metal celluloses, carboxymethylcellulose (CMC), cellulose esters and cellulose ethers, and also aminocelluloses.

The water-soluble or water-dispersible containers which comprise the inventive compositions may be produced by any process described in the prior art.

The present application therefore further provides a process for producing portioned liquid detergent compositions, in which at least one solid is dispersed in an aqueous matrix and subsequently packaged in a water-soluble or water-dispersible container, characterized in that the dispersed solid(s) has/have a particle size above 500 μm.

In preferred embodiments of the present invention, these containers are film pouches, or injection moldings or thermoformings.

When the containers selected as a packaging in accordance with the invention are in the form of film pouches, it is preferred that the water-soluble film which forms the pouch has a thickness of from 1 to 150 μm, preferably of from 2 to 100 μm, more preferably of from 5 to 75 μm and in particular of from 10 to 50 μm.

When the water-soluble or water-dispersible containers used are injection moldings or thermoformings, the wall of these preferred containers has a thickness of from 50 to 300 μm, preferably of from 70 to 200 μm and in particular of from 80 to 150 μm.

A process particularly suitable for the preparation of inventive water-soluble or water-dispersible containers is injection molding. Injection molding refers to the reshaping of a molding composition in such a way that the composition contained in a composition cylinder for more than one injection molding operation is plastically softened under the action of heat and flows under pressure through a die into the cavity of a mold which has been closed beforehand. The process is employed mainly in the case of noncurable molding compositions which solidify in the mold by cooling. Injection molding is a very economic modern process for producing articles shaped without cutting and is particularly suitable for automated mass production. In industrial operation, the thermoplastic molding compositions (powder, particles, cubes, pastes, inter alia) are heated up to liquefaction (up to 180° C.) and then sprayed under high pressure (up to 140 MPa) into closed, two-part, i.e. consisting of die (formerly known as female part) and core (formerly known as male part), preferably water-cooled molds, where they cool and solidify. It is possible to use piston and screw injection-molding machines. Suitable (injection) molding compositions are water-soluble polymers, for example the abovementioned cellulose ethers, pectins, polyethylene glycols, polyvinyl alcohols, polyvinylpyrrolidones, alginates, gelatins or starch.

The present application therefore further provides a process for producing a filled water-soluble container, comprising the steps of:
 a) injection-molding a container composed of a water-soluble or water-dispersible material,
 b) filling the base molding with a liquid detergent composition, comprising an aqueous matrix and solid particles dispersed therein,
 c) sealing the filled container with a water-soluble or water-dispersible seal unit, characterized in that at least 70% by weight of the dispersed solid particles have particle sizes below 200 μm.

The water-soluble or water-dispersible seal unit which is used in step c) to seal the filled container is preferably an injection molding, this molding preferably having the same three-dimensional shape as the base molding. Preference is consequently given in the context of the present invention especially to a process in which the seal unit has the same three-dimensional shape as the container produced in step a).

In a further preferred embodiment of the inventive process described, the seal unit used is a film, in which case this film may, for example, have been processed beforehand to shape it by thermoforming processes. The present application accordingly further preferably provides an aforementioned process, characterized in that the water-soluble seal unit introduced in step c) is a water-soluble or water-dispersible film.

It is evident from the above remarks that the thickness of the water-soluble outer wall of inventive containers is not necessarily homogeneous, but may vary depending on the production process selected. In the context of the present application, it is preferred that these variations move within the above-specified preferred ranges for the wall thickness of inventive containers.

It is also possible to seal base molding and seal unit in various ways. Preference is given in the context of the present invention to sealing processes which are based on partial solvation of the surface of the container and/or of the seal unit and/or on heating of the container and/or of the seal unit to a temperature at which they are plastically deformable. Both the partial solvation and the heating are preferably not effected on the entire surface of the container and/or on the entire surface of the seal unit, but rather only in the regions in which the subsequent sealing is to be effected to form a seal seam. The heating of the surface of the container and/or of the seal unit is effected preferably by the use of hot air, hotplates, heated rolls or of radiated heat, preferably laser radiation or other IR sources such as optical fibers. The present application consequently preferably provides an above-described process in which the sealing in step c) is effected by means of fusion bonding.

In addition to the injection molding process described, the rotary die process is particularly suitable for producing inventive water-soluble or water-dispersible containers, and the term "rotary die process" in the context of the present application also embraces process variants such as the Accogel process, the reciprocating die process by means of a Norton encapsulation machine, the Colton process and the Upjohn process. The term "rotary die process" is accordingly not to be interpreted as restrictive, but rather embraces all process variants known to those skilled in the art which are suitable for producing filled containers using molding rolls.

However, particular preference is given in the context of the present application to an automatic rotary die process by means of two rotating molding rolls, comprising the steps of:
a) feeding two water-soluble or water-dispersible films which are plastically deformable under the influence of solvent and/or the influence of temperature to two molding rolls rotating in the opposite sense, at least one of these molding rolls having depressions in its surface to accommodate the container to be produced which are bounded by struts,
b) applying a solvent to at least one of these films with at least partial salvation of the surface of this film and/or heating of at least one of these films to a temperature at which this film is plastically deformable,
c) optionally thermoforming and/or imprinting and/or allowing at least one of these films to sink into the depressions of the molding roll,
d) introducing a liquid detergent composition comprising a liquid matrix and solid particles dispersed therein,
d) optionally applying an adhesive,
e) joining the two water-soluble films which are plastically deformable under the influence of solvent and/or the influence of temperature together in the intermediate space of the two molding rolls rotating in the opposite sense,
f) adhesion-bonding and/or squeezing the films by the action of force of the struts onto the films with removal of the container,
characterized in that at least 70% by weight of the dispersed solid particles have particle sizes below 200 µm.

When this process is carried out, it should be noted that the temperatures for the plastic deformation in step b) and the heat sealing can differ markedly. It is generally the case that the temperature selected in steps b) and c) is below the temperatures needed for above-described fusion bonding in the context of the injection molding process. When, for example, HPMC films are used, the temperature for the plastic deformation is preferably from 85 to 90° C., while the fusion bonding is effected in the temperature range of from 150 to 170° C. For PVA films, the temperatures for the plastic reformation are about 150° C., while the fusion bonding is effected within the range from 160 to 200° C. As in the aforementioned cases, the heating of the container materials may be effected by hot air, radiative heat or direct contact with suitable hot plates or heated rolls.

A further process suitable for the production of water-soluble or water-dispersible containers is the thermoforming process, in which the heating, used in typical thermoforming processes, of plastically deformable films may optionally be supplemented/replaced in the context of the present application by an at least partial solvation of these films. The present application therefore further provides a process for producing a water-soluble container, comprising the steps of:
a) feeding a water-soluble or water-dispersible film which is plastically deformable under the influence of solvent and/or the influence of temperature onto a die which has depressions to accommodate the container to be produced,
b) applying a solvent to this film with at least partial solvation of the surface of this film and/or heating this film up to a temperature at which it is plastically deformable,
c) thermoforming and/or imprinting and/or allowing this film to sink into the depressions of the die,
d) loading the film with a liquid detergent composition comprising a liquid matrix and solid particles dispersed therein,
e) feeding a further water-soluble or water-dispersible film and sealing the thermoformed shape with this film,
characterized in that at least 70% by weight of the dispersed solid particles have particle sizes below 200 µm.

While allowing the plastically deformable film to sink in or imprinting it in step c) of the claimed process constitute suitable procedures for deforming these films, particular preference is nevertheless given in the context of the present application to a process in which the film is thermoformed in step c) under the action of a vacuum onto the plastically deformable film, and the vacuum is preferably preserved until after the completion of the process in step e) and retains the film in the depression.

The sealing of an inventive container in step e) of the aforementioned thermoforming process may, as in the other processes described too, be effected by adhesion bonding or fusion bonding, and both processes may optionally be carried out in combination with additional action of pressure. Suitable adhesives, depending on the composition of the films, are, in addition to the adhesives known to those skilled in the art, likewise solvents, for example water. In a preferred process variant of the latter process, the adhesive is applied to the film preferably after step b) and/or step c) and/or step d).

However, the sealing may also be effected by fusion sealing or the action of pressure. In order to avoid repetitions, with regard to the fusion sealing, reference is made at this point to the comprehensive descriptions in the context of the injection molding and rotary die processes. In a preferred process variant of the thermoforming process, the sealing in step e) is accordingly effected by the action of temperature and/or pressure.

In a particularly preferred embodiment, the water-soluble container has one or more embossment(s) and/or one or more imprint(s). The solids enclosed in the container may also have such embossments or imprints. The embossment or the imprint may comprise not only inscriptions but also patterns, shapes, etc. In this way, it is possible to identify, for example, all-purpose laundry detergents by a T-shirt symbol, color laundry detergents by a wool symbol, detergents for machine dishwashing by symbols such as glasses, plates, pots, pans, etc. No limits are placed on the creativity of product managers. Suitable inscriptions are, for example, also the name of the product or of the manufacturer.

These water-soluble films may be produced by various production processes. Mention should be made here in principle of blowing, calendering and casting processes. In a preferred process, the films are blown starting from a melt with air through a blowing mandrel to give a tube. In the calendering process which is likewise one of the production processes used with preference, the raw materials plasticized by suitable additives are sprayed to form the films. It may in particular be necessary here to follow the spraying with a drying step. In the casting process which is likewise one of the preferred production processes, an aqueous polymer preparation is placed on a heatable drying roll, cooling is optionally effected after the evaporation of the water and the film is drawn off. If appropriate, this film is additionally powdered before or during the drawing-off.

Useful container materials are in principle all materials which can dissolve fully or partly in the aqueous phase under the given conditions of a wash operation, rinse operation or cleaning operation (temperature, pH, concentration of washing components) The polymer materials may more preferably belong to the groups of (optionally partly acetalized) polyvinyl alcohol, polyvinylpyrrolidone, polyethylene oxide, gelatin, cellulose and derivatives thereof, starch and derivatives thereof, in particular modified starches, and mixtures (polymer blends, composites, coextrudates, etc.) of the materials mentioned—see above. Particular preference is given to gelatin and polyvinyl alcohols, and to the two materials mentioned, each in a composite with starch or modified starch. Inorganic salts and mixtures thereof are also useful as materials for the at least partly water-soluble coating.

Preference is given in accordance with the invention to an embodiment in which the container as a whole is water-soluble, i.e. dissolves fully when it is used as intended in the washing or machine cleaning and the conditions intended for the dissolution are attained. A significant advantage of this embodiment is that the container dissolves at least partially within a practically relevant short time—a few seconds up to 5 min can be specified as a nonlimiting example—under precisely defined conditions in the wash liquor and thus brings the coated contents, i.e. the cleaning material or a plurality of materials, into the liquor in accordance with the requirements.

In another embodiment of the invention which is likewise preferred owing to advantageous properties, the water-soluble container comprises regions which are less readily water-soluble or even water-insoluble or are water-soluble only at higher temperature and regions which are readily water-soluble or are water-soluble at lower temperature. In other words: the container does not consist of a uniform material having the same water solubility in all regions, but rather of materials of different water solubility. A distinction should be drawn between regions of good water solubility on the one hand and regions having less good water solubility, having poor or even zero water solubility, or regions in which the water solubility attains the desired value only at higher temperature or only at another pH or only at an altered electrolyte concentration on the other hand. This may lead to certain regions of the container dissolving while other regions remain intact under adjustable conditions where it is used as intended. Thus, a container provided with pores or holes is formed, into which water and/or liquor can penetrate, dissolve washing, rinsing or cleaning ingredients and flush them out of the container. In the same way, systems in the form of multichamber containers or in the form of containers arranged one inside the other ("onion system") can also be provided. Thus, it is possible to produce systems having controlled release of the washing, rinsing or cleaning ingredients.

For the design of such systems, the invention is subject to no restrictions. Thus, containers can be provided in which a uniform polymer material comprises small regions of incorporated compounds (for example of salts) which are more rapidly water-soluble than the polymer material. Secondly, it is also possible to mix a plurality of polymer materials having different water solubility (polymer blend), so that the more rapidly soluble polymer material is disintegrated more rapidly by water or the liquor than that which dissolves more slowly under defined conditions.

It corresponds to a particularly preferred embodiment of the invention that the less readily water-soluble regions or regions which are even water-insoluble or regions of the containers which are water-soluble only at higher temperature are made of a material which corresponds chemically substantially to that of the readily water-soluble regions or regions which are water-soluble at lower temperature, but have a higher layer thickness and/or an altered degree of polymerization of the same polymer and/or have a higher degree of crosslinking of the same polymer structure and/or have a higher degree of acetalization (in the case of PVAL, for example with saccharides, polysaccharides such as starch) and/or have a content of water-insoluble salt components and/or have a content of a water-insoluble polymer. Even taking into account the fact that the containers do not dissolve fully, detergent compositions portioned in this way can be provided in accordance with the invention which have advantageous properties in the release of the detergent composition into the particular liquor.

The water-soluble container material is preferably transparent. In the context of this invention, transparency means that the transmittance within the visible spectrum of light (410 to 800 nm) is greater than 20%, preferably greater than 30%, exceptionally preferably greater than 40% and in particular greater than 50%. Thus, as soon as one wavelength of the visible spectrum of light has a transmittance greater than 20%, it should be considered as transparent in the context of the invention.

Inventive portioned detergent compositions which are packaged in transparent containers may comprise a stabilizer as an essential constituent. In the context of the invention, stabilizers are materials which protect the detergent constituents in their water-soluble, transparent containers from decomposition or deactivation by incident light. It has been found that antioxidants, UV absorbers and fluorescent dyes are particularly suitable here.

In the context of the invention, particularly suitable stabilizers are the antioxidants. In order to prevent undesired changes to the formulations caused by incident light and thus free-radical decomposition, the formulations may comprise antioxidants. The antioxidants used may be, for example, phenols, bisphenols and thiobisphenols substituted by sterically hindered groups. Further examples are propyl gallate, butylhydroxytoluene (BHT), butylhydroxyanisole (BHA), t-butylhydroquinone (TBHQ), tocopherol and the long-chain (C8-C22) esters of gallic acid, such as dodecyl gallate. Other substance classes are aromatic amines, preferably secondary aromatic amines and substituted p-phenylenediamines, phosphorus compounds with trivalent phosphorus, such as phosphines, phosphites and phosphonites, citric acids and citric acid derivatives such as isopropyl citrate, compounds containing enediol groups, known as reductones, such as ascorbic acid and derivatives thereof such as ascorbic acid palmitate, organosulfur compounds such as the esters of 3,3'-thiodipropionic acid with $C_{1-18}$-alkanols, especially $C_{10-18}$-alkanols, metal ion deactivators which are capable of complexing the autoxidation-catalyzing metal ions, for example copper, such as nitrilotriacetic acid, and derivatives and mixtures thereof. Antioxidants may be present in the formulations in amounts of up to 35% by weight, preferably up to 25% by weight, more preferably from 0.01 to 20% by weight and in particular from 0.03 to 20% by weight.

A further class of stabilizers which can be used with preference is that of the UV absorbers. UV absorbers can improve the photostability of the formulation constituents. They include organic substances (light protection filters) which are capable of absorbing ultraviolet rays and emitting the energy absorbed again in the form of longer-wavelength radiation, for example heat. Compounds which have these desired properties are, for example, the compounds and derivatives of benzophenone having substituents in the 2- and/or 4-position which are effective by virtue of radiationless deactivation. Also suitable are substituted benzotriazoles, for example the water-soluble monosodium 3-(2H-benzotriazol-2-yl)-4-hydroxy-5-(methylpropyl)benzenesulfonate (Cibafast® H), 3-phenyl-substituted acrylates (cinnamic acid derivatives), optionally having cyano groups in the 2-position, salicylates, organic: nickel complexes and natural substances such as umbelliferone and endogenous urocanic acid. Of particular significance are biphenyl and in particular stilbene derivatives which are available commercially as Tinosorb® FD or Tinosorb® FR ex Ciba. UV-B absorbers include 3-benzylidenecamphor or 3-benzylidenenorcamphor and derivatives thereof, for example 3-(4-methylbenzylidene)camphor; 4-aminobenzoic acid derivatives, preferably 2-ethylhexyl 4-(dimethylamino)benzoate, 2-octyl 4-(dimethylamino)benzoate and amyl 4-(dimethylamino)benzoate; esters of cinnamic acid, preferably 2-ethylhexyl 4-methoxycinnamate, propyl 4-methoxycinnamate, isoamyl 4-methoxycinnamate, 2-ethylhexyl 2-cyano-3,3-phenylcinnamate (octocrylene); esters of salicylic acid, preferably 2-ethylhexyl salicylate, 4-isopropylbenzyl salicylate, homomenthyl salicylate; derivatives of benzophenone, preferably 2-hydroxy-4-methoxybenzophenone, 2-hydroxy-4-methoxy-4'-methylbenzophenone, 2,2'-dihydroxy-4-methoxybenzophenone; esters of benzalmalonic acid, preferably di-2-ethylhexyl 4-methoxybenzmalonate; triazine derivatives, for example 2,4,6-trianilino(p-carbo-2'-ethyl-1'-hexyloxy)-1,3,5-triazine and octyltriazone or dioctylbutamidotriazone (Uvasorb® HEB); propane-1,3-diones, for example 1-(4-tert-butylphenyl)-3-(4'-methoxyphenyl)propane-1,3-dione; ketotricyclo(5.2.1.0) decane derivatives. Also suitable are 2-phenylbenzimidazole-5-sulfonic acid and the alkali metal, alkaline earth metal, ammonium, alkylammonium, alkanolammonium and glucammonium salts thereof; sulfonic acid derivatives of benzophenones, preferably 2-hydroxy-4-methoxybenzophenone-5-sulfonic acid and its salts; sulfonic acid derivatives of 3-benzylidenecamphor, for example 4-(2-oxo-3-bornylidenemethyl)benzenesulfonic acid and 2-methyl-5-(2-oxo-3-bornylidene)sulfonic acid and salts thereof.

Useful typical UV-A filters are in particular derivatives of benzoylmethane, for example 1-(4'-tert-butylphenyl)-3-(4'-methoxyphenyl)propane-1,3-dione, 4-tert-butyl-4'-methoxydibenzoylmethane (Parsol 1789), 1-phenyl-3-(4'-isopropylphenyl)propane-1,3-dione, and enamine compounds. The UV-A and UV-B filters can of course also be used in mixtures. In addition to the soluble substances mentioned, insoluble light protection pigments are also suitable for this purpose, specifically finely dispersed, preferably nanoized, metal oxides or salts. Examples of suitable metal oxides are in particular zinc oxide and titanium dioxide and additionally oxides of iron, zirconium, silicon, manganese, aluminum and cerium, and mixtures thereof. The salts used may be silicates (talc), barium sulfate or zinc stearate. The oxides and salts are already used in the form of pigments for skincare and skin-protecting emulsions and decorative cosmetics. The particles should have an average diameter of less than 100 nm, preferably between 5 and 50 nm and in particular between 15 and 30 nm. They may have a spherical shape, although it is also possible to use particles which have an ellipsoidal shape or a shape which deviates in some other way from the spherical form. The pigments may also be surface-treated, i.e. hydrophilicized or hydrophobicized. Typical examples are coated titanium dioxides, for example titanium dioxide T 805 (Degussa) or Eusolex® T2000 (Merck). Suitable hydrophobic coating compositions are in particular silicones and especially trialkoxyoctylsilanes or simethicones. Preference is given to using micronized zinc oxide.

UV absorbers may be present in the detergent compositions in amounts of up to 5% by weight, preferably up to 3% by weight, more preferably from 0.01 to 2.0% by weight and in particular from 0.03 to 1% by weight.

A further class of stabilizers to be used with preference is that of the fluorescent dyes. They include the 4,4'-diamino-2,2'-stilbenedisulfonic acids (flavone acids), 4,4'-distyrylbiphenyls, methylumbelliferones, coumarins, dihydroquinolinones, 1,3-diarylpyrazolines, naphthalimides, benzoxazole, benzisoxazole and benzimidazole systems, and pyrene derivatives substituted by heterocycles. Of particular significance in this connection are the sulfonic acid salts of diamino-stilbene derivatives, and polymeric fluorescent substances.

Fluorescent substances may be present in the formulations in amounts of up to 5% by weight, preferably up to 1% by weight, more preferably from 0.01 to 0.5% by weight and in particular from 0.03 to 0.1% by weight.

In a preferred embodiment, the aforementioned stabilizers are used in any desired mixtures. The stabilizers are used in amounts of up to 40% by weight, preferably up to 30% by weight, more preferably from 0.01 to 20% by weight, in particular from 0.02 to 5% by weight.

As already mentioned above, inventive portioned detergent compositions may be provided in such a way that the packaging is firstly water-soluble and secondly sealed tight, i.e. isolated from the environment.

Two embodiments can be realized in accordance with the invention:

For instance, it corresponds to a preferred embodiment of the invention that the container(s) is/are sealed and comprise (s) at least one gas which does not react with the detergent composition, more preferably in such an amount that the overall pressure within the sealed container(s) is above the external pressure, even more preferably at least 1 mbar above the external pressure. Very particularly preferred embodiments of these portions according to the invention comprise at least one gas which does not react with the detergent composition in such an amount that the overall pressure within the sealed containers is at least 5 mbar, even more preferably at least 10 mbar, most preferably in the range from 10 mbar to 50 mbar, above the external pressure. Very particularly in the case of the preferred embodiments with overall pressure distinctly above the external pressure, it is possible within the containers to distinctly improve the visual appearance, especially of film pouches. The correspondingly packaged compositions have an increased intrinsic stability and impart the appearance of a tightly packed, "powerful" composition. In connection with the present invention, "external pressure" refers to the pressure on the environment side of the containers which acts on the exterior of the containers, specifically at the time at which the containers are filled with in particular at least one gas.

According to the invention, the containers may comprise either one gas or a plurality thereof. In practice, preference is given to charging the containers with one gas owing to the lower costs associated therewith. Preferred detergent composition portions according to the invention comprise, as gas(es), at least one gas which is selected from the group of $N_2$, noble gas(es), $CO_2$, $N_2O$, $O_2$, $H_2$, air, gaseous hydrocarbons, very particularly $N_2$ which is available inexpensively anywhere. The gases mentioned are advantageously inert toward the components of the washing formulation and are therefore also sometimes referred to as "inert gases" in the context of the present invention.

According to a further, likewise preferred embodiment, the container(s) is/are sealed and comprise at least one substance which releases on reaction with water a gas which does not react with the washing formulation(s), in such an amount that the overall pressure within the closed containers rises. Particularly advantageous portions are those in which the at least one substance present in the container(s), on reaction with water, releases the at least one gas in such an amount that the overall pressure within the closed containers rises by at least 1 mbar above the external pressure, preferably by at least 5 mbar, more preferably by a value which is in the range from 5 to 50 mbar higher than the external pressure. This embodiment is particularly advantageous insofar as its production is greatly simplified compared to that embodiment in which the gas is present in the sealed container, since only the at least one substance has to be added which generates at least one gas in the sealed container on contact with moisture/water. Further, any moisture which has penetrated into the container is taken up and converted straight away by the substance which is capable of reaction with water and is therefore no longer able to worsen the quality of the components of the detergent composition. Also conceivable are mixed forms of the portions in which both (at least) one gas in the container and a substance capable of reaction with water are present from the outset.

In a preferred embodiment of the invention, the substance which releases a gas with water is a constituent of the detergent composition and is—even more preferably—a hygroscopic substance which is compatible with the components of the detergent composition. Preference is given to metering such a substance into the water-soluble or water-dispersible container separately from the inventive liquid detergent composition, and this container is preferably sealed only a few seconds, in particular within 10 seconds, after the contact of the gas-releasing substance with the cleaning composition. The release of the gas then increases the internal pressure within the containers to a value above atmospheric pressure and thus achieves the abovementioned advantages.

Examples of such substances are, although this should not be interpreted as a restriction, substances which are selected from the group of substances containing bound hydrogen peroxide, substances containing —O—O— groups, substances containing —O—C—O— groups, hydrides and carbides, and is more preferably a substance which is selected from the group of percarbonates (more preferably sodium percarbonate), persulfates, perborates, peracids, $M_A M_B H_4$ where $M_A$ is an alkali metal (more preferably Li or Na) (for example $LiAlH_4$, $NaBH_4$, $NaAlH_4$) and $M_B$ is B or Al, or is $M^I_2 C_2$ or $M^{II} C_2$, where $M^I$ is a monovalent metal and $M^{II}$ is a divalent metal (for example $CaC_2$).

With regard to the preferred particle sizes, the amounts of the individual ingredients, preferred further ingredients and preferred parameters for the containers, that which was stated for the inventive compositions applies analogously to the processes according to the invention described.

As used herein, and in particular as used herein to define the elements of the claims that follow, the articles "a" and "an" are synonymous and used interchangeably with "at least one" or "one or more," disclosing or encompassing both the singular and the plural, unless specifically defined otherwise. The conjunction "or" is used herein in its inclusive disjunctive sense, such that phrases formed by terms conjoined by "or" disclose or encompass each term alone as well as any combination of terms so conjoined, unless specifically defined otherwise. All numerical quantities are understood to be modified by the word. "about," unless specifically modified otherwise or unless an exact amount is needed to define the invention over the prior art.

What is claimed is:

1. A portioned liquid detergent comprising a liquid phase having one or more solid particles dispersed in the liquid phase and a water content of 20 to 60% by weight, the detergent being contained in a water-soluble or water-dispersible container, wherein the solid particles are coated, have a size of 12,000 to 20,000 μm, and the solid particles comprise 0.5 to 30% by weight of at least one surfactant which comprises a nonionic surfactant comprising an alkoxylated nonionic surfactant.

2. The portioned liquid detergent of claim 1, wherein the liquid phase has a viscosity of 500 to 100,000 mPas.

3. The portioned liquid detergent of claim 2, wherein the liquid phase has a viscosity of 1000 to 50,000 mPas.

4. The portioned liquid detergent of claim 3, wherein the liquid phase has a viscosity of 1200 to 10,000 mPas.

5. The portioned liquid detergent of claim 4, wherein the liquid phase has a viscosity of 1300 to 5,000 mPas.

6. The portioned liquid detergent of claim 1, comprising 0.1 to 70% by weight of one or more nonaqueous solvents.

7. The portioned liquid detergent of claim 6, comprising 0.5 to 60% by weight of one or more nonaqueous solvents.

8. The portioned liquid detergent of claim 7, comprising 1 to 50% by weight of one or more nonaqueous solvents.

9. The portioned liquid detergent of claim 8, comprising 2 to 40% by weight of one or more nonaqueous solvents.

10. The portioned liquid detergent of claim 9, comprising 2.5 to 30% by weight of one or more nonaqueous solvents.

11. The portioned liquid detergent of claim 6, wherein the one or more nonaqueous solvents are selected from the group consisting of nonionic surfactants liquid at room temperature, polyethylene glycols, polypropylene glycols, glycerol, glyceryl carbonate, triacetin, ethylene glycol, propylene glycol, propylene carbonate, hexylene glycol, ethanol, n-propanol, and isopropanol.

12. The portioned liquid detergent of claim 1, further comprising 0.01 to 5% by weight of a thickener.

13. The portioned liquid detergent of claim 12, comprising 0.02 to 4% by weight of a thickener.

14. The portioned liquid detergent of claim 13, comprising 0.05 to 3% by weight of a thickener.

15. The portioned liquid detergent of claim 14, comprising 0.1 to 1.5% by weight of a thickener.

16. The portioned liquid detergent of claim 12, wherein the thickener comprises a polymeric thickener.

17. The portioned liquid detergent of claim 16, wherein the polymeric thickener is selected from the group consisting of hydroxyethylcellulose, hydroxypropylcellulose, polysaccharides, xanthan, polyurethanes, modified polyacrylates, and thickeners of the formula XVII

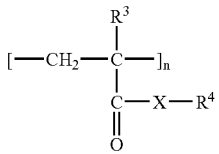

XVII in which $R^3$ is H or a branched or unbranched $C_{1-4}$-alk(en)yl radical, X is N—$R^5$ or O, $R^4$ is an optionally alkoxylated, branched or unbranched, possibly substituted $C_{8-22}$-alk(en)yl radical, $R^5$ is H or $R^4$, and n is a natural number.

18. The portioned liquid detergent of claim 1, further comprising one or more active substances selected from the group consisting of bleaches, bleach activators, polymers, builders, surfactants, enzymes, electrolytes, pH modifiers, dyes, hydrotropes, foam inhibitors, antiredeposition agents, optical brighteners, graying inhibitors, shrink preventatives, anticrease agents, dye transfer inhibitors, antimicrobial active ingredients, germicides, fungicides, antioxidants, corrosion inhibitors, antistats, repellency agents, impregnation agents, swelling agents, antislip agents, nonaqueous solvents, fabric softeners, protein hydrolyzates, and UV absorbers.

19. The portioned liquid detergent of claim 1, wherein the solid particles comprise at least one polymer.

20. The portioned liquid detergent of claim 19, wherein the polymer is selected from the group consisting of homo- and copolymeric carboxylic acids, homo- and copolymeric polycarboxylic acids, and homo- and copolymeric sulfonic acids.

21. The portioned liquid detergent of claim 19, wherein the solid particles comprise 1 to 70% by weight of the polymer.

22. The portioned liquid detergent of claim 21, wherein the solid particles comprise 2 to 60% by weight of the polymer.

23. The portioned liquid detergent of claim 22, wherein the solid particles comprise 5 to 50% by weight of the polymer.

24. The portioned liquid detergent of claim 1, wherein the at least one surfactant comprises a nonionic surfactant comprising mixtures of alkoxylated nonionic surfactants with structurally complex surfactants.

25. The portioned liquid detergent of claim 24, wherein the mixtures of the alkoxylated nonionic surfactants with structurally complex surfactants are polyoxypropylene/polyethylene/polyoxypropylene surfactants.

26. The portioned liquid detergent of claim 1, wherein the solid particles comprise 0.1 to 50% by weight of at least one bleach.

27. The portioned liquid detergent of claim 26, wherein the solid particles comprise 0.5 to 40% by weight of at least one bleach.

28. The portioned liquid detergent of claim 27, wherein the solid particles comprise 1.0 to 30% by weight of at least one bleach.

29. The portioned liquid detergent of claim 26, wherein the bleach comprises a compound that releases $H_2O_2$ in water.

30. The portioned liquid detergent of claim 26, wherein the bleach comprises sodium perborate tetrahydrate, sodium perborate monohydrate, sodium percarbonate, or any combination thereof.

31. The portioned liquid detergent of claim 1, wherein the solid particles comprise 0.01 to 15% by weight of at least one enzyme.

32. The portioned liquid detergent of claim 31, wherein the solid particles comprise 0.1 to 10% by weight of at least one enzyme.

33. The portioned liquid detergent of claim 1, wherein the solid particles comprise 0.2 to 7% by weight of at least one enzyme.

34. The portioned liquid detergent of claim 31, wherein the at least one enzyme comprises one or more proteases, amylases, or lipases.

35. The portioned liquid detergent of claim 1, wherein the water-soluble or water-dispersible container comprises one or more water-soluble polymers.

36. The portioned liquid detergent of claim 35, wherein the water-soluble polymers comprise a material selected from the group consisting of optionally acetalized polyvinyl alcohol (PVAL), polyvinylpyrrolidone, polyethylene oxide, gelatin, cellulose and derivatives thereof, and mixtures thereof.

37. The portioned liquid detergent of claim 1, wherein the water-soluble or water-dispersible container comprises a polyvinyl alcohol having a degree of hydrolysis of 70 to 100 mol %.

38. The portioned liquid detergent of claim 37, wherein the water-soluble or water-dispersible container comprises a polyvinyl alcohol having a degree of hydrolysis of 80 to 90 mol %.

39. The portioned liquid detergent of claim 38, wherein the water-soluble or water-dispersible container comprises a polyvinyl alcohol having a degree of hydrolysis of 81 to 89 mol %.

40. The portioned liquid detergent of claim 39, wherein the water-soluble or water-dispersible container comprises a polyvinyl alcohol having a degree of hydrolysis of 82 to 88 mol %.

41. The portioned liquid detergent of claim 1, wherein the water-soluble or water-dispersible container comprises a polyvinyl alcohol having a molecular weight of 10,000 to 100,000 g/mol.

42. The portioned liquid detergent of claim 41, wherein the polyvinyl alcohol has a molecular weight of 11,000 to 90,000 g/mol.

43. The portioned liquid detergent of claim 42, wherein the polyvinyl alcohol has a molecular weight of 12,000 to 80,000 g/mol.

44. The portioned liquid detergent of claim 43, wherein the polyvinyl alcohol has a molecular weight of 13,000 to 70,000 g/mol.

45. The portioned liquid detergent of claim 1, wherein the water-soluble or water-dispersible container comprises a film having a thickness of 1 to 150 μm.

46. The portioned liquid detergent of claim 45, wherein the film has a thickness of 2 to 100 μm.

47. The portioned liquid detergent of claim 46, wherein the film has a thickness of 5 to 75 μm.

48. The portioned liquid detergent of claim 47, wherein the film has a thickness of 10 to 50 μm.

49. The portioned liquid detergent of claim 1, wherein the water-soluble or water-dispersible container comprises an injection-molded or thermoformed or blow-molded body having a wall thickness of 50 to 300 μm.

50. The portioned liquid detergent of claim 49, wherein the body has a wall thickness of 70 to 200 μm.

51. The portioned liquid detergent of claim 50, wherein the body has a wall thickness of 80 to 150 μm.

52. A portioned liquid detergent, comprising a liquid phase having one or more solid particles dispersed in the liquid phase and a water content of 20 to 60% by weight, the detergent being contained in a water-soluble or water-dispersible container, wherein the solid particles have a size above 600 μm and comprise 0.5 to 30% by weight of at least one surfactant which comprises a nonionic surfactant comprising an alkoxylated nonionic surfactant.

53. The portioned liquid detergent of claim 52, wherein the liquid phase has a water content 30 to 50% by weight.

54. A portioned liquid detergent, comprising a liquid phase having one or more solid particles dispersed in the liquid phase, the detergent being contained in a water-soluble or water-dispersible container, wherein the solid particles have a size above 600 μm and comprise 0.5 to 30% by weight of at least one surfactant which comprises an anionic surfactant comprising an alkylbenzenesulfonate.

55. The portioned liquid detergent of claim 54, wherein the solid particles comprise 1 to 25% by weight of the at least one surfactant.

56. The portioned liquid detergent of claim 55, wherein the solid particles comprise 2 to 25% by weight of the at least one surfactant.

57. The portioned liquid detergent of claim 56, wherein the solid particles comprise 2 to 20% by weight of the at least one surfactant.

58. The portioned liquid detergent of claim 54, wherein the alkylbenzenesulfonate is a $C_{9-13}$ alkylbenzenesulfonate.

59. A portioned liquid detergent comprising a liquid phase having one or more solid particles dispersed in the liquid phase and a water content of 20 to 60% by weight, the detergent being contained in a water-soluble or water-dispersible container, wherein the solid particles are coated, have a size of 12,000 to 20,000 μm, and the solid particles comprise 0.5 to 30% by weight of at least one surfactant which comprises an alkoxylated nonionic surfactant comprising an ethoxylated nonionic surfactant.

* * * * *